(12) United States Patent
Boone et al.

(10) Patent No.: US 8,645,170 B2
(45) Date of Patent: Feb. 4, 2014

(54) METHODS, APPARATUSES, SYSTEMS AND COMPUTER PROGRAM PRODUCTS FOR USE IN DETERMINING PREMIUMS

(76) Inventors: Doug Boone, San Diego, CA (US); Alexis S. Gutierrez, San Diego, CA (US)

( * ) Notice: Subject to any disclaimer, the term of this patent is extended or adjusted under 35 U.S.C. 154(b) by 595 days.

(21) Appl. No.: 12/337,455

(22) Filed: Dec. 17, 2008

(65) Prior Publication Data
US 2009/0210331 A1    Aug. 20, 2009

Related U.S. Application Data

(60) Provisional application No. 61/014,394, filed on Dec. 17, 2007.

(51) Int. Cl.
G06Q 40/00    (2012.01)
G07F 15/02    (2006.01)
G06F 1/00    (2006.01)

(52) U.S. Cl.
USPC .................................................. 705/4; 705/32

(58) Field of Classification Search
USPC ..................... 705/32, 1.1, 4; 795/4
See application file for complete search history.

(56) References Cited

U.S. PATENT DOCUMENTS

| | | | |
|---|---|---|---|
| 6,604,080 B1 * | 8/2003 | Kern | 705/4 |
| 7,240,016 B1 * | 7/2007 | Sturgis et al. | 705/4 |
| 7,752,062 B1 * | 7/2010 | Martin | 705/4 |
| 2001/0044734 A1 * | 11/2001 | Walker et al. | 705/4 |
| 2002/0052764 A1 * | 5/2002 | Banks | 705/4 |
| 2002/0055862 A1 * | 5/2002 | Jinks | 705/4 |
| 2002/0069077 A1 * | 6/2002 | Brophy et al. | 705/1 |
| 2003/0171956 A1 * | 9/2003 | Cox et al. | 705/4 |
| 2003/0200121 A1 * | 10/2003 | Santoloci | 705/4 |
| 2003/0204421 A1 * | 10/2003 | Houle et al. | 705/4 |
| 2004/0002875 A1 * | 1/2004 | Armstrong | 705/4 |
| 2004/0267595 A1 * | 12/2004 | Woodings et al. | 705/9 |
| 2005/0125259 A1 * | 6/2005 | Annappindi | 705/4 |
| 2006/0064313 A1 * | 3/2006 | Steinbarth et al. | 705/1 |
| 2006/0253306 A1 * | 11/2006 | Richardson et al. | 705/4 |
| 2010/0094666 A1 * | 4/2010 | Pendergrass et al. | 705/4 |

* cited by examiner

*Primary Examiner* — Seye Iwarere
(74) *Attorney, Agent, or Firm* — Fitch, Even, Tabin & Flannery LLP

(57) ABSTRACT

The present embodiments provide methods, systems, apparatuses and/or code for use in determining premiums. Some embodiments provide methods for use in determining premium. These methods identify a work entry; determine a payroll based on the work entry; retrieve a compensation rate based on the work entry; calculate a base premium as a function of the payroll and the compensation rate; retrieve a customer experience modifier assigned to the customer; retrieve a staffer experience modifier rate for an employee provider; and calculate a modified premium by: modifying the base premium by the staffer experience modifier rate when the staffer experience modifier rate is less than the customer modifier rate; and modifying the base premium by the customer modifier rate when the customer modifier rate is less than the staffer experience modifier rate.

19 Claims, 43 Drawing Sheets

Staffer Information — 620

Employee Info — 622
- Company ID: accu rate
- Company: accu rate
- Contact: smf
- Branch: sd
- Ins. Policy #: 123456

Contact — 626
- Phone: (123) 345-5677
- Fax: ( ) -
- E-Mail:
- Website:

Address — 624
- Address 1: 123 test
- Address 2:
- City: San Diego
- State: ca
- Zip Code: 92110

Accept — 630
Cancel — 632

FIG. 6

Figure 8:
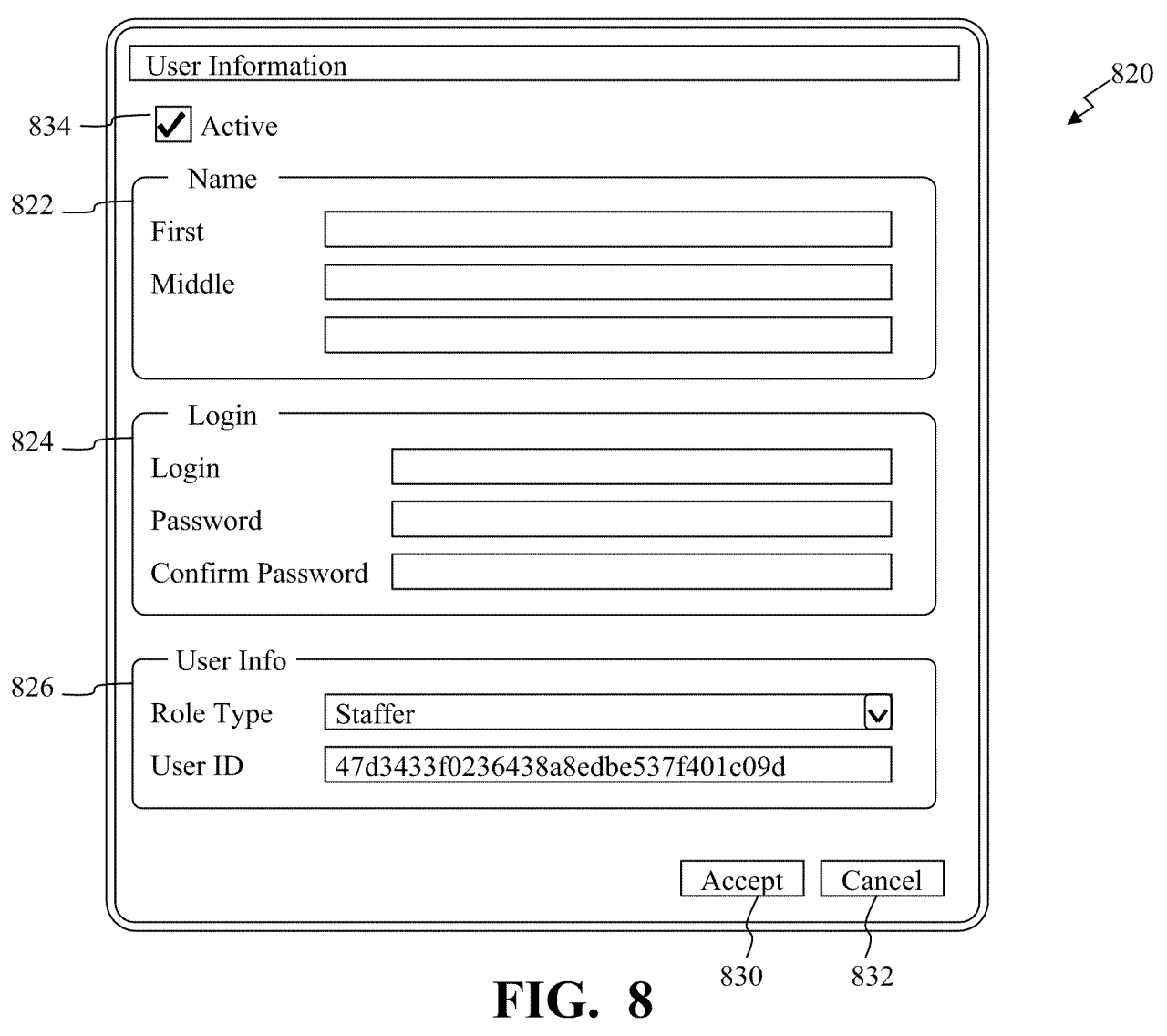

User Information

☑ Active — 834

Name — 822
First
Middle

Login — 824
Login
Password
Confirm Password

User Info — 826
Role Type: Staffer
User ID: 47d3433f023643 8a8edbe537f401c09d

Accept — 830
Cancel — 832

Classification Code Detail

☑ Active — 1534
Date  8/11/2006 — 1522
Bill Rate  45.00 — 1524
Pay Rate  25.00 — 1526
Comp Rate/Hundred  10.00 — 1528
Accept — 1530
Cancel — 1532
1520

FIG. 15

Classification Code

☑ Active — 1430
Class Code  5187(1) — 1422
Last Update  8/11/2006 — 1424
Description  Plumbing – shop and outside – gas, steam, hot water or other pipe fittings installation – salary exceeds $23.00/hr. — 1426
Accept — 1432
Cancel — 1434
1420

Customer Configuration — 1720

☑ Active — 1728

| Customer Info | Customer Site | Experience Modifier | Comment | History |

Contact Info — 1746
- Customer Name: New Construction Co.
- Contact Name: Jim Builder
- Phone: (123) 112-1111
- Fax: (111) 111-1111
- Email:

Address — 1748
- Address 1: 456 Builder Rd.
- Address 2:
- City: San Diego
- State: CA
- Zip Code: 92211

Contractor Info — 1750
- Contractor: ☑ — 1760
- License #: 343434343
- Expiration: 8/12/2009

Misc — 1752
- Bureau #: 999999
- Customer ID: f1b16c5731774c869c12a891c787a3
- Federal Tax ID: 9999
- EIN: 9999

Accept — 1724
Cancel — 1726

Customer Site Info

☑ Active

| Site Info | Address | Client Letter List | Certificate of Insurance | Comments |

- Address 1: 777 Friars Rd.
- Address 2:
- City: San Diego
- State: CA
- Zip: 92115
- Parcel #:

[ Accept ]  [ Cancel ]

Customer Configuration

☑ Active

| Customer Info | Customer Site | Experience Modifier | Comment | History |

Setup Date: 08/12/2006
Setup By:
Last Modified Date:
Last Modified By:

[ Accept ]   [ Cancel ]

Employee Accident Info

☑ Active

| Accident Info | Claim Advisor Info | Clinic Info | Comment |

Name — 3422
Phone — 3424
Email — 3428

3326
3320
3420

Accept — 3356
Cancel — 3358

FIG. 34

Employee Accident Info

☑ Active

| Accident Info | Claim Advisor Info | Clinic Info | Comment |

3328

Clinic name — 3522
Address 1 — 3524
Address 2 — 3526
City — 3530
Zip code — 3532

3520

Accept — 3356
Cancel — 3358

| | | Work Entry | | | | |
|---|---|---|---|---|---|---|
| ○ Year 2006 ▲▼ | ● Month 8/2006 ▲▼ | ○ Date 8/12/2006 ▲▼ | | Active ▼ | | |
| Employee | Customer | Customer Site | ClassCode | Date | Hours | |
| Clark, Ann Marie | New Construction Co. | Mission Valley Condo... | 5474(1) | 08/02/2006 | 8 | |
| Clark, Ann Marie | Non-License Contract... | Mission Valley Condo | 5474(1) | 08/08/2006 | 12 | |
| Doe, Joe | Non-License Contract... | Mission Valley Condo | 5187(1) | 08/08/2006 | 8.5 | |
| Doe, Joe | Non-License Contract... | Mission Valley Condo | 5187(1) | 08/12/2006 | 10 | |
| Johnson, Peter | General Contractor 1 | Carmel Valley Devel... | 5187(1) | 08/01/2006 | 8 | |
| Johnson, Peter | Sub Contractor 1 | SITE 1 joe contractor | 5474(1) | 08/12/2006 | 10 | |
| Johnson, Peter | Sub Contractor 1 | SITE 1 joe contractor | 5474(1) | 08/09/2006 | 8 | |
| Johnson, Peter | Sub Contractor 1 | SITE 1 joe contractor | 0251 | 08/12/2006 | 7.9 | |
| Martin, Scott | New Construction Co. | Mission Valley Condo... | 0251 | 08/05/2006 | 6 | |
| Martin, Scott | Non-License Contract... | Mission Valley Condo | 0251 | 08/06/2006 | 9 | |
| Martin, Scott | New Construction Co. | Mission Valley Condo... | 5187(1) | 08/08/2006 | 9.5 | |
| Newguy, Bill | Non-License Contract... | Mission Valley Condo | 5187(1) | 08/10/2006 | 9.7 | |
| Newguy, Bill | New Construction Co. | Mission Valley Condo... | 5187(1) | 08/03/2006 | 9 | |
| Peterson, Mark | Sub Contractor 1 | SITE 1 joe contractor | 5474(1) | 08/04/2006 | 10 | |
| | | | | 08/11/2006 | 8 | |

Search Employee ▼    [ Add ]  [ Edit ]  [ Delete ]

TEMPORARY STAFFING CLIENT PAYROLL WORKSHEET (ONE PER CLIENT) 4220 accu rate 123 test

GROUP POLICY 123456

PAYROLL PERIOD 8/1/2006 TO 8/31/2006

San Diego, ca 92110

| Client is not insured under this policy | Client Name | Sub Contractor 1 | Client Bureau# | 1234567 |
|---|---|---|---|---|
| | Address 1 | 123 Contractor St. | Client CSLB# | 33443344 |
| | Address 2 | | | |
| | City, State | San Diego, CA 92110 | | |

| CLASS CODE NO. | DESCRIPTION | PAYROLL OF EMPLOYEES | INTERIM RATE | PREMIUM |
|---|---|---|---|---|
| 5474(1) | Painting | $921.80 | $7.00 | $64.53 |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

| Total Payroll | $921.80 | Gross Premiums $63.53 |
|---|---|---|
| | | *Client Exp Mod 45%[customer] |
| | | **Client Premium $29.04 |

Return All Client Payroll Worksheets with I.C.3302 Compliant Payroll Summary
*Client Experience Modification — If experience rated, enter licensed contractor's experience modification. If not experience rated, enter policyholder's experience modification.
**Client Premium = gross premium X client experience modification.

| SIGNATURE OF PERSON PREPARING REPORT | TITLE | AREA CODE PHONE NO. (123) 345-5677 | |
|---|---|---|---|
| NAME AND ADDRESS WHERE PAYROLL RECORDS ARE KEPT (include ZIP code) accu rate, 123 test., San Diego, ca 92110 | | | DATE 09/28/2006 |

PAGE 1 TO 1

FIG. 42

WORKERS' COMPENSATION INSURANCE PAYROLL REPORT 4320

STATE FUND
P.O. BOX 7854
SAN FRANCISCO, CA
94120-7854 accu rate 123 test

San Diego, ca 92110

GROUP POLICY 123456
PAYROLL PERIOD 8/1/2006 TO 8/31/2006

| ADDRESS |
|---|
| CITY, STATE ZIP |

CHECK BOX AT RIGHT FOR ADDRESS CHANGE
SEE INSTRUCTIONS ON BACK - If zero payroll, write NONE on all pages.
Sign, Date, and return all pages. DO NOT PERFORATE

||||||||||||||||||||||| — 4322

| CLASS CODE NO. | DESCRIPTION OF WORK DONE SEE REVERSE IF ADDITIONAL CLASSIFICATION NEEDED | PAYROLL OF EMPLOYERS | INTERIM RATE | PREMIUM (MULTIPLY PAYROLL BY INTERIM RATE THEN DIVIDE BY 100 TO DETERMINE PREMIUM DUE) |
|---|---|---|---|---|
| 0251 | Irrigation, Drainage or Reclamation | $345.66 | $5.00 | $17.28 |
| 5187(1) | Plumbing - shop and outside - gas, steam, hot water - salary exceeds $23.00/hr | $462.50 | $10.00 | $46.25 |
| 5474(1) | Painting | $264.00 | $7.00 | $18.48 |
| 5697(2) | Carpentry - dwelling construction salary greater than $23.00 | | $10.00 | |
| | | | | |
| | | | | |
| | | | | |
| | | | | |
| | | | | |
| | | | | |
| | | | | |
| | | | | |

Itemize payroll below only for corporate officers, general partners, LLC members or relatives (farm only) not excluded by endorsement.

YOUR POLICY WILL BE SUBJECT TO CANCELLATION IF THIS REPORT AND PAYMENT ARE NOT RECIEVED BY

| OVERTIME EXCESS | | GROSS PREMIUM | $82.01 |
|---|---|---|---|
| TOTAL PAYROLL | $1072.10 | MODIFICATION | 150% |

CHECK MUST BE ENCLOSED FOR THIS AMOUNT > $123.02

| NAME | TITLE | DESCRIPTION OF WORK DONE | CODE NO. | PAYROLL | IS PAYROLL INCLUDED ABOVE? | |
|---|---|---|---|---|---|---|
| | | | | | YES | NO |
| | | | | | YES | NO |
| | | | | | YES | NO |

I (we) certify that the above reported payroll accurately reflects the total wages, salaries, and other compensation paid to all employees (including unlicensed contractors or contractors without W.C. coverage) during the period covered. WILLFUL UNDERREPORTING OF SUCH AMOUNTS IS A VIOLATION OF CALIFORNIA FRAUD STATUES.

| SIGNATURE OF PERSON PREPARING REPORT | TITLE | AREA CODE PHONE NO. (123) 345-5677 | |
|---|---|---|---|
| NAME AND ADDRESS WHERE PAYROLL RECORDS ARE KEPT (include ZIP CODE) accu rate, 123 test, , San Diego, ca 92110 | | | DATE 09/28/2006 |

PAGE 1 TO 1

FIG. 43

METHODS, APPARATUSES, SYSTEMS AND COMPUTER PROGRAM PRODUCTS FOR USE IN DETERMINING PREMIUMS

PRIORITY CLAIM

This application claims the benefit of U.S. Provisional Application No. 61/014,394, filed Dec. 17, 2007, which is incorporated herein by reference in its entirety.

FIELD OF THE INVENTION

The present invention relates generally to managing accounting, and more particularly to managing and reporting accountings.

BACKGROUND

It is common for employers to contract with an agency to have the agency provide temporary and/or long term employees. Typically, the agency screens potential temporary employees, then upon requests from employers identifies a potential temporary employee and sends the temporary employee to the employer for the duration of time specified by the employer and/or until a specified project or portion of a project is completed.

In many instances, the agency pays the temporary employee for his/her work performed for the employer. Further, the employer pays the agency for the work performed by the temporary employee. The accounting of payments received by the agency and/or the payments made to the temporary employees retained by the agency can be a costly and time consuming process.

SUMMARY OF THE EMBODIMENTS

The present invention advantageously addresses the needs above as well as other needs through the provision of the method, apparatus, and system for use in determining premiums. Some of these methods in determining premium identify a work entry; determine a payroll based on the work entry; retrieve a compensation rate based on the work entry; calculate a base premium as a function of the payroll and the compensation rate; retrieve a customer experience modifier assigned to the customer; retrieve a staffer experience modifier rate for an employee provider; and calculate a modified premium by: modifying the base premium by the staffer experience modifier rate when the staffer experience modifier rate is less than the customer modifier rate; and modifying the base premium by the customer modifier rate when the customer modifier rate is less than the staffer experience modifier rate.

In some implementations, these calculated premiums can be stored locally in a digital recording medium, printed as a record, otherwise stored and/or transferred over a medium for remote access and/or storage. Further, the stored, printed or otherwise recorded calculated premiums can additionally or alternatively be transferred to a third party agency, for example, over a distributed network or via mail or carrier service.

Still further, some of these embodiments additionally determine whether a customer is a licensed contractor, and implementing the retrieving of the customer modifier assigned to the customer when the customer is a licensed contractor. In some instances the determining a payroll comprises identifying a pay rate for the work entry, identifying a number of hours worked for the work entry, and multiplying the pay rate by the number of hours worked. The retrieving of the compensation rate, in some embodiments may comprise identifying a classification code of the work entry and determining the compensation rate based on the classification code. Furthermore, the calculating the base premium can in some implementations comprise: multiplying the payroll by the compensation rate and dividing the result by 100.

Further embodiments provide methods for use in calculating premiums. Some of these methods provide a computer processor; provide computer readable memory in communication with said computer processor; provide a display in communication with said computer processor; identify a work entry stored on the computer readable medium and associated with a customer; determine a payroll based on the work entry; retrieve, from the computer readable medium, a compensation rate based on the work entry; calculate a base premium as a function of the payroll and the compensation rate; store the calculated base premium to the computer readable medium; retrieve, from the computer readable medium, a customer experience modifier assigned to the customer; retrieve, from the computer readable medium, a staffer experience modifier rate for an employee provider; and calculate a modified premium comprising: retrieve the base premium from the computer readable medium; modify the base premium by the staffer experience modifier rate when the staffer experience modifier rate is less than the customer modifier rate; modifying the base premium by the customer modifier rate when the customer modifier rate is less than the staffer experience modifier rate; and storing, to the computer readable medium, the modified base premium when the base premium is modified. These methods, in some implementations further, display the modified base premium on the display, and/or transfer or communicate over a distributed network, the modified base premium.

Other embodiments provide methods for use in calculating premiums, where these methods comprise: identifying a work entry; determining a base premium according to the work entry; comparing two experience modifiers; selecting one of the experience modifiers in response to comparing; and applying the experience modifier to the base premium to define an adjusted premium. The calculated premiums can be stored locally in a digital recording medium, printed as a record, otherwise stored and/or transferred over a medium for remote access and/or storage. Further, the stored, printed or otherwise recorded calculated premiums can additionally or alternatively be transferred to a third party agency, for example, over a distributed network or via mail or carrier service. These embodiments may additionally or alternatively identify a first experience modifier of a first participant utilizing employees, and identify a second experience modifier of a second participate that supplied employees, such that the comparing the two experience modifiers comprises comparing the first and second experience modifiers. In some implementations, the comparing can comprises: determining which of the first and second experience modifier results in a lower adjusted premium such that the selecting comprises selecting one of the first and second experience modifiers determined to result in lower adjusted premiums.

Still further embodiments provide computer program products that are stored on a computer readable medium. Some of these computer program product comprise: code to determine whether a first experience modifier is associated with a first participant; code to compare the first experience modifier with a second experience modifier when the first experience modifier is associated with the first participant; code to determine whether a predefined relationship exists between the first experience modifier and the second experience modifier; code to retrieve a base premium; and code to apply one of the first and second experience modifiers to the base premium to generate an adjusted premium. Additional code can store the adjusted premiums locally in a digital recording medium, printed the adjusted premiums as a record, otherwise stored and/or transferred the adjusted premiums over a medium for remote access and/or storage. Further, the stored, printed or otherwise recorded calculated premiums can additionally or alternatively be transferred to a third party agency, for example, over a distributed network or via mail or carrier service.

Additional embodiments provide methods of determining premiums to be paid. These methods comprise: determining whether an experience modifier is associated with a first party; retrieving a first experience modifier when the first experience modifier is associated with the first party; retrieve a second experience modifier associated with a second party; determining a base compensation premium; determining whether the second experience modifier has a predefined relationship relative to the first experience modifier; and adjusting the base compensation premium based on the first experience modifier when the second experience modifier has the predefined relationship with the first experience modifier. In some implementations, these methods may further adjust the base compensation premium based on the second experience modifier when the second experience modifier does not have the predefined relationship with the first experience modifier. Additionally in some embodiments, the determining whether the experience modifier is associated with the first party comprises determining whether the first party is a licensed contractor. Some embodiments further generate a report designating the first experience modifier and the adjusted premium. The calculated premiums can be stored locally in a digital recording medium, printed as a record, otherwise stored and/or transferred over a medium for remote access and/or storage. Further, the stored, printed or otherwise recorded calculated premiums can additionally or alternatively be transferred to a third party agency, for example, over a distributed network or via mail or carrier service.

Additional embodiments provide methods for use in calculating premiums. These embodiments compare two experience modifiers; select one of the two modifiers based on the comparison; adjust a base premium by the selected one of the two experience modifiers; and define an adjusted premium. In some instances, the determined adjusted premiums can be stored locally in a digital recording medium, printed as a record, otherwise stored and/or transferred over a medium for remote access and/or storage. Further, the stored, printed or otherwise recorded calculated premiums can additionally or alternatively be transferred to a third party agency, for example, over a distributed network or via mail or carrier service.

Further embodiments provide methods of calculating a premium. These methods: identify a type of job performed; determine a risk factor associated with the type of job; determine whether a first experience modifier has a predefined relationship to a second experience modifier; adjust the risk factor by the first experience modifier when the predefined relationship exists; and apply the adjusted risk factor to a base premium and produce an adjusted premium. In some instances, the adjusted premiums can be stored locally in a digital recording medium, printed as a record, otherwise stored and/or transferred over a medium for remote access and/or storage. Further, the stored, printed or otherwise recorded calculated premiums can additionally or alternatively be transferred to a third party agency, for example, over a distributed network or via mail or carrier service.

Still other embodiments provide systems for use in determining premiums. Some of these systems comprise: a processor; computer readable medium communicationally coupled with the processor where the computer readable medium stores software when executed by the process causes the processor to: receive one or more work entries; identify a work entry; determine a payroll based on the work entry; retrieve a compensation rate based on the work entry; calculate a base premium as a function of the payroll and the compensation rate; retrieve a customer experience modifier assigned to the customer; retrieve a staffer experience modifier rate for an employee provider; calculate a modified premium comprising: modify the base premium by the staffer experience modifier rate when the staffer experience modifier rate is less than the customer modifier rate; and modify the base premium by the customer modifier rate when the customer modifier rate is less than the staffer experience modifier rate; and storing a report comprising the modified premium. In some implementations the software further causes the processor to: determine whether a customer is a licensed contractor, and implement the retrieving of the customer modifier assigned to the customer when the customer is a licensed contractor. Additionally or alternatively in some embodiments, the processor when determining the payroll further identifies a pay rate for the work entry, identifies a number of hours worked for the work entry, and multiplies the pay rate by the number of hours worked.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings.

FIG. 6 depicts a graphical representation of the staffer information UI according to some embodiments.

FIG. 8 shows a graphical representation of a user setup window according to some embodiments that is displayed in response to the selection of an add button displayed through the system UI of FIG. 7 while a user setup tab of the system UI of FIG. 7 is selected or highlighted.

FIG. 14 shows a graphical representation of a classification code entry window that is displayed in response to a selection of the add button.

FIG. 15 depicts a graphical representation of an example rate entry window according to some embodiments.

FIG. 17 shows an example graphical representation of a customer configuration window, according to some implementations, activated through the customer UI of FIG. 16.

FIG. 20 shows the customer site information window of FIG. 19 with the selection of an address tab such that a site address view is shown within the customer site information window.

FIG. 21 shows the customer site information window of FIG. 19 following the selection of a client letter list tab such that a client letter list view is shown within the customer information window.

FIG. 22 shows an example of a client letter window activated, for example, through the client letter list view of FIG. 21.

FIG. 27 shows a graphical representation of an experience modifier window according to some embodiments.

FIG. 29 shows the customer configuration window of FIG. 17 with a history view that is displayed following a detection of the selection of the history tab.

FIG. 31 shows an example of an employee information window according to some implementations.

FIG. 32 shows an employee configuration window with an accident history view displayed upon detection of a selection of the accident history tab.

FIG. 34 shows the employee configuration window with a claim advisory information view displayed upon detection of a selection of the claim advisory information tab.

FIG. 35 shows the employee configuration window with the claim clinic information view displayed upon detection of a selection of the clinic information tab.

FIG. 36 shows a simplified graphical representation of the work entry UI with a work entry table shown.

FIG. 37 shows a graphical representation of an example work entry window according to some implementations.

FIG. 42 depicts an example of at least portions of a contractor report according to some embodiments.

FIG. 43 depicts an example of at least portions of a non-contractor report according to some embodiments.

Figure 1:
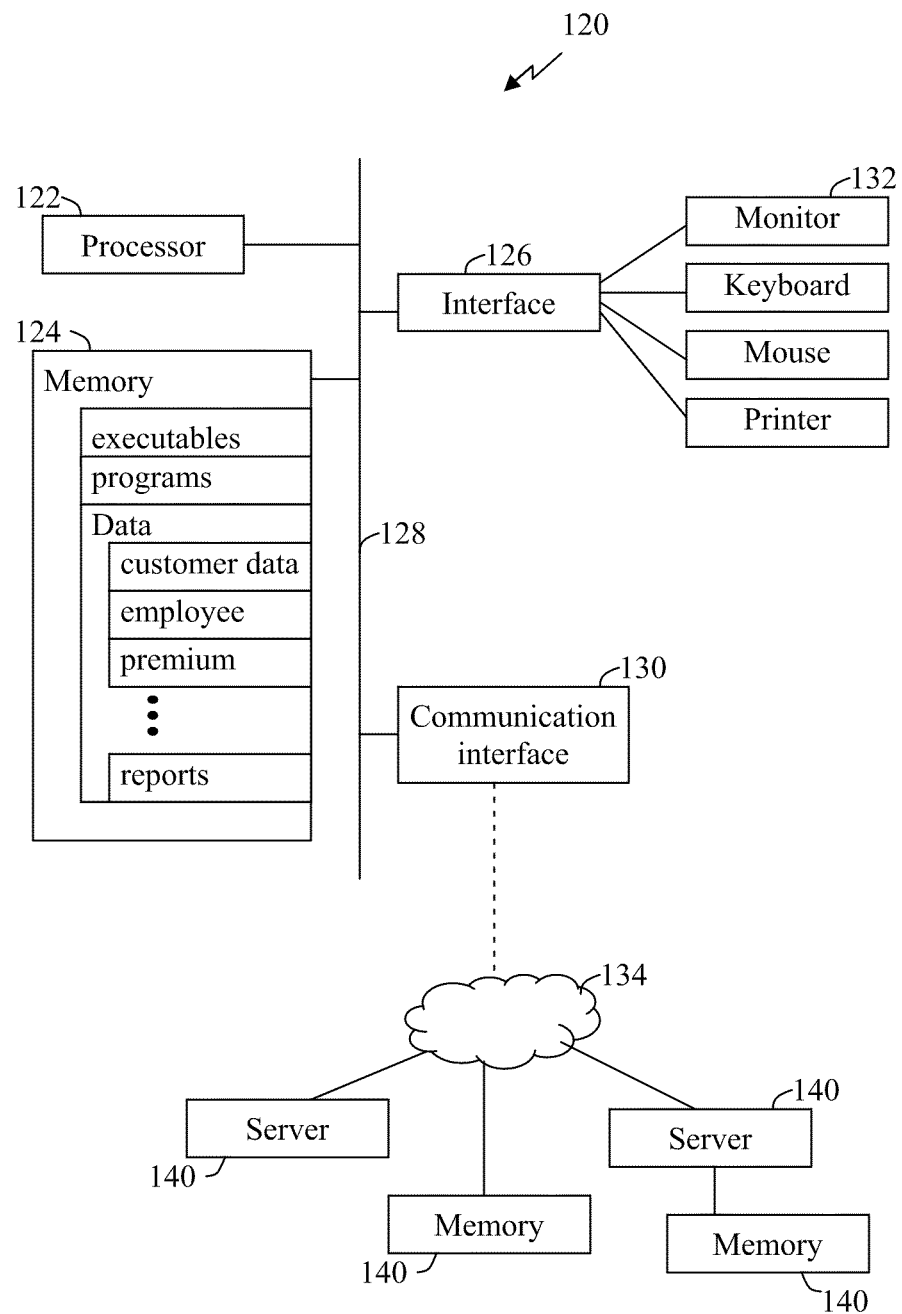
FIG. 1 depicts a simplified block diagram of a system according to some embodiments that at least in part determines and/or calculates worker's compensation premiums.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods, systems, interfaces and computer program products and/or databases stored on one or more computer readable medium for use in determining and/or calculating workers compensation premiums or other such premiums. Further, the determination and/or calculation of the compensation premiums is implemented in an attempt to reduce or minimize the premiums owed. In reducing the premiums, the determination and/or calculation(s) attempts to ensure that statutory and/or legal requirement are satisfied while minimizing premiums that are to be paid.

The calculation or determination of workers compensation premiums can depend on many factors. One of these factors can include an employer's history of past events, such as previous accidents, a number of compensation claims requested from employees of an employer, an employee's history, and other such factors. In the building construction and/or other industry(ies), workers compensation premiums are also often dependent on the type of work or jobs being performed. Work or jobs with higher risks of injury typically have higher premiums than work with lower risk. In some instances, base insurance premiums are defined for specific types of work or jobs being done and an employer is assigned a rating factor or experience modifier that is based on the employer's history and/or risk. The experience modifier (sometimes referred to as x-mod) is used to adjust the base premium to determine an employer's premium for the defined work or job. For example, when the employer is a high risk employer (e.g., an employer with a history of a relatively large number of job related injuries), the experience modifier typically is relatively high and as such the employers premium is greater than the base premium, while an employer that has lower risk may have a lower experience modifier that results in an employer premium that is less than the base premium.

Further in the construction industry and/or other industry (ies), it is common for employees to be employed by a staffing company or agency that supplies the employees to third parties to perform desired jobs or work for the third parties. These third parties are customers of the staffing company and temporarily utilize employees of the staffing company to complete jobs, such as installing wiring, installing plumbing, laying foundations, installing irrigation, framing buildings, welding and many other such jobs. In these instances, the staffing company is the employer and is often responsible for paying workers compensation premiums for each employee that is staffed to a customer. As such, the staffing company typically has an experience or rate modifier. Because staffing companies typically have large numbers of employees that are sent to numerous jobs at various locations and for various customers of the staffing company, there may be a higher number of accident incidents associated with the staffing company(ies) than companies with lower numbers of employees. As a result, the staffing companies may be a higher risk employer than many other employers, and therefore, may have a relatively high experience modifier. Alternatively, a construction company, for example, that only has very few employees and utilizes temporary employees supplied by the staffing company(ies) may have a history of far fewer compensation claims and or injured employees and as a result appears as a much lower risk. The lower risk can result in a relatively low experience modifier (or an experience modifier that might be lower than the staffing company from whom the contractor is receiving the temporary employees to complete the work), even though injuries to temporary employees might be associated with jobs the contractor is using the temporary employees to perform.

Because of this variation in experience modifiers, in some instances the staffing company can use the contractor's experience modifier in calculating workers compensation premiums the staffing company has to pay instead of applying the staffing company's experience modifier. This can result in significant savings to the staffing company because they can often reduce their premiums by using their customers' experience modifiers.

FIG. 1 depicts a simplified block diagram of a system 120 according to some embodiments that at least in part implements one or more applications that maintain one or more data stores or databases of customer information, employee information, workers compensation information, and/or other relevant information, determines and/or calculate worker's compensation premiums, maintains records of employee injuries and/or accidents and the like. Further in some instances, the system identifies those instances where a staffing company can utilize a customer's experience modifier and whether it is more beneficial to use the staffing company's experience modifier or a customer's experience modifier. The accurate selection between the experience modifiers can reduce the compensation premiums that are due from a staffing company. Furthermore, in some embodiments, the system provides records and reports that can be used in auditing insurance premiums. The system can include a controller or processor 122, memory 124, one or more interfaces 126, and one or more communication paths 128 (e.g., internal bus, network, etc.). One or more communication interfaces or ports 130 can additionally or alternatively be included. In some embodiments, the system is implemented in part through a computer. A monitor or display 132 is included in the system to display information, graphics and/or the like.

The below discussion provides a general description of an exemplary computing environment 120 that can be employed to implement some embodiments. While some embodiments have been described above in the general context of computer-executable instructions that may run on one or more computers, those skilled in the art will recognize that embodiments can also be implemented in hardware and software combinations and/or combinations with other program modules. Program modules can include, for example, routines, programs, components, data structures, and the like that perform particular tasks or implement particular abstract data types. Further, some embodiments can be implemented through additional or other computer system configurations, including single-processor or multiprocessor computer systems, minicomputers, mainframe computers, personal computers, hand-held computing devices, microprocessor-based or programmable consumer electronics, and the like, each of which can be operatively coupled to one or more associated devices. Furthermore, some embodiments may optionally employ and/or be implemented through distributed computing environments where certain tasks are performed by remote processing devices that are linked through a distributed and/or communications network 134. In a distributed computing environment, program modules can be located in both local and remote memory storage devices.

The controller or processor(s) 122 can be substantially any processing device configured to access memory, retrieve data, perform calculations relative to that data and to store results and/or display results in accordance with the calculations performed. For example, the controller 122 can be implemented through one or more microprocessors, multi-processor architectures and/or other such processing devices configured to perform computational calculations, implement code, generate user interfaces, digital signal processing and the like. The communication path(s) 128 couples system components including, but not limited to, the memory 124 to the processor or processing unit 122. Further, the communication path can be substantially any of several types of communication structures that may further interconnect the components, such as a memory bus (with or without a memory controller), a peripheral bus, and a local bus.

The memory 124 of the system 120 can include a variety of computer-readable media accessed by the processor 122 and/or other components, such as volatile and nonvolatile media, removable and non-removable media for substantially any method or technology of storage of information such as computer readable instructions, data structures, program modules or other data. For example, the memory can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer. Additionally or alternatively, the memory can include one or ore internal hard disk drives (HDD) (e.g., EIDE, SATA), which internal hard disk drive may also be configured for external use in a suitable chassis, a magnetic floppy disk drive (FDD) and/or optical disk drive(s) (e.g., CD-ROM, DVD, etc.). A hard disk drive, magnetic disk drive and/or optical disk drive can be connected with the communication path 128 by interfaces. The communication interface and/or ports 130 can include external drive implementations including, such as Universal Serial Bus (USB), IEEE 1394 interface technologies, and the like. The memory can store executables, applications, programs, software, data and the like.

A user can enter commands and information into the system 120 through one or more wired/wireless input devices coupled with the interfaces 126 and/or communication interfaces 130, e.g., a display, a keyboard, and a pointing device (such as a mouse, stylist, and/or other such pointing devices), printer and other devices. Other input devices (not shown) may include a microphone, an IR remote control, a joystick, a game pad, touch screen, or the like. The interfaces 126, 130 can include, for example, parallel ports, IEEE 1394 serial ports, game ports, USB ports, IR interface, etc.

The display or monitor 132 or other type of display device is also included and/or connected with the system. In some instances, the display is connected through an interface, such as a video adapter 846. Other peripheral devices can also be coupled with the interfaces, such as speakers, printers, and other such devices.

Further in some embodiments, the system 120 can optionally operate in a networked environment through the communication interfaces 130 over one or more networks 134 through logical connections such as wired and/or wireless communications to one or more remote devices 140. The remote devices can be workstations, servers, routers, personal computers, portable computers, microprocessor-based entertainment appliances, peer devices, memory, databases or other network nodes. The connections with and/or through the network 134 can include wired/wireless connectivity, and the network can include a local area network (LAN) and/or larger networks, e.g., a wide area network (WAN) and/or the Internet.

The system 120 is operable to communicate with wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with conventional network or simply an ad hoc communication between at least two devices.

The system 120 is employed at least in part to allow a user to maintain data bases, track employees and/or customers, determine workers compensation premiums to be paid, and in some instances attempts to determine minimum premiums that should be paid while still meeting legal requirements, generate reports regarding database activity and/or premiums and/or other functions and capabilities.

Figure 2:
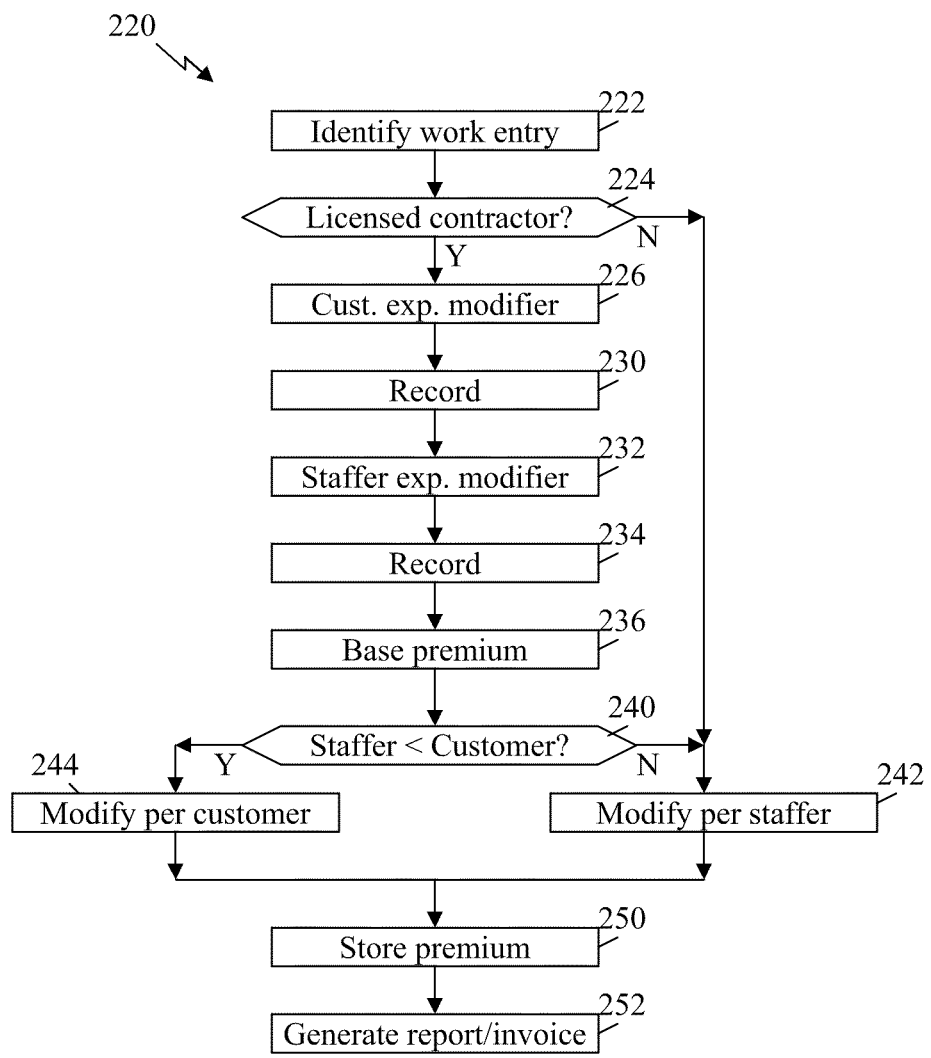
FIG. 2 depicts a simplified flow diagram of a process according to some embodiments that is used in determining a workers compensation premium that is to be paid.

FIG. 2 depicts a simplified flow diagram of a process 220 according to some embodiments that is used in determining a workers compensation premium that is to be paid. In step 222, a work entry is identified. The work entry is data identifying work performed by an employee such as an employee supplied by a staffing company to a customer and the hours worked. Further, the work entry includes and/or is associated with a workers compensation base premium. In step 224, the process determines whether the customer that utilized the employee to perform the identified work is a licensed contractor and/or whether the customer has been assigned an experience modifier. When a customer is a licensed contractor, the contractor often has been assigned an experience modifier. Typically, the experience modifier is assigned by a third party agency, such as a governmental agency, an insurance provider or other such third party. When the customer is not a licensed contractor and/or is not assigned an experience modifier, the process skips to step 242. Alternatively, when the customer is a licensed contractor and/or has been assigned an experience modifier step 226 is entered.

In step 226, the experience modifier for the customer is retrieved from local memory 124 and/or remote memory 140. This experience modifier may be supplied by the customer, from a third party, from a publication, accessed over the distributed network 134, and/or supplied through other sources. In step 230, the customer experience modifier is recorded and associated with the customer. In step 232, a staffer experience modifier for a staffing company supplying employees to customers is retrieved. Again, the staffer experience modifier can be supplied by one or more of the sources described above or other similar sources. In step 234, the staffer experience modifier is recorded and associated with the staffing company.

In step 236, a base compensation premium is retrieved and/or calculated according to the work entry performed for the customer. In step 240, it is determined whether the staffer experience modifier has a predefined relationship relative to the customer experience modifier. In some implementations, the predefined relationship exists when the staffer experience modifier is less than the customer experience modifier. When the predefined relationship exist, step 242 is entered where the base premium is modified based on the staffer experience modifier. Similarly, when the customer is not a licensed contractor step 242 is entered and the base premium is modified by the staffer's experience modifier. When it is determined in step 240 that the predefined relationship does not exist, the process continues to step 244 and the base premium is modified based on the customer experience modifier.

The base premium in some instances is determined based the job to be performed. Further, the base premium can be dependent on the amount of time an employee spends working on a job. For example, a risk factor can be assigned based on the job to be performed. Typically, this risk factor is determined by a third party as described above (e.g., a governmental agency, an insurance provider or other such third party), which in some instances can be defined according to one or more actuation tables generated based on historic compensation claims associated with the job performed. This risk factor can then be multiplied by the number of hours an employee works at the designated job to calculate the base premium that can be used in the process 220. In step 250, the premium to be paid as calculated in steps 242 and/or 244 is stored. In step 252, a report and/or invoice is generated that can be used by the staffing company to pay the premium(s).

In some instances, the experience modifier is limited, does not apply or a staffing company is not issued an experience modifier until a fixed or predefined amount of premium is paid or is to be paid. For example, there may be a fixed minimum amount that is to be paid (e.g., $2500) before an experience modifier is issued. It is noted, however, that in instances where a staffer supplies an employee to perform work that does not qualify under the state or local laws and/or under the classification codes, such as a receptionist, a secretary and/or other such jobs the staffing company typically cannot use the customer's experience modifier and instead may have to use the staffing company's experience modifier when applicable.

Figure 3:
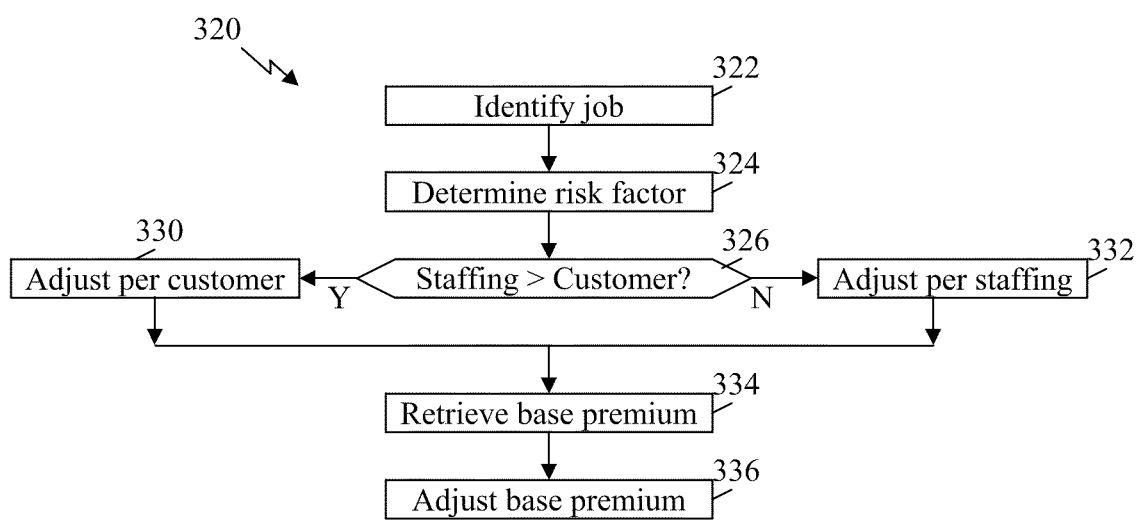
FIG. 3 depicts an additional or alternative process for use in determining a workers compensation premium to be paid according to some embodiments.

FIG. 3 depicts an additional or alternative process 320 for use in determining a workers compensation premium to be paid by a staffing company that supplies an employee to a customer according to some embodiments. In step 322, the job performed is identified. In step 324, a risk factor is determined based on the job performed as identified in step 322. In step 326, it is determined wither a predefined relationship exists between a staffing company's experience modifier and a customer's experience modifier. For example, the relationship can be defined by the customer's experience modifier being less than the staffing company's experience modifier.

When the predefined relationship exists, step 330 is entered where the risk factor is adjusted or altered based on the customer's experience modifier. Alternatively when the predefined relationship does not exist, the process proceeds to step 332 where the risk factor is adjusted based on the staffing company's experience modifier. In step 334, a base premium for the job performed is identified. This premium can be supplied by the insurance provided, by a governmental agency and/or other sources. In step 336 data is transformed to calculate and/or adjust the base premium based on the adjusted risk factor determined. Typically, the adjusted base premium is recorded on the computer readable medium, and in some instances is displayed to the user through a report and/or on the monitor 132. Additionally and/or alternatively, the adjusted base premium can be transmitted to a remote computer readable storage medium and/or to a third party, such as an agency that monitors premium payments.

The system 120 in some implementations includes and/or generates, and displays a user interface UI that allows a user at least in part to enter data, retrieve data and determine premiums to be paid. Further, the system maintains one or more databases to calculate and track workers compensation premiums. Additionally, some embodiments generate reports and/or invoices that can be used in paying premiums.

Figure 4:
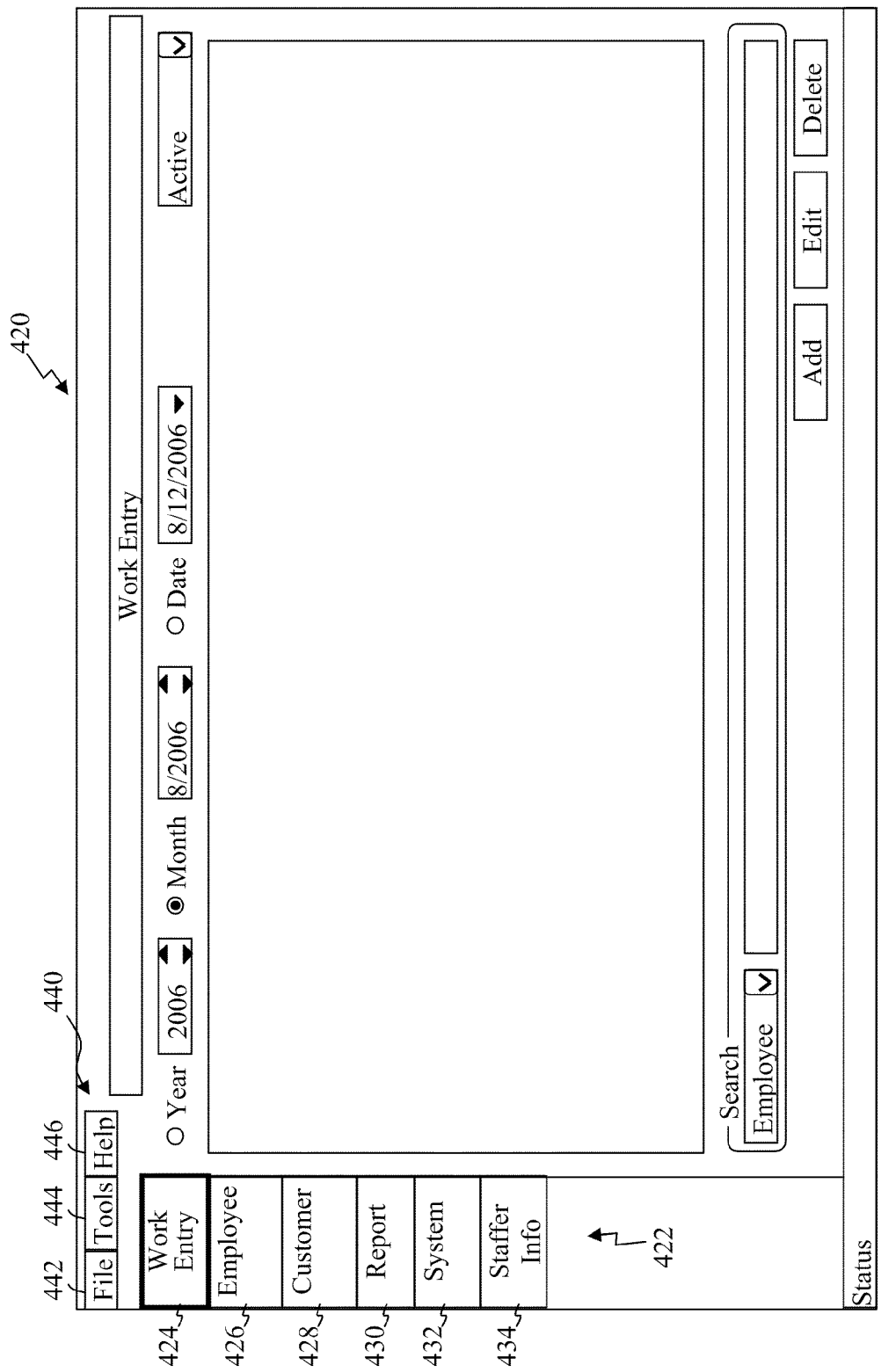
FIG. 4 depicts a simplified graphical representation of a main application and/or graphical user interface (UI) according to some embodiments.

FIG. 4 depicts a simplified graphical representation of a main application and/or graphical user interface (UI) 420 according to some embodiments. This main UI 420, for example, is displayed at start up of the system and/or an application 120 and allows a user to navigate through the available options features provide through some embodiments, enter data, retrieve data (e.g., employee information, customer information, reports, and/or other data), and determine premiums. The main UI 420 is generated and displayed on a monitor 132 and includes a set of main control options or buttons 422. In this embodiment, the main control, option, selection buttons include a work entry button 424, an employee button 426, a customer button 428, a reports button 430, a systems button 432 and a staffer or company information button 434. The main UI 420 can optionally further include a general menu or main tool bar 440 with one or more buttons or options such as a file button 442, a tool button 444, a help button 446 and/or other such buttons. The buttons or options of the UI can be selected using a keyboard, mouse, stylist or the like. The main control buttons 422 allows users to access further UIs to enter and/or obtain data.

Figure 5:
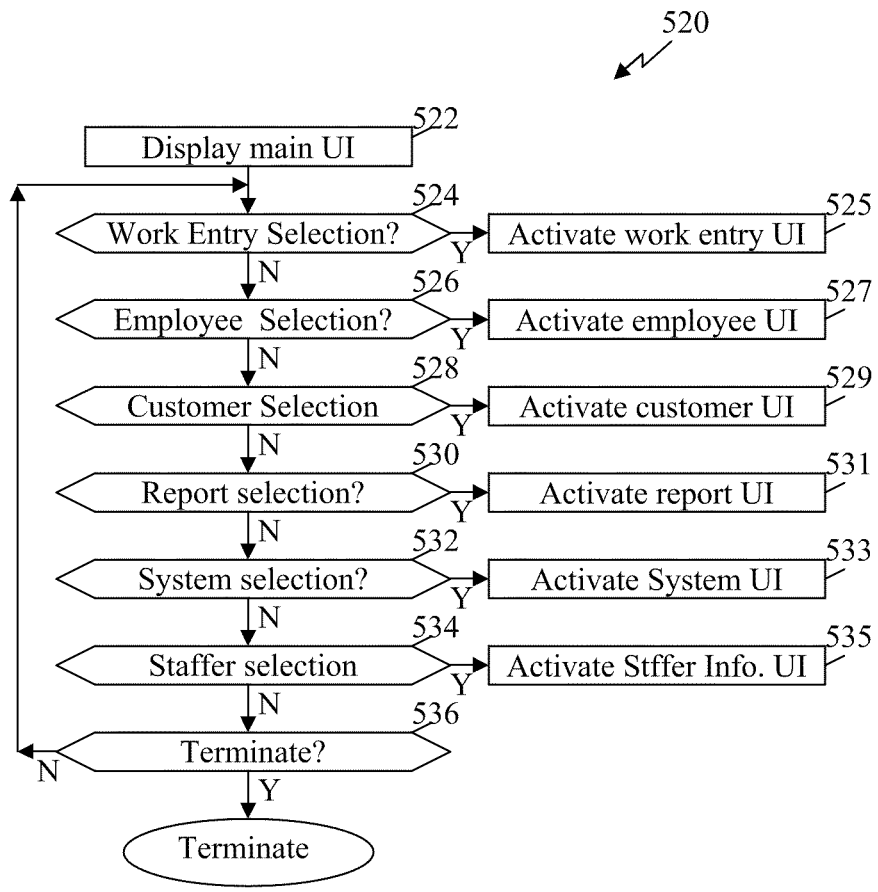
FIG. 5 depicts a simplified flow diagram of a process that is employed in some embodiments upon the activation of the main UI.

FIG. 5 depicts a simplified flow diagram of a process 520 that is employed in some embodiments upon the activation of the main UI 420. In step 522, the process generates and displays the main UI 420. In step 524, it is determined whether a work entry selection was received (e.g., the selection by a user of the work entry button 424). When a work entry selection is not received, the process continues to step 526 where it is determined whether an employee selection was received (e.g., detecting the selection of the employee button 426). Step 528 is entered when an employee selection is not received to determine whether a customer selection is received. When a customer selection is not received, step 530 is entered to determine whether a report selection is detected. The process continues to step 532 when a report selection is not detected to determine whether a system selection is received. When a system selection is not detected the process continues to step 534 to determine whether a staffer information selection is received. When a staffer information selection is not received step 536 is entered to determine whether to shut down the main UI 420. When it is determined that the main UI is to be shut down (e.g., detecting a selection of an exit command) the process 520 terminates. Alternatively, the process returns to step 524. When it is determined in one of steps 524, 526, 528, 530, 532, 534 and 536 that a selection is detected, the process continues to one of steps 525 to activate a work entry UI process, 527 to activate an employee UI process, 529 to activate a customer UI process, 531 to activate a report UI process, 533 to activate a system UI process, or 535 to activate a staffer information UI process, respectively. It is noted that the processes described above and further elaborated below may be varied, such as the steps can be performed in different sequences and/or steps may be skipped or deleted.

The staffer information button 434 activates the staffer information process that in part generates and causes to be displayed a staffer information UI. FIG. 6 depicts a graphical representation of the staffer information UI 620 according to some embodiments. The staffer information UI provides parameters and associated fields relative to the staffing company utilizing the system 120 and/or applications to, in part, incorporate and utilize temporary employee's contact information, work histories and other data; customer contact information, job sites, experience modifiers and other data; and/or to determine workers compensation premiums to be paid.

The staffer information UI 620 includes one or more fields such as a staffing company employee field 622, address field 624, contact field 626 and/or other such fields relative to the staffing company. The fields can include one or more parameters with entry lines into which a user can enter data (e.g., through a keyboard or other device). These parameters can include, but are not limited to, a company ID, a company name, a contact person, a branch or office, an insurance policy number, address information (number and street, city, state, zip code), phone number, fax number, cellular number, email, website, and/or other such parameters. These parameters, in part, identify the company, association and/or individual using the system and/or application(s) such as a staffing company. The staffer information UI further includes an accept or enter button 630 that when selected causes the data to be stored (e.g., stored in memory 124 and/or in a remote memory 140). Additionally in some instances a cancel, exit or back button 632 can be included to exit out of the staffer information process and cause the staffer information UI to be closed, typically without saving changes made within the entry lines.

In some implementations, upon a detection of the selection of the accept button 630, the staffer information process determines whether data has been entered by a user in one or more predefined or required entry lines. When data has not been entered into one or more predefined entry lines, the staffer information UI 620 is adjusted to identify one or more of those predefined entry lines where data has yet to be entered. For example, one or more parameters can be highlighted, a mark can be displayed by one or more parameters, or other such identifications.

Figure 7:
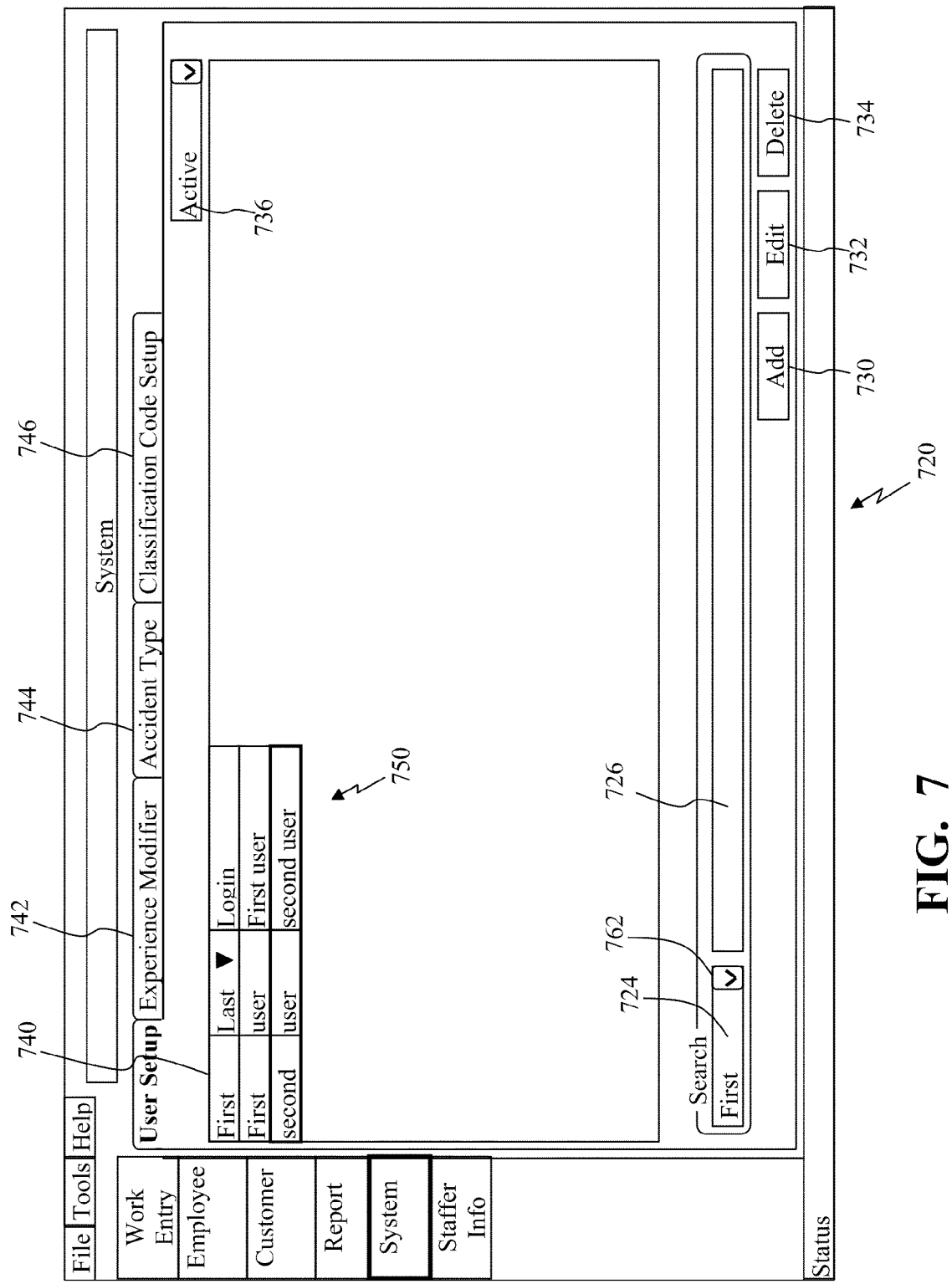
FIG. 7 depicts an example graphical representation of a system UI that is generated and displayed by a system UI process according to some embodiments in response to a detection of a selection of a system button of the UI of FIG. 4.

FIG. 7 depicts an example graphical representation of a system UI 720 that is generated and displayed by a system UI process according to some embodiments in response to a detection of a selection of the system button 432. The system UI 720 includes a plurality of fields, sub-windows or tabs 722. The system UI provides a user with an ability to define operating parameters, add or delete users authorized to utilize the system and/or application(s) 120, enter codes and/or data utilized in accordance with other UIs and/or when determining premiums, and other capabilities.

Each of the plurality of tabs 722, when selected, cause the system UI process to transition the system UI to display one or more fields within the system UI associated with the selected tab. The displayed fields can be displayed as a separate window, displayed within the system UI appearing as being positioned over other fields and/or other such displayed configurations. The tabs 722 within the system UI 720 can include a user setup tab 740, an experience and/or experience modifier tab 742, an accident type tab 744, a classification code setup tab 746 and/or other relevant tabs.

When the user setup tab 740 is selected, as show in FIG. 7, an authorized user list 750 is displayed listing authorized users of the system, along with a search parameter 724 and search entry line 726, an add button 730, an edit button 732, a delete button 734 and in some implementations an active indicator 736. The users in the authorized user list can be identified by name, nickname, acronym, an identification (e.g., ID number) and/or the like. Further, a user's level of access within the system and/or application(s) 120 can be defined (e.g., admin, staff, etc.). Other parameters and information can additionally or alternatively be displayed, such as password (depending on which user is currently viewing the system UI and that user's level of access), time using the system and/or other such data. Some embodiments allow the authorized user list 750 to be sorted by selecting one of the available parameter indicators, and in some instances the sorting can toggle between ascending and descending order, for example, depending on a number of times a parameter field indicator is selected with a sort indicator identifying the sort parameter and whether the sorting is ascending or descending.

The search field or parameter 724 allows a user to search the list of users 750 for a desired user. In some implementations, the search parameter can include a pull down menu 762 that allows a user to select from a plurality of search parameters, such as last name, first name, login and/or other such search parameters. The search parameter entry line 726 allows the user to enter an alphanumeric search string that is used to search the authorized user list 750. The active indicator 736 allows a user to designate whether the authorized user list 750 displays users that are defined as active users or to display users that are defined as inactive users.

Further while the user setup tab 740 is active, the add button 730 causes the system UI process to generate and display additional fields and/or a separate window with additional fields to allow a new user to be defined and provided with access to use the system and application 120. FIG. 8 shows a graphical representation of a user setup window 820 according to some embodiments that is displayed in response to the selection of the add button 730 of the system UI 720 while the user setup tab 740 is selected or highlighted. The user setup window can include one or more fields, parameters and/or conditions. In some implementations, the user setup window 820 includes a name field 822, a login field 824, a user information field 826 and/or other fields. An accept button 830 and a cancel button 832 can be included to accept and store entered data or close the user setup window 820, respectively. An active indicator 834 can also be included.

The name field 822 can include name parameters such as first, middle and last name parameters with corresponding entry lines. Similarly, the login field 824 can include parameters such as login name, password, a confirmation of the password and other such parameters with corresponding entry lines; and the user information field 826 can include a role or user type, a user ID and/or other relevant parameters and corresponding entry lines. The role or user type can define a user's level of access within and use of the system 120. In some instances, the entry line associated with the role type can include a pull down menu that displays some or all of the available options that can populate the role type entry line (e.g., basic, staff, administrator, manager, and/or other such levels). Each user type defines different levels of access to enter data, information and/or parameters, and to the information provided through the present embodiments. The embodiments described below are described generally. It is noted, however, that some functions and/or access to information may not be available to all users and instead may be limited to users depending on their defined user types and the level of access associated with that user types.

The active indicator 834 allows a user adding the new user (or editing a user's information) to toggle the new user's status as an active user with capabilities to use the system 120, or an inactive user (for example, such that the user cannot utilize the system). As described above, the designation of whether a user is an active user or an inactive user can dictate whether the user is displayed in the authorized user list 750 depending on a state of the active indicator 736.

Referring back to FIG. 7, while the system UI 720 is displayed and the user setup tab 740 is selected, a user can select a user from the list of users 750 and edit the user's information. By selecting the edit button 732 the user information window 820 is displayed, when a current user has the authority to edit a selected user's information, to allow the line entries and/or active status to be altered. Similarly, a user with sufficient level of authorization within the system 120 can delete a user from the authorized user list 750 by highlighting or selecting the user in the authorized user list and selecting the delete button 734 while the user setup tab 740 is selected. In some instances, a confirmation pop-up window is generated and displayed requesting the user to confirm the deletion of the selected user. The selection of a user can be implemented using arrow keys of a keyboard, movement of a pointing device and/or other such selections. In some embodiments, the user data is not actually deleted, but instead the status of the user is changed from active to inactive.

Figure 9:
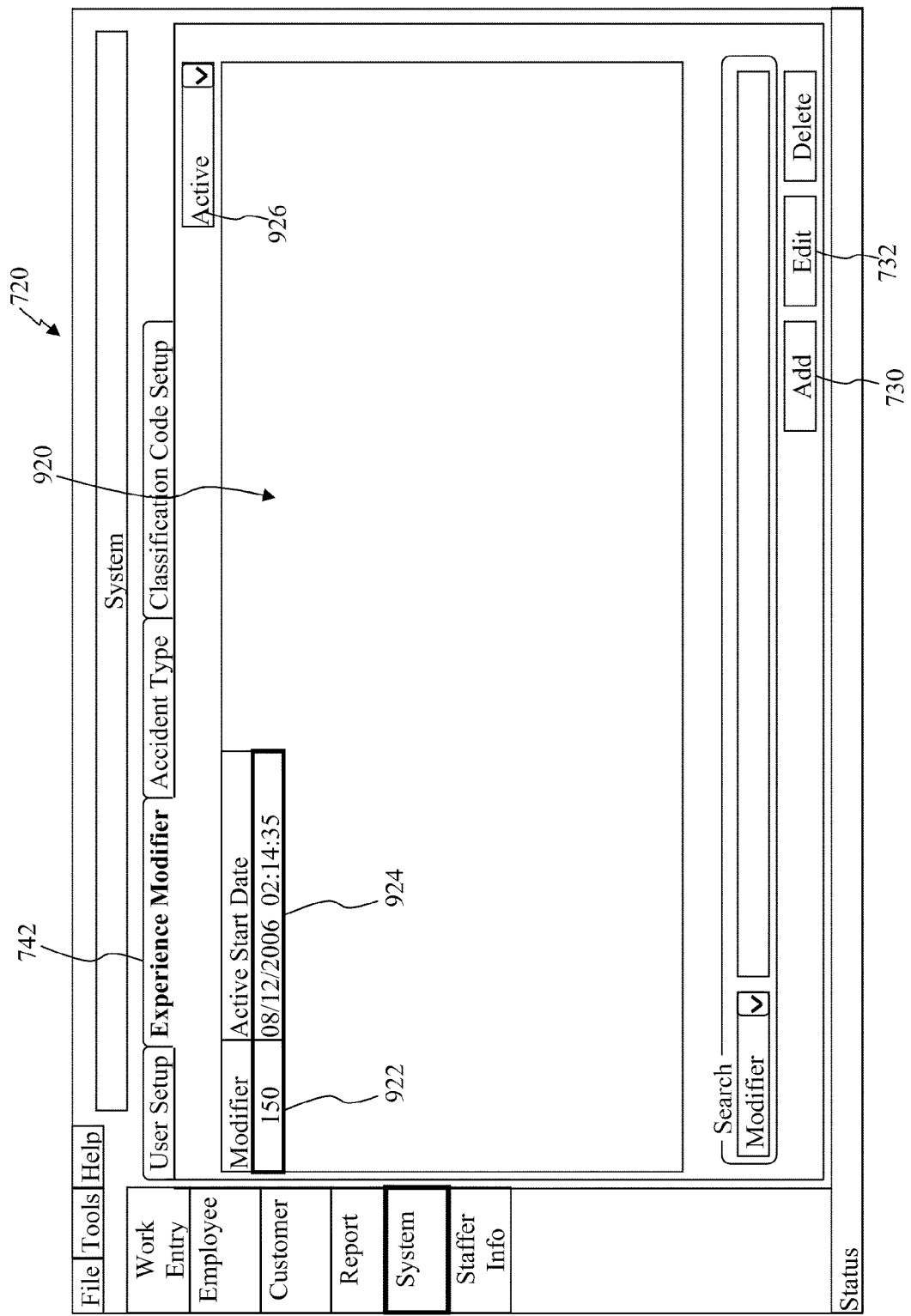
FIG. 9 shows a graphical representation of the system UI of FIG. 7 with the experience modifier tab selected such that an experience modifier view is shown within the system UI.

FIG. 9 shows a graphical representation of the system UI 720 with the experience modifier tab 742 selected such that an experience modifier view 920 is shown within the system UI. The experience modifier tab causes one or more experience modifier values 922 to be displayed. In some implementations, an active indictor 926 is further included in the experience modifier view that dictates whether the listed experience modifier values 922 are active experience modifiers or inactive experience modifiers. Further, an activation date 924 of when that experience modifier value is applied can additionally be displayed. It is not uncommon for a company's experience modifier to vary over time. As such, the experience modifier tab 742 allows a user to alter the experience modifier value 922 as the experience modifier changes. By selecting the add button 730 or edit button 732 an experience modifier window is displayed. In some embodiments, the experience modifier value can be retrieved from a remote source. These values can be compared with values identified in the listed modifier values to determine whether one or more values have changed and to incorporate those changes when identified. Further, some embodiments, periodically access the remote source to retrieve desired experience modifiers and compare retrieved values with listed values. Further, the date allows reports to be generated while applying appropriate modifier values for the dates of interest for the reports.

Figure 10:
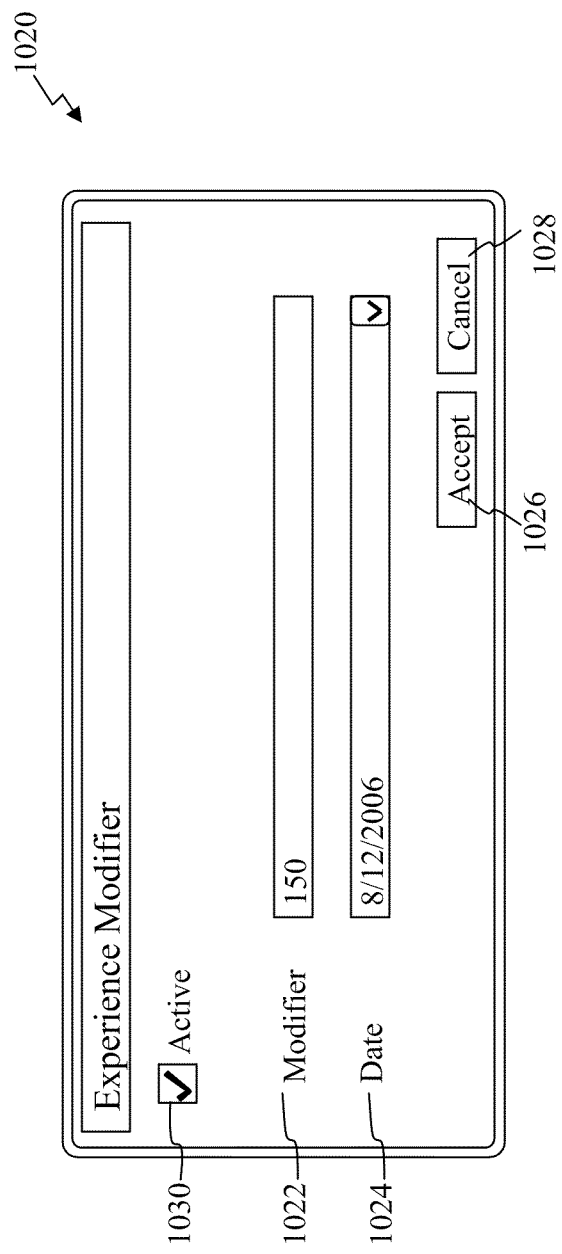
FIG. 10 shows an example of an experience modifier window, according to some embodiments.

FIG. 10 shows an example of an experience modifier window 1020 according to some embodiments. The experience modifier window includes an experience modifier parameter 1022, an application date parameter 1024 and corresponding entry lines. Accept and cancel buttons 1026 and 1028, respectively, are also provided to accept or decline changes, and an active indicator toggle 1030 can be displayed. A user can enter or change the modifier value through the modifier parameter 1022. Further, the active indicator 1030 allows a user to designate or change the status of an experience modifier between an active state and an inactive state dictating whether and/or to which jobs the experience modifier(s) can be utilized in calculations. The active or inactive indication can, in some instances, further affect when these modifier values are displayed in the experience modifier view 922. As described above and more fully below, an experience modifier for customers and/or the staffing company can change over time. Often an experience modifier is valid over a limited time period and is updated on occasion, for example, by the insurance provider. Because of this, the user can enter the changed modifier values as they are issued. The previously entered modifiers become inactive from the date of entry and/or a date designated by the third party providing the experience modifier. Previous experience modifiers, however, are still valid for those time periods designated and can still be utilized in determining premiums and other calculations. For example, a first experience modifier value of 140 can be entered into the experience modifier parameter 1022 with an effective date of Jan. 1, 2005 entered into the application date parameter 1024. A subsequent experience modifier value of 150 can later be entered into the experience modifier parameter 1022 with an effective date of Jun. 1, 2005 entered into the application date parameter 1024. The first experience modifier value of 140 typically is invalid for calculations relating to jobs performed after Jun. 1, 2005 and instead the second experience modifier value of 150 is applied. However, the first experience modifier value of 140 is still applicable when used in performing calculations and/or determining premiums for those jobs staffed between Jan. 1, 2005 and May 31, 2005. Therefore, the experience modifier is still valid for applicable dates and typically invalid for dates outside the designated time periods.

Figure 11:
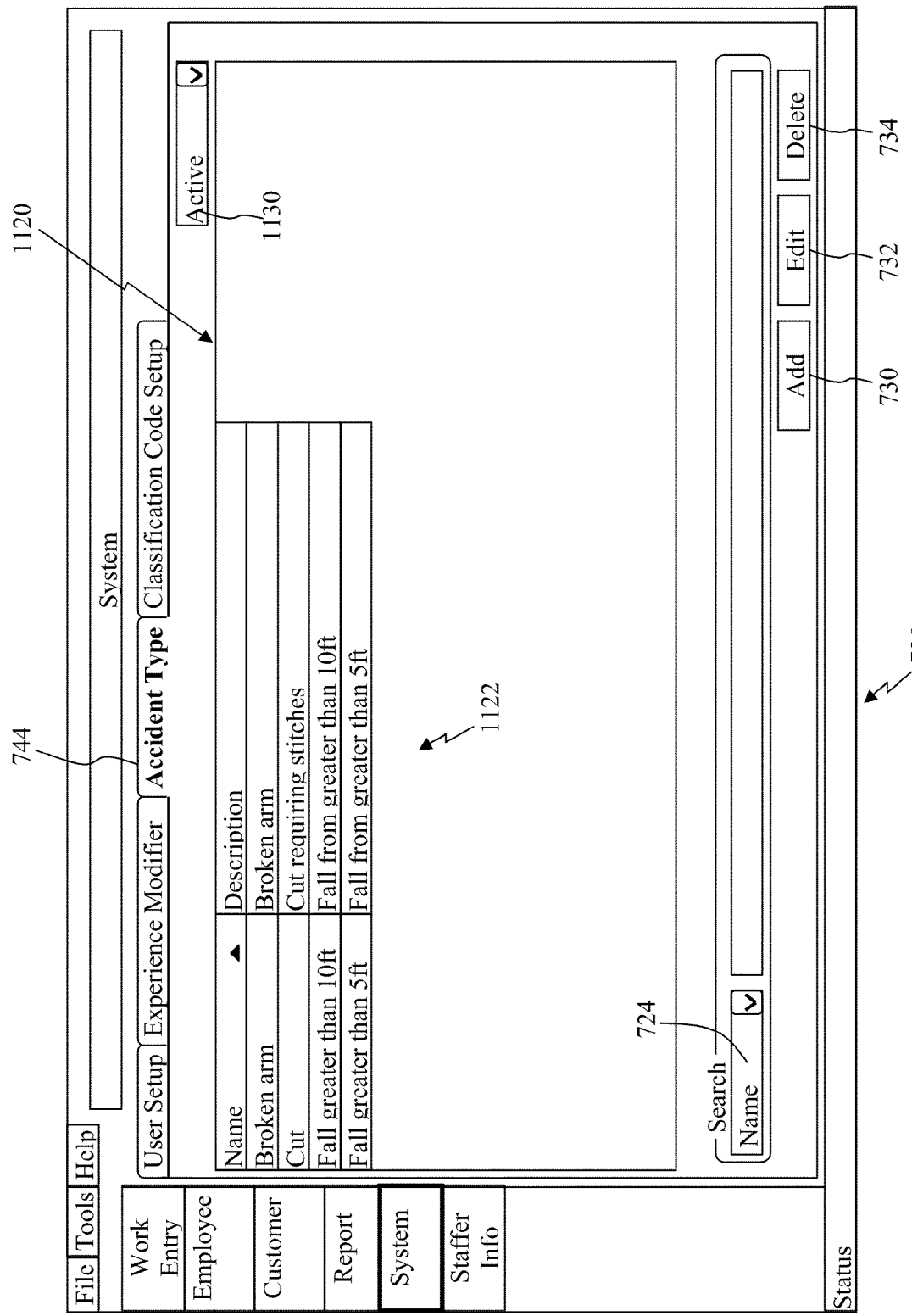
FIG. 11 shows a graphical representation of the system UI of FIG. 7 with the accident type tab selected such that an accident type view is shown within the system UI.

FIG. 11 shows a graphical representation of the system UI 720 with the accident type tab 744 selected such that an accident type view 1120 is shown within the system UI. The accident type view shows a listing of types of accidents 1122 defined within the system, such as "fall from less than 5 feet", "fall from above 5 feet", "electric shock", "collision", and other such accident types. These accident types can be based on one or more standards lists, user created and defined, and/or other sources. In some implementations, one or more accident types can be downloaded from sources over the network 134, retrieved from a removable medium and/or from other sources, and stored. These accident types are utilized at least in part with employee data as described fully below. In some embodiments, the accident type list 1122 includes a name of an accident type, a description of the accident type and/or other details. A search parameter 724 is displayed in some embodiments, allowing a user to search for a desired accident type (e.g., using one or more search terms and/or phrases). An active indicator toggle 1130 can be included dictating whether the listing of the types of accidents 1122 displays active accident types or inactive accident types.

Figure 12:
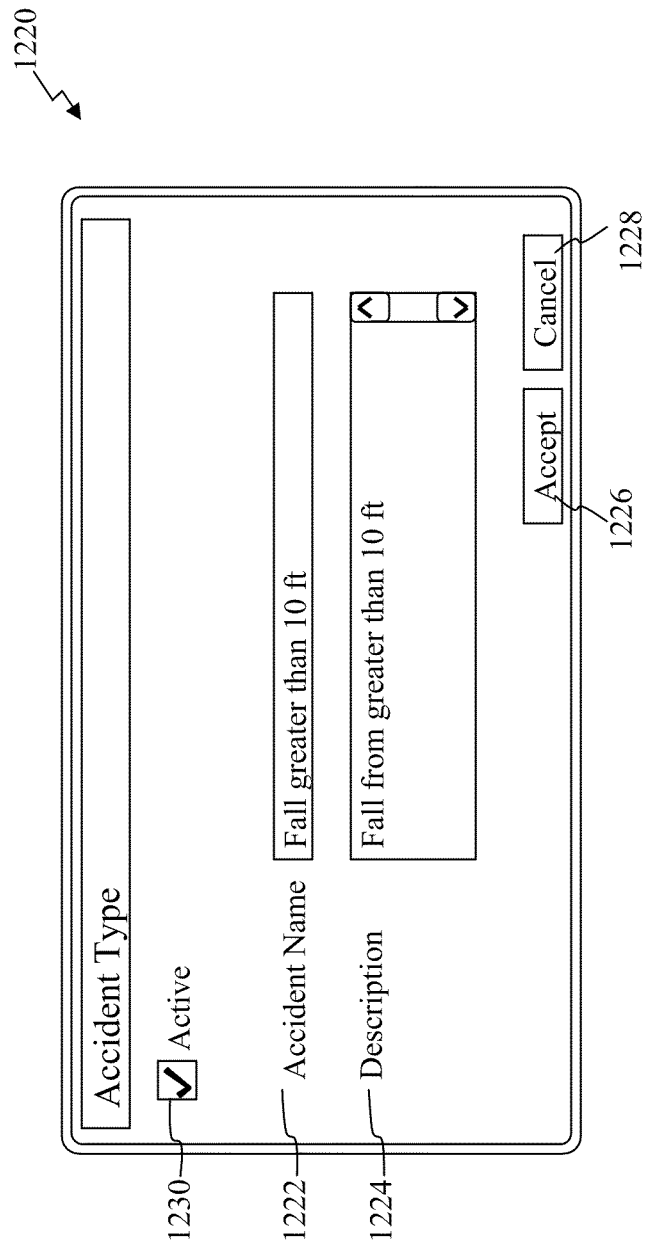
FIG. 12 shows a graphical representation of an example accident type entry window that is displayed in response to a selection of an add button and/or an edit button while the accident type tab is selected.

FIG. 12 shows a graphical representation of an example accident type entry window 1220 that is displayed in response to the add button 730 and/or edit button 732 being selected while the accident type tab 744 is selected. The accident type entry window 1220 includes an accident name parameter 1222, a description parameter 1224 and corresponding entry lines, an accept button 1226, a cancel button 1228, and in some embodiments includes an active indicator or toggle 1230. The accident name parameter 1222 and/or description parameter 1224 can be populated by a user typing text using a keyboard, filled in by downloading accident type information and/or other such methods. Upon selection of the accept button 1226, the data is stored, and the system returns to displaying the system UI 720. Alternatively, when the cancel button 1228 is selected, the accident type entry window 1220 is closed without saving data or changes, and returns to the system UI 720. The active indicator toggle 1230 allows a user to define or change a status of an accident type form active to inactive.

Figure 13:
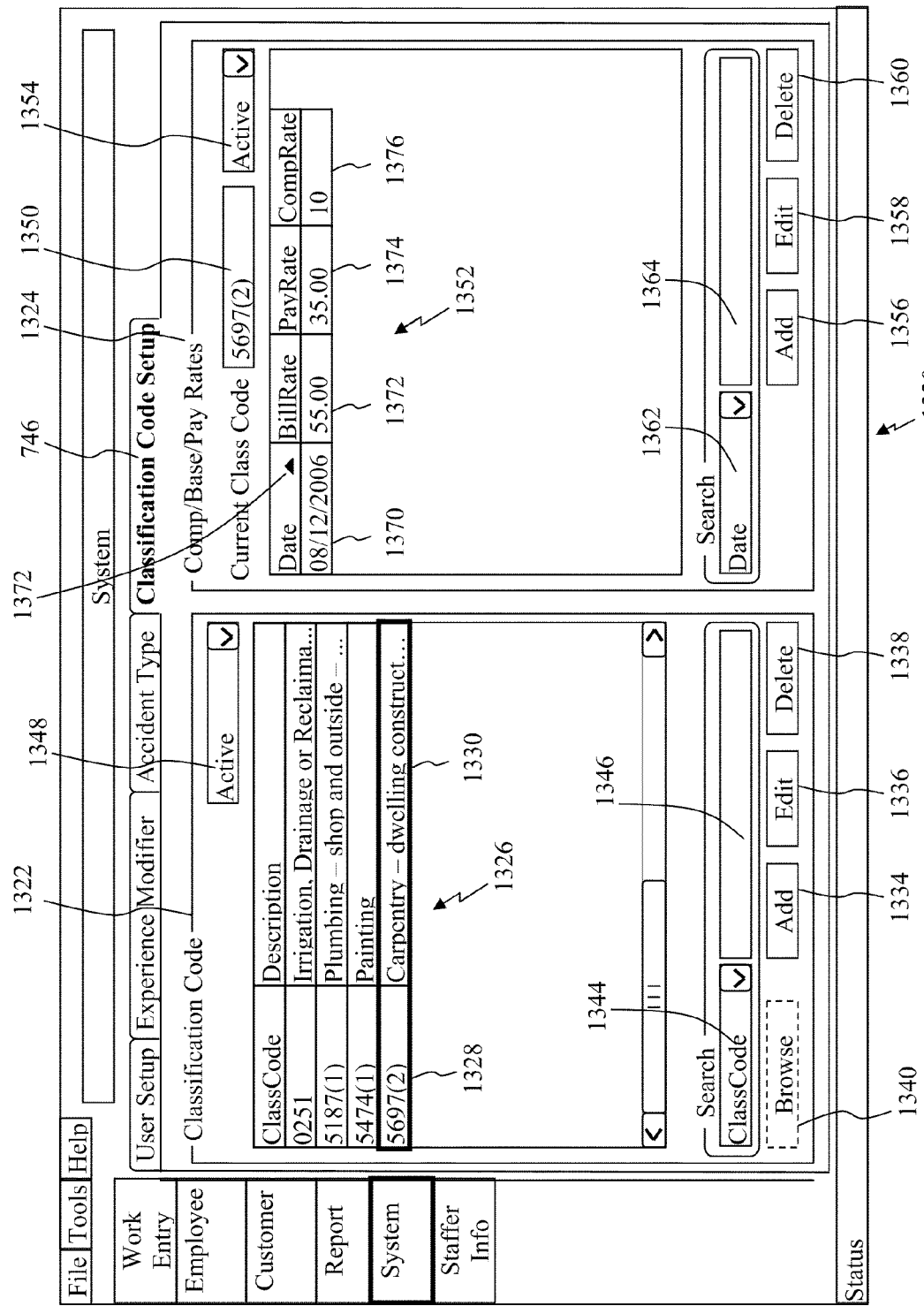
FIG. 13 shows a graphical representation of the system UI of FIG. 7 with the classification code setup tab selected such that a classification code setup view is shown within the system UI.

FIG. 13 shows a graphical representation of the system UI 720 with the classification code setup tab 746 selected such that a classification code setup view 1320 is shown within the system UI. The classification code setup view 1320 allows users to enter one or more classification codes defining one or more job types to which an employee may be hired out to perform and/or to define billing and/or pay rates relative to a selected classification code. Again, a classification code defines a type of job to be performed by an employee, such as digging ditches, plumbing (shop and outside), electrical wiring (dwelling), carpentry (dwelling), and/or other such job types. In some instances, job types can be defined based on one or more published classification codes published by one or more third party agencies that include a classification number for each described job type and in some instances be very precise regarding the type of work defined. These published classification codes can be entered manually, incorporated into the system 120, downloaded from over the distributed network 134, accessed from over the distributed network, retrieved from one or more removable medium (e.g., CD or DVD) and/or other such methods. For example, one or more published classification codes can be downloaded from a remote storage, stored in local memory 124 and referenced by the system 120 as needed. Further, classification codes can be associated with rates of pay, charges to customers, insurance premium calculations and/or other parameters as described above and further below.

The classification code setup view 1320 can include one or more fields, such as a classification code field 1322, a rates field 1324 and/or other such fields. The classification code field 1322 includes a classification code listing or table 1326 of entered, incorporated and/or accessed classification codes that provide parameters such as classification code numbers 1328 and corresponding classification code job descriptions 1330. An add button 1334, an edit button 1336 and a delete button 1338 can also be included. Classification codes can be added to the classification code listing 1326 manually through the selection of the add or new button 1334. Some embodiments further include a download and/or link button 1340 that allows a user to access locally and/or remotely stored classification codes that can be incorporated into, added to and/or utilized by the system 120. A classification code in the listing can be edited (e.g., to alter the description and/or change the code number) through the select of the edit button 1336, and/or deleted through the selection of the delete button 1338. In some embodiments, a selected classification code is not actually deleted upon selection of the delete button. Instead, the status of the code is changed from active to inactive. The classification code listing 1326, in some implementations, can be sorted according to a selected classification code parameter (e.g., class code 1328), and further can toggle between ascending and descending order. A sort indicator can be included to identify which parameter is being used to sort the listing 1326 and/or whether the sorting is by ascending or descending order.

In some implementations, the classification code field 1322 further includes a search parameter or field 1344 that allows a user to select a parameter within the classification code listing 1326 to be search (e.g., classification code number, description and/or other such fields), and a corresponding entry line 1346 that allows a user to enter a search string to be searched. The search parameter 1344 can include a pull down menu to list some or all of the possible search parameters. An active toggle or indicator 1348 can be provide to allow a user to designate whether the classification code listing 1326 displays active classification codes or inactive classification codes.

Classification codes are typically associated with a specific job to be performed categorizing the type of work done by an employee. For example, a code can be as specific as depending on a salary rate of the employee performing the job, whether the job is being performed for residential or commercial, and/or other such factors. Further, insurance providers may utilize these classification codes to determine risk factors associated with each type of work. These risk factors can then be utilized in determining base premiums for workers compensation insurance.

FIG. 14 shows a graphical representation of a classification code entry window 1420 that is displayed in response to a selection of the add button 1334. The classification code entry window allows a user to add and/or define one or more classification codes defining job types and related parameters. In some implementations, the classification code entry window 1420 includes multiple fields, such as a class code field 1422, a last update field 1424 and a description field 1426, with associated entry lines. One or more of the entry lines can include a pull down menu option, for example, the last updated entry line can include a pull down menu option to display a listing of dates (e.g., a calendar listing of dates can be displayed). In some implementations, the last updated entry line defaults to a current date by accessing a date indicated by the processor 122, determined by accessing a remote source and/or other sources. An accept button 1432 and a cancel button 1434 can be included to allow a user to accept and store an entry or cancel without storing data, respectively. The edit button 1336 of the classification code field 1322 shown in FIG. 13 can similarly activate the classification code entry window 1420 to allow a classification code selected in the classification code listing 1330 to be edited. An active indicator toggle 1430 can also be provided in the classification code entry window 1420 allowing a user to designate and/or change the status of a selected classification code from active to inactive.

The class code field 1422 allows a code to be entered identifying the type of job. This code can be a numeric code defined for the specific job. Similarly, the description field 1426 can receive alphanumeric characters describing the job type associated with the code entered in the classification code field. As described above, the classification code information can be defined and/or provided by a third party. The codes and/or description can be manually entered (e.g., typed) into the classification code parameter and description parameter, respectively; downloaded and incorporated; loaded from a memory storage; and/or other sources.

Referring back to FIG. 13, the rate field 1324 includes a selected classification code identifier 1350, a rate table 1352, an active indicator or toggle 1354, an add button 1356, an edit button 1358, a delete button 1360, and in some instances a search parameter or field 1362 that allows a user to select a rate listing field to be search and a corresponding data entry line 1364. The rate table 1352 includes a plurality of rate listing parameters, such as a date parameter 1370, billing rate parameter 1372, a pay rate parameter 1374, a workers compensation rate parameter 1376 (comp rate) and/or other such relevant rate listing parameters. Similar to the classification code listing 1326, in some implementations the rate table 1352 can be sorted according to a selected rate parameter (e.g., date parameter 1370), and further can toggle between ascending and descending order. A sort indicator 1372 can be included to identify which parameter is being used to sort the rate table 1352 and/or whether the sorting is by ascending or descending order.

The search parameter 1362 allows a user to search the rates table 1352 for a desired entry. In some implementations, the search parameter can include a pull down menu that allows a user to select from a plurality of search parameters, such as date, bill rate, pay rate, comp rate and/or other such search parameters. The search parameter entry line 1364 allows the user to enter a search string that is used to search the rates table 1352.

The information displayed in the parameters of the rate table 1352 are dependent on the class code selected and identified in the current class code identifier 1350. A user can select a class code through the classification code listing 1326 using a pointer, mouse, keyboard or other device. In response to the selection, the classification code identifier 1350 is populated with the code number. Additionally or alternatively, a user can directly enter the class code number into the class code identifier field 1350. Typically, separate rate parameters are defined for each classification code defined in the classification code listing 1326. Upon selecting a listing in the classification code listing 1326 (using for example a keyboard, mouse or other such methods), the rate table adjusts to reflect rate parameter information relevant to the selected class code.

The date parameter 1370 indicates a date the rate information was entered and/or modified. The pay rate 1374 is the rate (typically on an hourly basis) the employee is being paid for his work. Often the pay rate 1374 is dependent on the work being performed, and in some instances, can be based on the classification code 1350 for work being performed. The compensation rate (comp rate) 1376 defines a base workers compensation insurance premium factor that, in some instances, is dependent on an employer's risk characteristics. In some instances, the comp rate is defined as a general industry standard, for example, by a third party supplying the classification codes and/or an insurance provider. For example, the insurance provider may define a base comp rate per each 100 hours of work performed in each classification code. This comp rate 1376, in some embodiments, is multiplied by an hourly, daily or other period of payroll for an employee, where payroll can be defined by the pay rate 1374 times number of hours worked. In some instances the comp rate is a percentage and/or based on one hundred hours worked. The bill rate 1372 is the rate (e.g., per hour) that the staffing company (i.e., the employer) charges the customer for the work performed by the employee. This bill rate typically takes into consideration the pay rate 1374, the insurance premium that has to be paid for the hours worked, can include an overhead factor for overhead of operating the staffing company, can further include a margin for profit and/or other factors. In some embodiments, the bill rate 1372 can be calculated by:

Bill rate=Cost+Burden+Margin, where the Cost=(Insurance premium+payroll)/hours worked, and the insurance premium can be determined by (((payroll*comp rate)/100)*x-mod); the Burden can be calculated for example by a Cost times an overhead percentage; and the margin can be calculated for example by the Cost times a profit percentage.

The delete button 1360 can delete a rate entry and/or change the status to inactive. Further, the active indicator 1354 can be toggled between active and inactive. This parameter allows a user to designate whether the rate table 1352 displays active rate listings or inactive rate listings.

FIG. 15 depicts a graphical representation of an example rate entry window 1520. Upon detection of the selection of the add button 1356 of the rate field 1324 of FIG. 13, the rate entry window 1520 is displayed and includes a plurality of rate parameters such as but not limited to a date parameter 1522, bill rate parameter 1524, pay rate parameter 1526 and comp rate parameter 1528 with entry lines for each of the rate parameters. The rate entry window can additionally include an accept or enter button 1530 and a cancel button 1532, and in some instances can include an active indicator 1534. The date parameter can default to a current date and/or the corresponding entry line can include a pull down menu that causes a calendar window or the like to be displayed allowing a user to select a date. Again, the comp rate is typically dependent on the work being performed and often is based on the classification code. Typically, this comp rate is defined by a third party, such as an insurance provider, a governmental agency and/or other such entity.

The active indicator 1534 allows a user to designate or change the status of a rate entry from an active state to an inactive state. The accept button 1530 causes the data entered in the entry lines to be stored and associated with the selected classification code 1350. The cancel button 1532 causes the rate entry window to be removed and data entered to be ignored. The rate entry window 1520 can additionally be displayed upon the selection of the edit button 1358 of the rates field 1324 of the classification code setup view 1320 incorporating previously entered and/or associated parameter data to be included in the entry lines allowing a user to alter one or more of the parameter entries, such as the comp rate, bill rate and/or pay rate.

Referring back to FIG. 4, upon detection of a selection of the customer button 428, a customer UI process is activated and displays a customer information UI.

Figure 16:
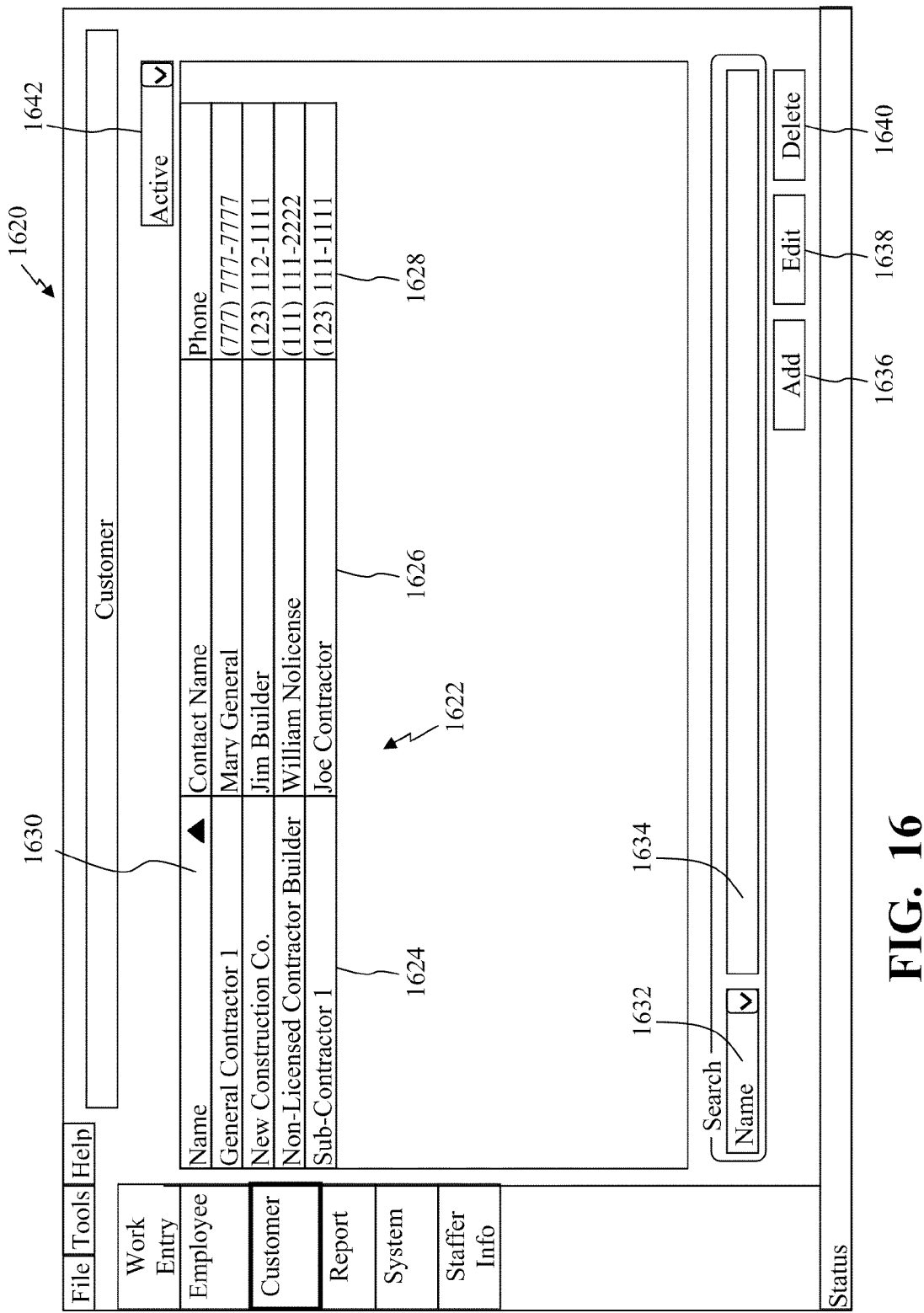
FIG. 16 depicts an example graphical representation of a customer information UI that is generated and displayed by the customer UI process according to some embodiments.

FIG. 16 depicts an example graphical representation of a customer information UI 1620 that is generated and displayed by the customer UI process according to some embodiments. The customer information UI 1620 includes a customer listing table 1622 listing one or more clients or customers defined and/or incorporated into the system 120. The customer listing table 1622 further includes a plurality of parameters or fields such as a name parameter 1624, contact parameter 1626, phone number parameter 1628 and/or other such parameter, with each customer entry in the table including information or data associated with one or more parameters. In some instances, the customer listing table can be sorted based on a selected field and can be sorted in an ascending or descending order (e.g., alphabetically and/or numerically), with a sorting indicator 1630 identifying the sorting. A user can use the customer listing table, in part, to easily locate a customer and determine relevant information.

The customer information UI 1620 can further include a search parameter 1632 and associated search entry line 1634, an add button 1636, an edit button 1638, a delete button 1640 and in some implementations an active indicator 1642. The customer information UI provides a user having an appropriate level of access with an ability to add clients or customers to the system and define information about the customers. The active indicator 1642 allows a user to toggle the display of the customer listing table 1622 to show those customers that are designated as active customers or show those customers that have been designated as inactive. The delete button 1640 can be used to delete a selected customer from the active listing 1622. In some instances, the delete button changes a status of a selected customer to inactive. The designation of whether a customer is active or inactive can be selected in a customer configuration window as described below.

Upon the detection of a selection of the add button 1636 and/or edit button 1638, a customer configuration window 1720 is displayed and/or incorporated into the customer information UI that allows a user to add a new customer to the system and/or edit information about a customer in the system.

FIG. 17 shows an example graphical representation of a customer configuration window 1720 according to some implementations. The customer configuration window includes a plurality of fields, sub-windows or tabs 1722, an accept or add button 1724, a cancel button 1726, and in some implementations an active indicator 1728. The customer configuration window provides a user with an ability to add a customer and/or edit a customer's profile and/or parameters. The plurality of tabs 1722, when selected, cause the customer configuration window to transition to display one or more fields within the customer configuration window associated with the selected tab. The displayed fields can be displayed in a separate window, displayed within the customer configuration window 1720, appear as being positioned over other fields and/or other such displayed configurations. The tabs 1722 within the customer configuration window 1720 can include a customer information tab 1734, a customer site tab 1736, an experience modifier tab 1738, a comments tab 1740, a history tab 1742 and/or other relevant tabs.

When the customer information tab 1734 is selected, as show in FIG. 17, a plurality of fields and/or parameters are displayed within the customer configuration window or in a separate window. The fields can include, for example, a contact information field 1746, an address field 1748, a contractors information field 1750, a miscellaneous field 1752 and/or other such fields. Each field includes one or more parameters and correspond entry lines or indicators. For example, the contact information field 1746 provides information about a customer company and can include parameters such as a company name, contact person's name, phone number, fax number, cellular number, email, web site and/or other such parameters.

The address field 1748 can include one or more address parameters, city, state, zip code parameters and/or other such parameters regarding address and/or mailing information. The contractor field 1750 can include a contractor indicator or toggle 1760, a license number parameter, license expiration parameter and/or other such relevant parameters. For customers that are licensed contractors, the contractor indicator 1760 can be set to indicate that the customer is a contractor. In some implementations, the license and expiration parameters may not appear or may not be accessible unless the contractor indicator is selected designating the customer as a licensed contractor. As described above, customers that are contractors typically have an experience modifier. This contractor indicator can be used to notify a user that the customer likely has a defined experience modifier. The miscellaneous field 1752 can include parameters such as a bureau number parameter, a customer ID that in some instances is generated by the system 120, a federal tax ID parameter, an employer identification number (EIN) parameter, and/or other such parameters. Further, as described above, for those customer that are licensed contractors the system 120 can attempt to optimize workers compensation premiums, at least in part, by determining whether to use the staffing company's experience modifier or the contractor's experience modifier in calculating premiums as described above and further below.

The detection of the selection of the accept button 1724 causes the system 120 to store the customer data. In some embodiments, when a selection of the accept button is detected, the customer information UI process determines whether there are predefined parameters that should include data and whether data has been entered for each of those predefined parameters. When one or more predefined parameters do not contain information, one or more error indicators can be displayed identifying one or more parameters that should receive data. For example, an indicator can be displayed by one or more parameters (e.g., red circle, arrow, check, etc.), a parameter heading can be highlighted, displayed in a different color and/or other wise distinguished. In response to the selection of the cancel button 1726, the customer configuration window 1720 is un-displayed typically without storing data. The active indicator 1728 allows a user to designate whether a customer is an active or inactive customer. This designation can be reflected in the customer listing table 1622 of the customer information UI 1620 depending on a state of the active indicator 1642.

Figure 18:
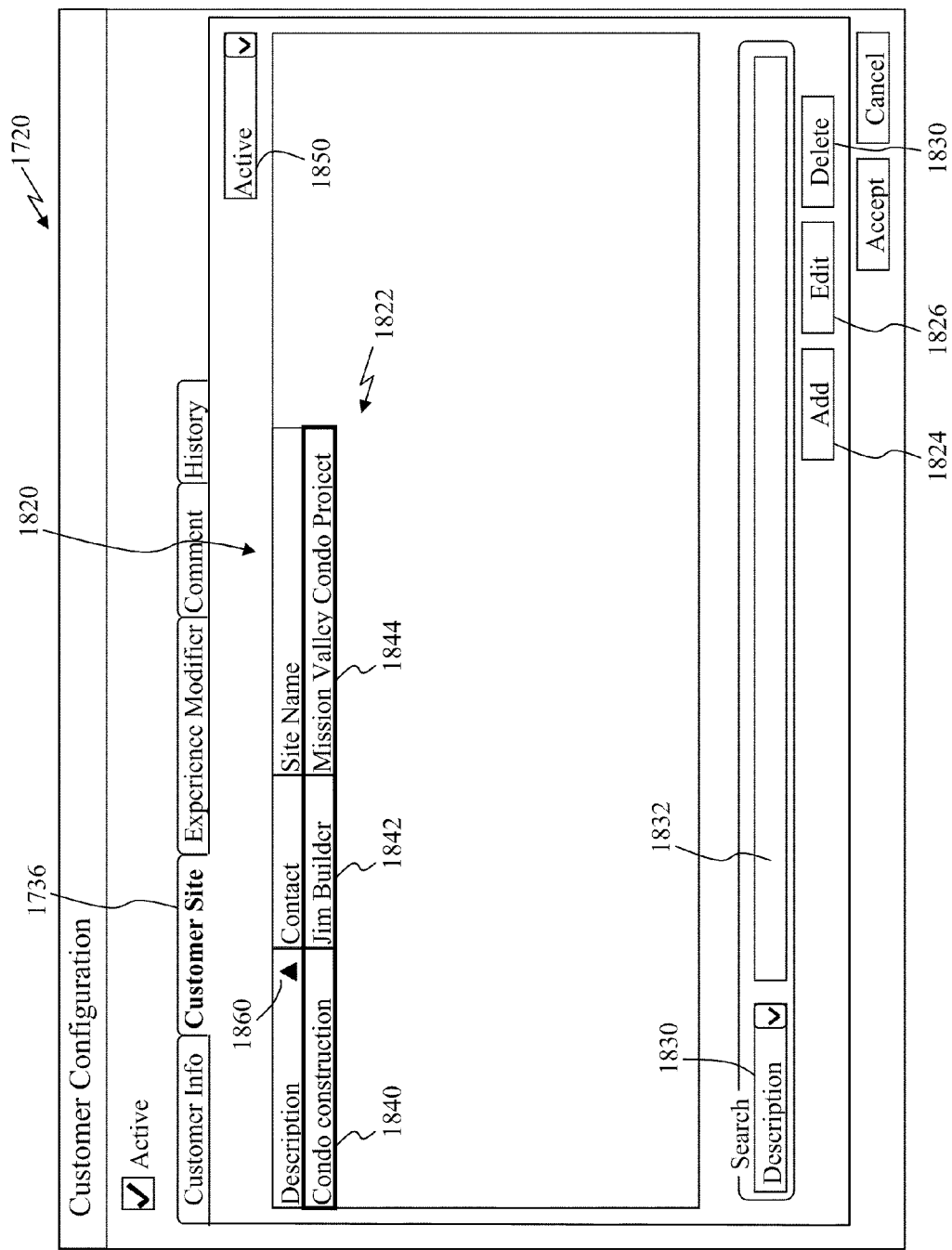
FIG. 18 shows a graphical representation of the customer configuration UI of FIG. 17 displayed in response to the selected of a customer site tab such that a customer site view is shown.

FIG. 18 shows a graphical representation of the customer configuration UI 1720 displayed in response to the selected of the customer site tab 1736 such that a customer site view 1820 is shown. The customer site tab allows a user to view site locations where work has been, is being and/or is to be performed by employees of the staffing company, such as a construction site, associated with a customer selected in the customer listing table 1622 and/or added through the customer configuration window 1720, and to enter data about a site. The customer site view 1820 includes a site list table 1822, an add button 1824, an edit button 1826, a delete button 1828 and in some instances a search field 1830 with accompanying search entry line 1832. The delete button 1828 can delete a customer site and/or change the status to inactive. The site list table 1822 includes a listing for each site previously entered for a customer where employees are sent to perform work for the customer, and further includes a number of site parameters or data such as a site description 1840, a site contact person 1842, a site name 1844 and/or other such parameters and data. In some embodiments, the site view optionally can allow a user to limit the classification codes that can be applied a specific site. Further in some implementations, the site list table 1822 can be sorted according to one of the parameters and/or can include an indicator 1860 indicating whether the sorting is ascending or descending.

The search field 1830 allows a user to search the site list table 1822 for a desired site. In some implementations, the search field can include a pull down menu that allows a user to select from a plurality of search parameters, such as description, contact, site name and/or other such search parameters. The search entry line 1832 allows the user to enter a search string that is used to search the site list table 1822.

Figure 19:
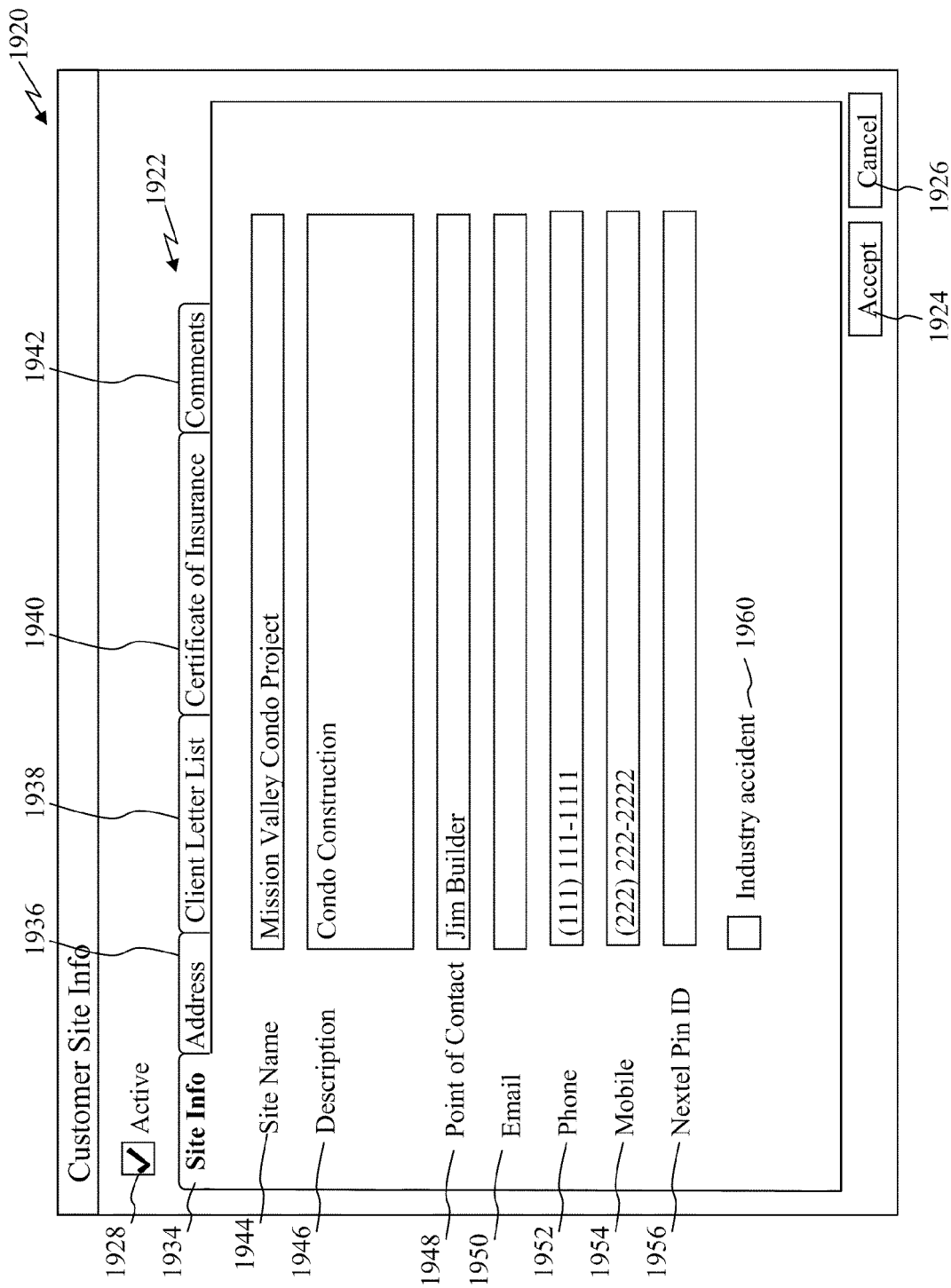
FIG. 19 shows a customer site information window according to some embodiments that is displayed and/or incorporated into the customer configuration window of FIG. 17 in response to the detection of a selection of the add button and/or edit button.

FIG. 19 shows a customer site information window 1920 according to some embodiments that is displayed and/or incorporated into the customer configuration window 1720 in response to the detection of a selection of the add button 1824 and/or edit button 1826. The customer site information window allows a user to define and/or edit information about a customer site, and includes a plurality of fields, sub-windows or tabs 1922, an accept or add button 1924, a cancel button 1926, and in some implementations an active indicator 1928. The plurality of tabs 1922, when selected, cause the customer site information window to transition to display one or more fields within the customer site information associated with the selected tab. The displayed fields can be displayed in a separate window, displayed within the customer site information window 1920, appear as being positioned over other fields and/or other such displayed configurations. The tabs 1922 within the customer site information window 1920 can include a site information tab 1934, an address tab 1936, a client letter or work letter list tab 1938, a certificate of insurance tab 1940, a comments tab 1942 and/or other relevant tabs.

With the site information tab 1934 selected, as show in FIG. 19, a plurality of fields and/or parameters are displayed with accompanying entry lines. The fields can include, for example, a site name field 1944, a description field 1946, a point of contact field 1948, an email field 1950, a phone number field 1952, a mobile phone number field 1954, a two-way communication identifier field 1956 (e.g., a Nextel PIN ID) and/or other relevant fields used in defining and/or identifying a work site and contact information relating to that site. In some implementations, the site information parameters can further include an industry accident indicator or toggle 1960 indicating that one or more employees of the staffing company have been injured at the selected customer site.

The activate indicator 1928 allows a user to designate a site as being active or inactive. In displaying the customer site table 1822 in the customer site view 1820 the user can utilize the active indicator 1850 to toggle the customer site table to display those active customer sites or those inactive customer sites.

FIG. 20 shows the customer site information window 1920 with the selection of the address tab 1936 such that a site address view 2020 is shown within the customer site information window. The address view can include a number of parameters and corresponding entry lines such as first and second address parameters 2022, 2024, city parameter 2026, state parameter 2028, zip code parameter 2030, parcel number parameter 2032 and/or other relevant parameters in designating a location of a work site.

Figure 21:
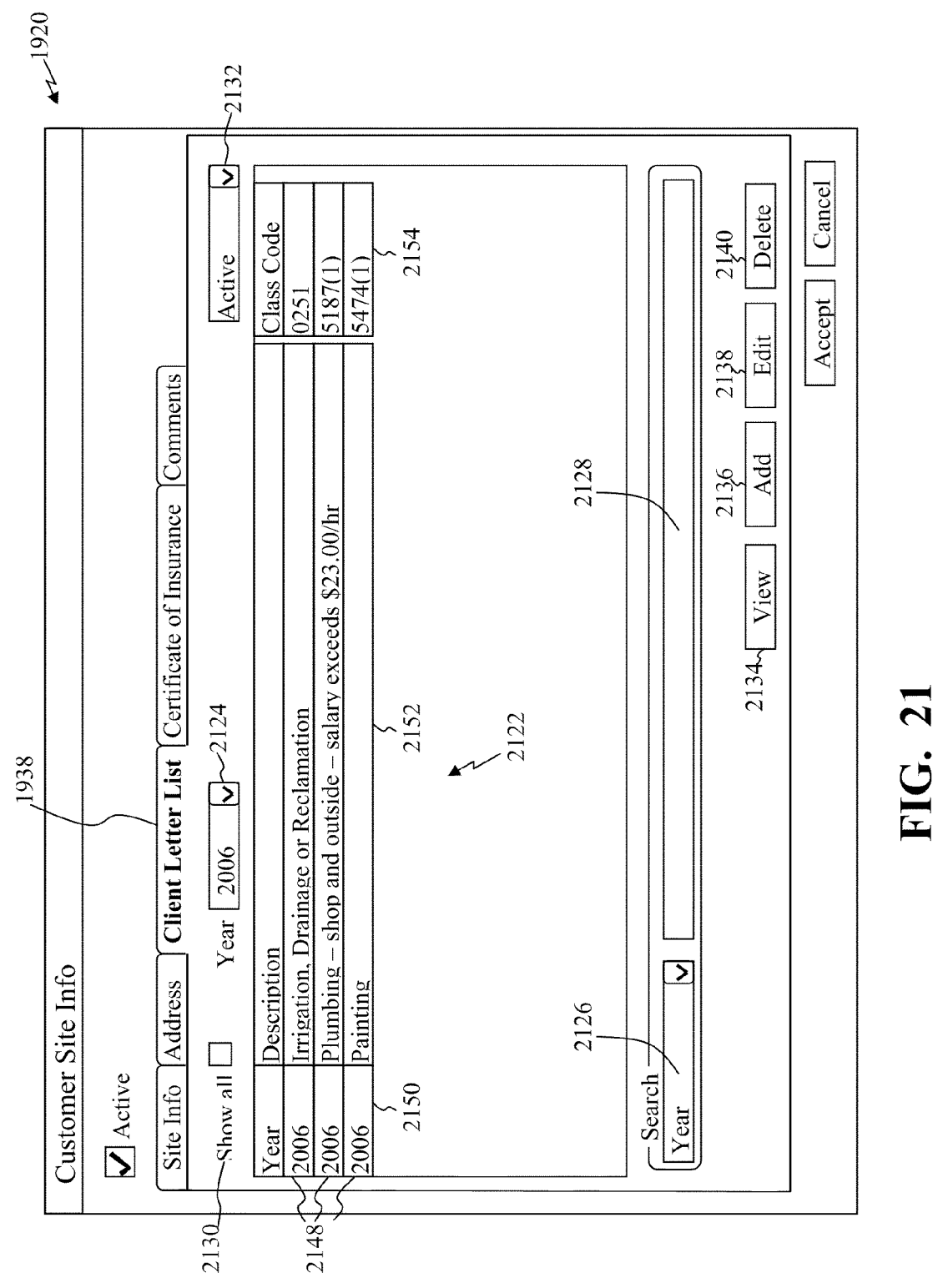

FIG. 21 shows the customer site information window 1920 following the selection of the client letter list tab 1938 such that a client letter list view 2120 is shown within the customer information window. The client letter list view includes a letter list table 2122, time or year field 2124, a search field 2126 with an accompanying entry line 2128, a show all toggle or indicator 2130, an active indicator 2132 and/or other fields or indicators. Further, the client letter list view 2120 includes a view button 2134, an add button 2136, an edit button 2138 and a delete button 2140.

The letter list table 2122 includes a number of listings 2148 and parameters such as a year or time parameter 2150, a description parameter 2152, a class code parameter 2154 and/or other relevant parameters. Each listing in the letter list table 2122 represents a stored letter and/or an image of a letter from an insurance provider designating for the selected customer specific to a job designated by the classification code 2154. Each listing in the letter list table 2122 represents a client letter or work letter, that may be stored and/or an image of a letter stored, designating for the selected customer specific to a job designated by the classification code 2154. The client letters are typically from an insurance provider. The year parameter 2150 designates for which year the letter applies, the description parameter 2152 is a description of the job associated with the letter and the class code parameter 2154 identifies the classification code for which the letter applies.

The show all toggle 2130 allows a user to view all letters entered and/or saved in the system for a selected customer. The year field 2124 allows a user to limit the letter list table to a specific selected year. Additionally, the active indicator 2132 allows a user to designate whether the letter list table displays active entries or inactive entries.

The selection of the view button 2134 causes the system to display an image of a letter selected and/or highlighted in the letter list table 2122 that is stored locally and/or remotely. In some implementations, the letter is stored as an Adobe Acrobat file and/or other relevant format such that the system activates Adobe Acrobat or other relevant software to view the image of the letter. The delete button 2140 causes the system to delete a selected or highlighted entry in the letter list table 2122 and/or change the status to inactive. The detection of the selection of the add or edit buttons 2136, 2138 causes a client letter window 2220 to be displayed.

As introduced above, a new client letter or work letter can be supplied by a third party, such as an insurance provider, and in some instances is provided for each job the staffing company sends an employee. The client letter often defines the classification code(s) associated with a job or jobs being staffed and/or designates the comp rate(s). Typically, each job has a client letter. In some instances, upon contracting for a job the staffing company submits a request or application to the third party (e.g., insurance provider) with a description of the job to be performed and/or other information (e.g., pay rate). The third party evaluates the job to be preformed and can classify it according a classification code. The client letter generated by the third party and forwarded to the staffing company designates the classification code and the associated information. Based on the information provided in the client letter, the information associated with the job can be inputted and/or updated in the system as appropriate.

Some embodiments allow the classification codes to be downloaded and/or otherwise entered into the system 120. Upon entering job parameters and information, the job can preliminarily be classified by the staffing company based on the work to be performed. The system 120 can generate the request or a report requesting the client letter, and in some instance the system and further forward the request to the third party (e.g., insurance provided). The request for the client letter can be generated, in part, based on a description of the work to be performed and entered in the system, such as the code 1422 and/or description 1426 defined in the classification code entry window 1420, the code 2230 and description 2226 defined in the client letter window 2220 as described below, a description added in response to requesting the generation of the request for the client letter and/or other relevant information. Further, the system 120 can extract other relevant information based on data accessible by the system such as the staffing company's identification and address, the customer information and/or other such relevant information, and incorporates this information into the generated request or application.

In some embodiments, this request can be electronically transmitted. Further in some implementations, the client letter(s) can be received electronically and the system 120 can identify appropriate fields, parameters and information, extract the relevant data (e.g., key words can be detected, the client letter can include detectable data fields, and/or other such identification) and incorporate and/or update the entries within the system accordingly (e.g., alter a classification code number, description of the job, and/or other such adjustments or entries).

Figure 22:
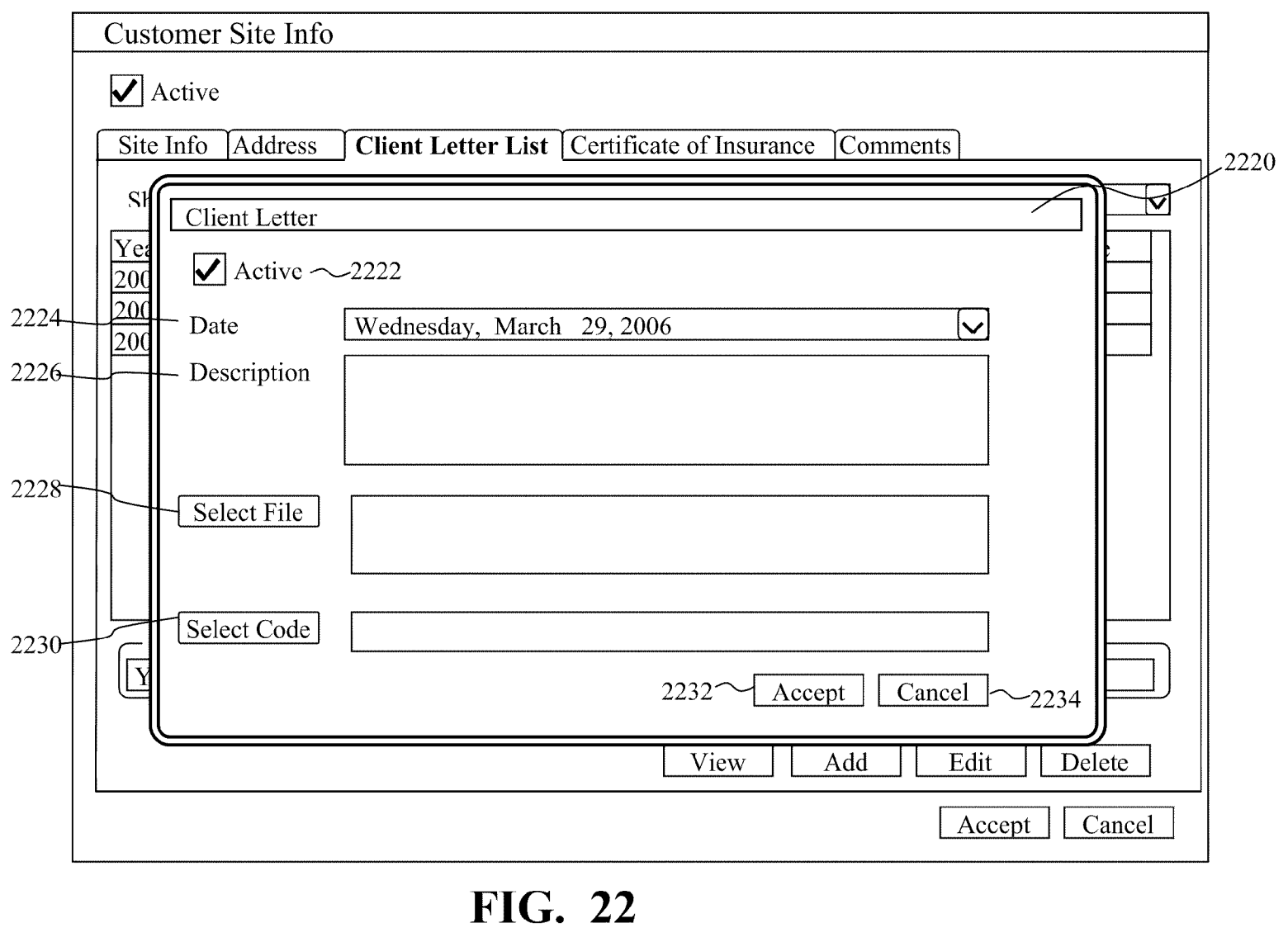

FIG. 22 shows an example of a client letter window 2220. The window includes an active indicator 2222, and a number of fields and corresponding entry lines, such a date field 2224, a description field 2226, a file selection field 2228, a select class code field 2230 and the like. An accept button 2232 and a cancel button 2234 are also included. The date field, in some instances, defaults to a current date, but can allow a user to alter the date or select a date. The date field can include a pull down menu that displays a calendar or other date selection popup window. The select file field 2228 allows the user to designate a file path and name to the stored image of the client letter. In some embodiments, the select file field indictor can be a button and/or includes a button that when selected causes a file navigation window to be displayed allowing a user to navigate or browse through local directories and/or remote storage locations for the path to the letter image. Similarly, the select class code field 2230 allows a user to enter the classification code associated with the letter, and the select class code designator can be a button and/or include a button that causes a classification code selection window to be displayed that allows a user to select a classification code. Further, the active indicator 2222 allows the user to designate the status of and/or change the status of a client letter from active to inactive.

Figure 23:
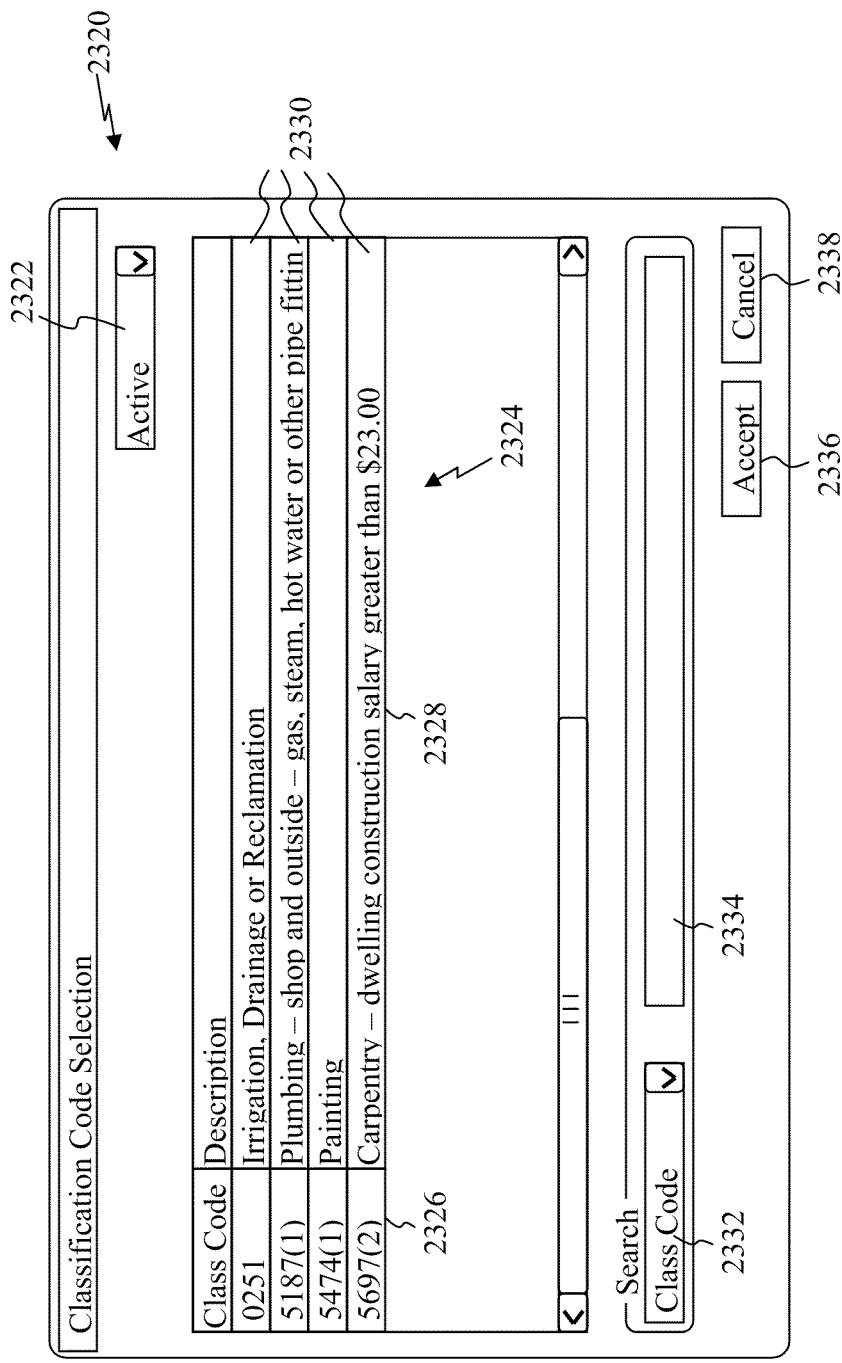
FIG. 23 shows an example of a classification code selection window activated

FIG. 23 shows an example of a classification code selection window 2320. An active indicator 2322 can be included along with a classification code table 2324 that includes a classification code parameter 2326 and accompanying description parameter 2328 with a plurality of classification code entries 2330. The active indicator 2322 allows a user to select whether the classification code table 2324 displays active classification codes or inactive classification codes. In some instances, the entries in the classification code table 2324 are those classification codes designated or entered by the user, imported and/or downloaded into the system, and/or accessible from a remote source. A search field 2332 and accompanying entry line 2334 can be included along with an accept button 2336 and a cancel button 2338. This class code selection window allows a user to select a class code to be incorporated into the client letter window 2220. Upon selecting a class code from the classification code table 2322 (e.g., by highlighting an entry in the table and selecting the accept button, using a mouse and double clicking, etc.) the select code field 2230 of the client letter window 2220 is populated with the selected classification code (e.g., class code number). Other windows controls can additionally be included, such as a slide bar 2344 and/or other such windows controls.

Referring back to FIG. 22, upon entering or selecting of a classification code in the select code field 2230, the system in some implementations asks the user whether to use the description already associated with the selected class code (e.g., the description 2324 in the classification code table 2324 and/or defined in the description field 1426 of the classification code entry window 1420 of FIG. 14). The user can select to manually enter the description or accept the already associated description that causes the system to incorporate the description into the description field 2226. The accept button 2232 results in the entries being entered and stored, and the entry being displayed in the letter list table 2122. The cancel button 2234 closes the client letter window 2220 without saving entries or edits.

Figure 24:
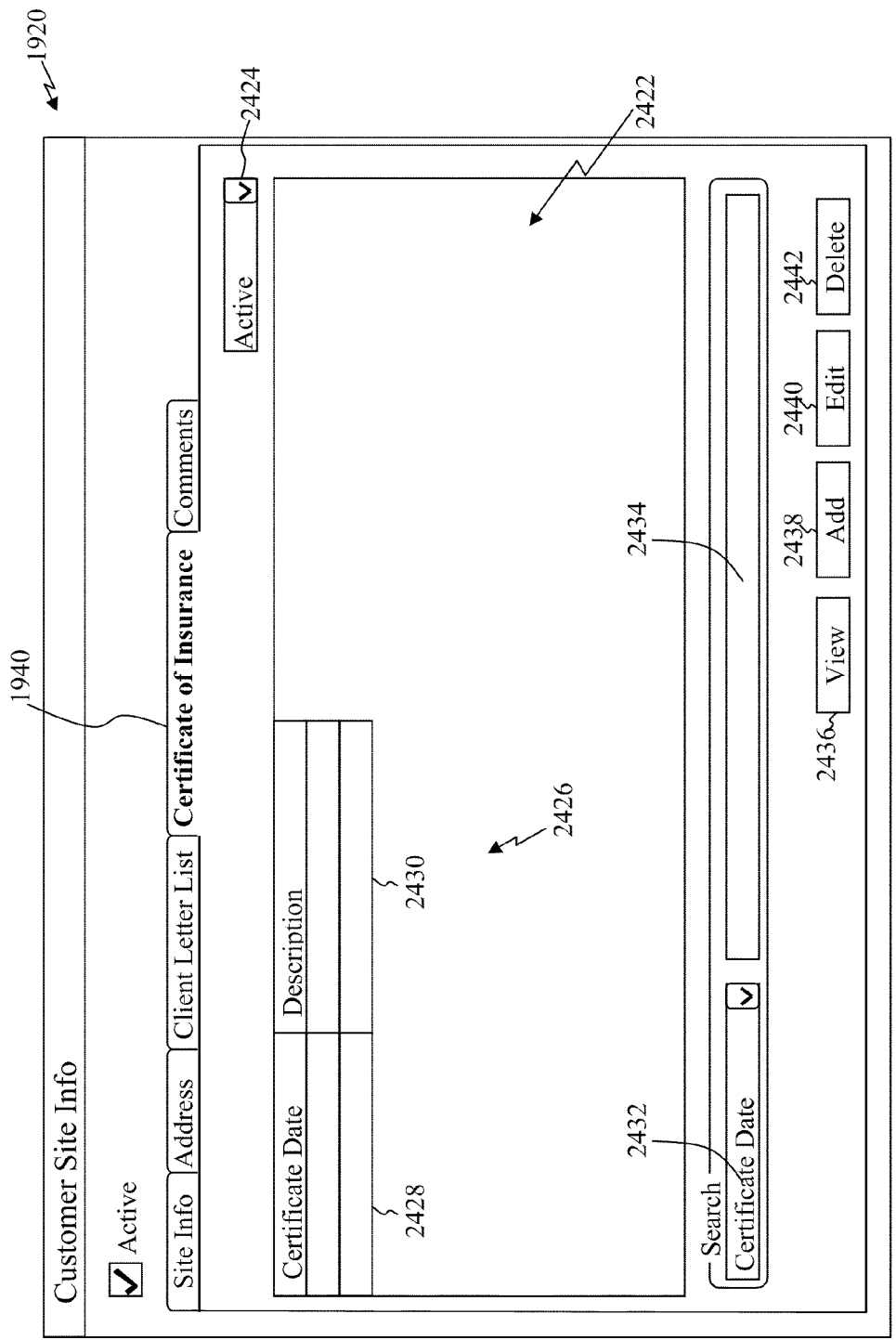
FIG. 24 shows the customer site information window following the selection of the certification of insurance tab of FIG. 19 such that a certification of insurance view is shown within the customer information window.

FIG. 24 shows the customer site information window 1920 following the selection of the certification of insurance tab 1940 such that a certification of insurance view 2420 is shown within the customer information window. The certification of insurance view can include an active indicator 2424, a certification of insurance listing table 2426 with parameters such as certification date 2428, description 2430 and/or other relevant parameters. A search field 2432 and accompanying entry line 2434 can also be included along with a view button 2436, add button 2438, edit button 2440 and delete button 2442. The delete button 2442 causes the system to delete a selected or highlighted entry in the certification of insurance listing table 2426 and/or change the status to inactive. The view button 2436 can be similar to the view button of the certification letter listing view 2120 such that upon selection of the view button an image (e.g., a PDF image) of the client's certification of insurance is displayed. The add and edit buttons 2438, 2440 cause a certificate of insurance selection window to be displayed that can be similar to the client letter window 2220. The active indicator 2424 designates whether active entries in the insurance listing table are active listings or inactive listings.

Figure 25:
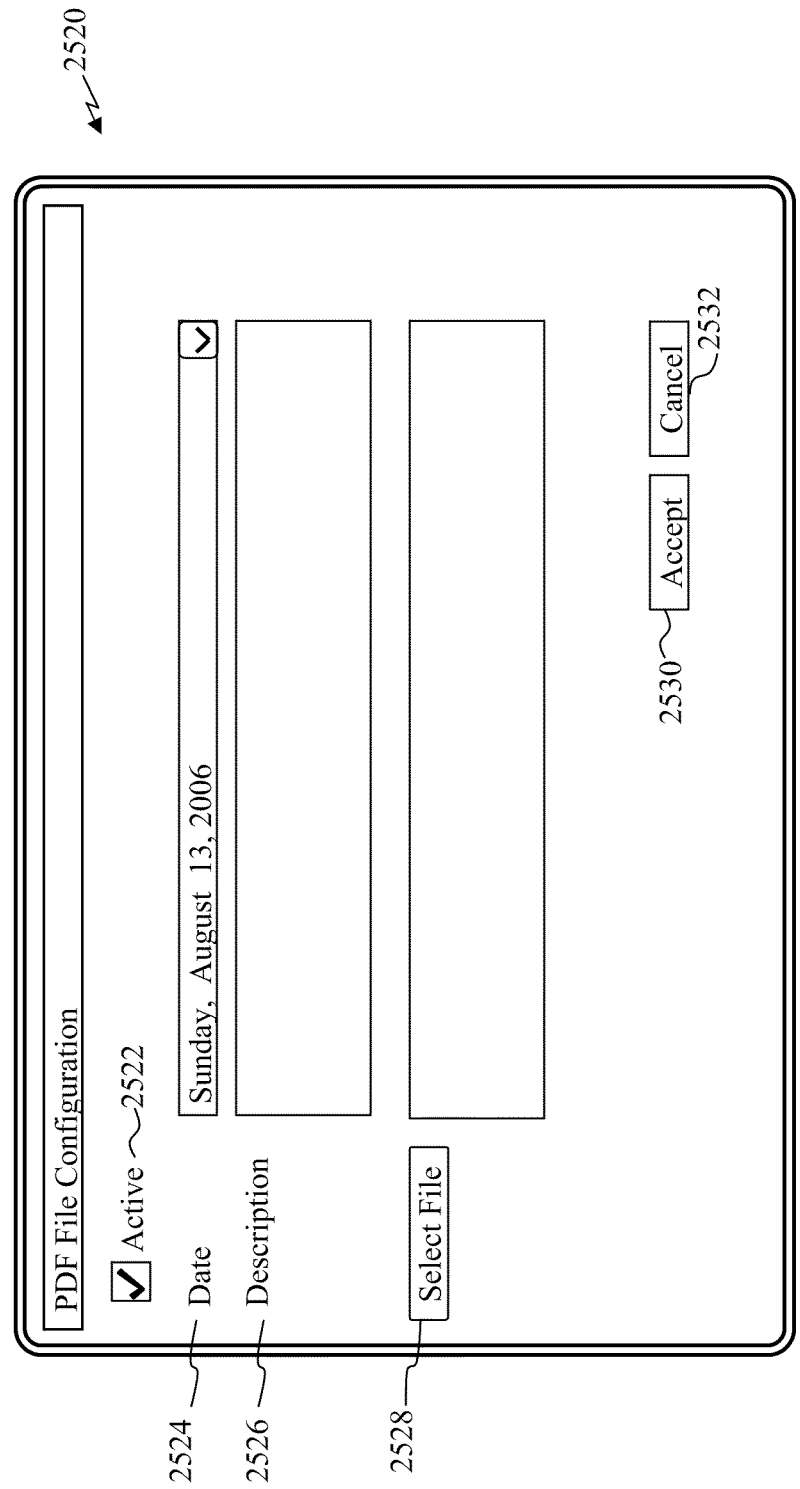
FIG. 25 shows an example of a certification of insurance selection window as activated.

FIG. 25 shows an example of a certification of insurance selection window 2520. The window includes an active indicator 2522 that designates whether the certificate of insurance is an active certificate, and a number of fields and corresponding entry lines, such a date field 2524, a description field 2526, a file selection field 2528 and the like. An accept button 2530 and a cancel button 2532 are also included. The date field, in some instances, defaults to a current date, but can allow a user to alter the date or select a date. The date field can include a pull down menu that displays a calendar or other date selection popup window. The select file field allows the user to designate a file path and name to the stored image of the certificate of insurance. In some embodiments, the select file field indictor can be a button that when selected causes a file navigation window to be displayed allowing a user to navigate or browse through local directories and/or remote storage locations for the path to the image.

The comments tab 1942 of the customer site information window 1920 causes a comments view to be displayed with a text entry area, and accept and cancel buttons. The text entry field allows the user to enter alphanumeric text regarding the customer, customer site, insurance and/or other information. The comments view can be similar to the comment view 2820 of FIG. 28 as described below.

Figure 26:
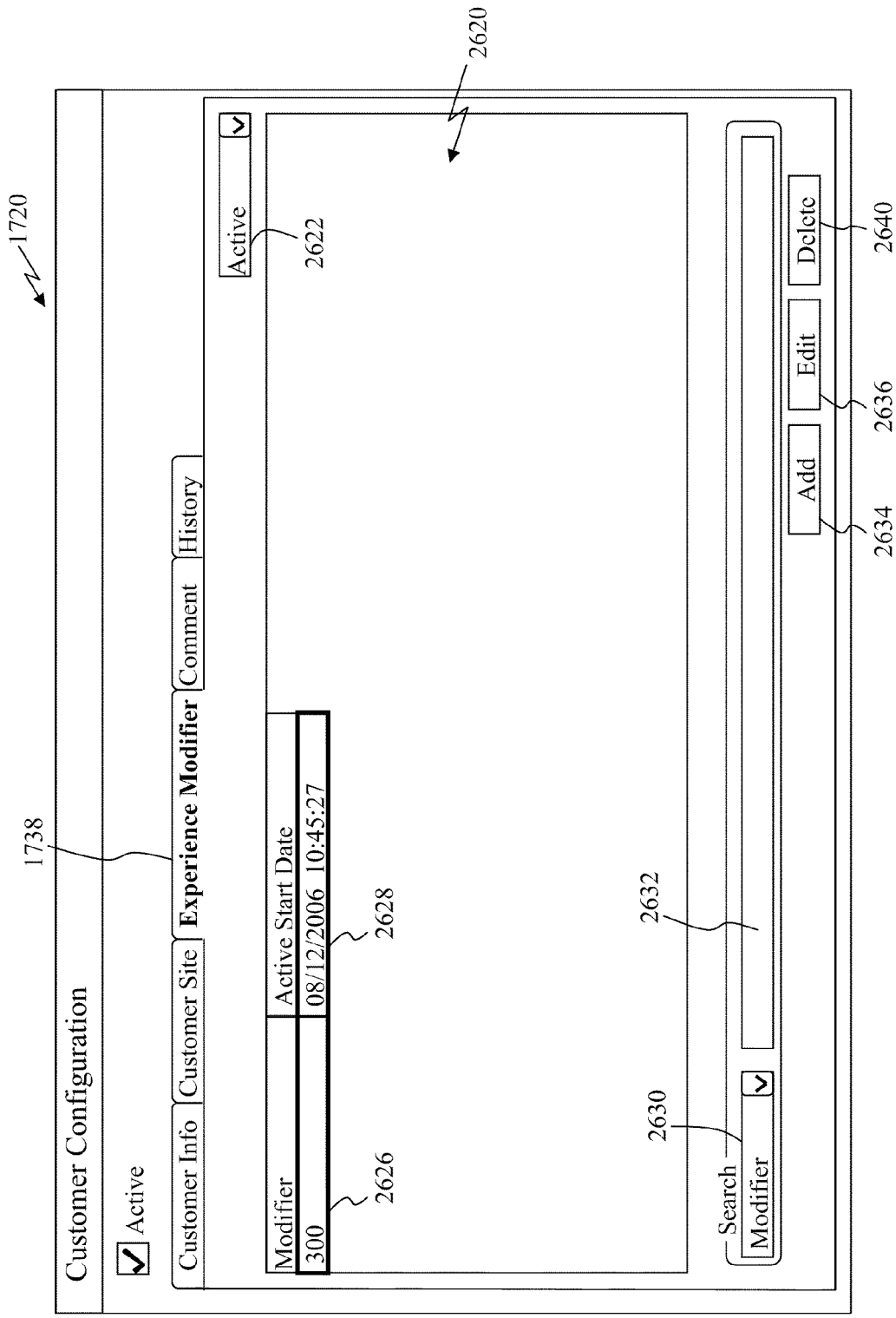
FIG. 26 shows the customer configuration window of FIG. 17 with an experience modifier view following a detection of the selection of the experience modifier tab.

FIG. 26 shows the customer configuration window 1720 with an experience modifier view 2620 following a detection of the selection of the experience modifier tab 1738. In some implementations, the experience modifier tab may not appear or may not be accessible unless the contractor indicator 1760 is selected designating the customer as a licensed contractor. For example, the customer is a licensed "rated" contractor based on a third party rating or licensing bureau such as workers compensation rating bureau (wcrb) rated contractor. As a further example, the contractor is a California license board, workers compensation insurance rating bureau rated contractor. The experience modifier view 2620 can include an active indicator 2622, an experience modifier listing 2624 with a modifier parameter 2626 and activation date parameter 2628, a search field 2630 with accompanying entry line 2632, an add button 2634, an edit button 2636 and a delete button 2640. As described above, the experience modifier is typically assigned by a third party, such as an insurance provider, a governmental agency or other such party. Further, this modifier is likely to change over time as a customer continues to operate. As such, the experience modifier view 2620 allows a user to update the customers experience modifier value 2626 as the third party changes the customer's modifier. The active indicator 2622 defines whether the experience modifier listing is populated with active or inactive modifier values. The delete button 2640 deletes a selected or highlighted entry in the modifier listing 2624 and/or changes the status to inactive. The add and edit buttons cause an experience modifier window to be displayed.

Figure 27:
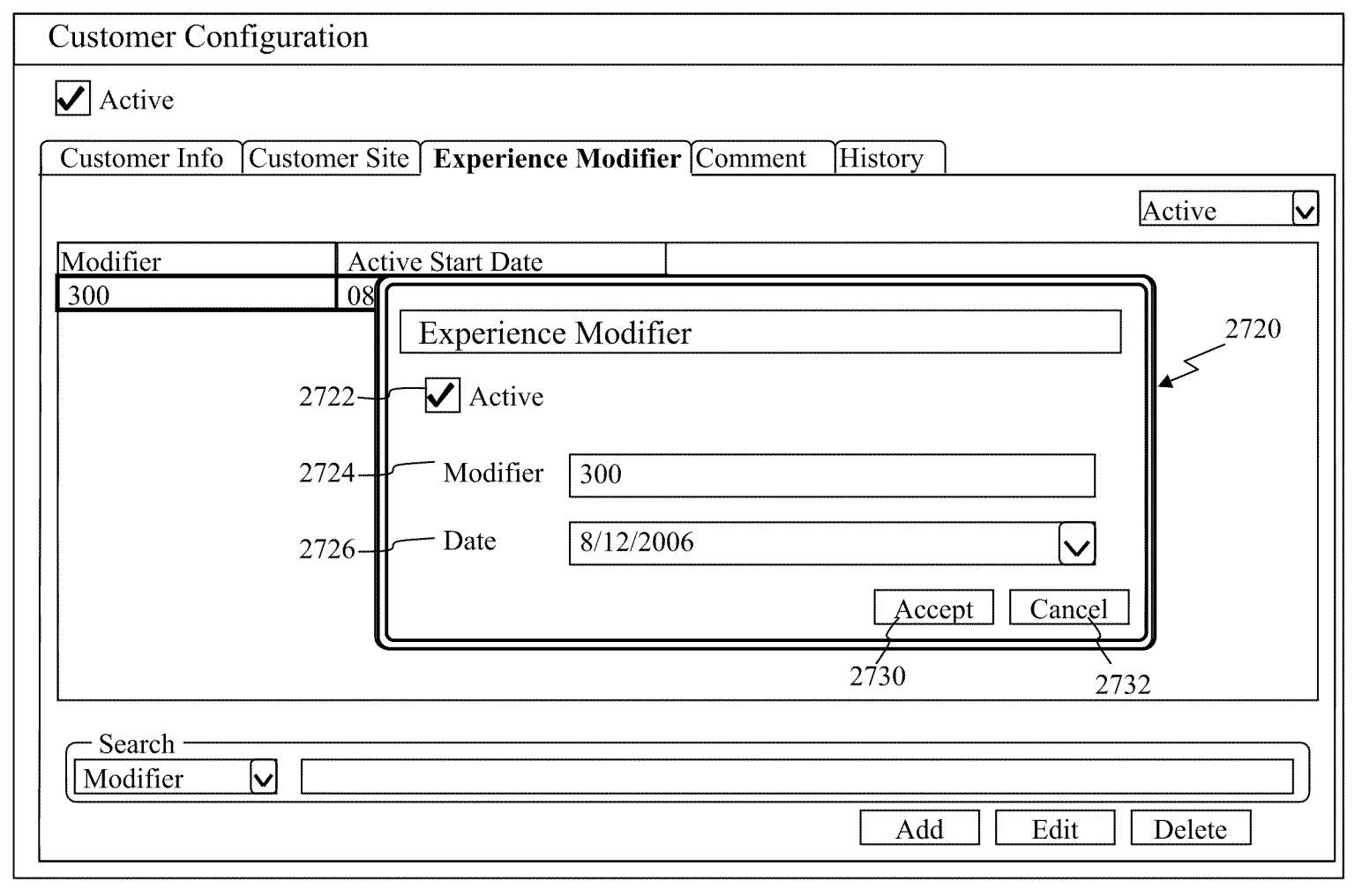

FIG. 27 shows a graphical representation of an experience modifier window 2720 according to some embodiments. The window can include an active indicator 2722, a modifier value field and accompanying entry line 2724, a date field and entry line 2726 that in some instances can include a pull down menu, an accept button 2730 and a cancel button 2732. The modifier value field allows the user to enter or edit a modifier value accordingly. In some instances, the experience modifier value is downloaded from a third party and/or received from the customer. The active indicator 2722 designates whether the experience modifier is an active or inactive modifier.

Figure 28:
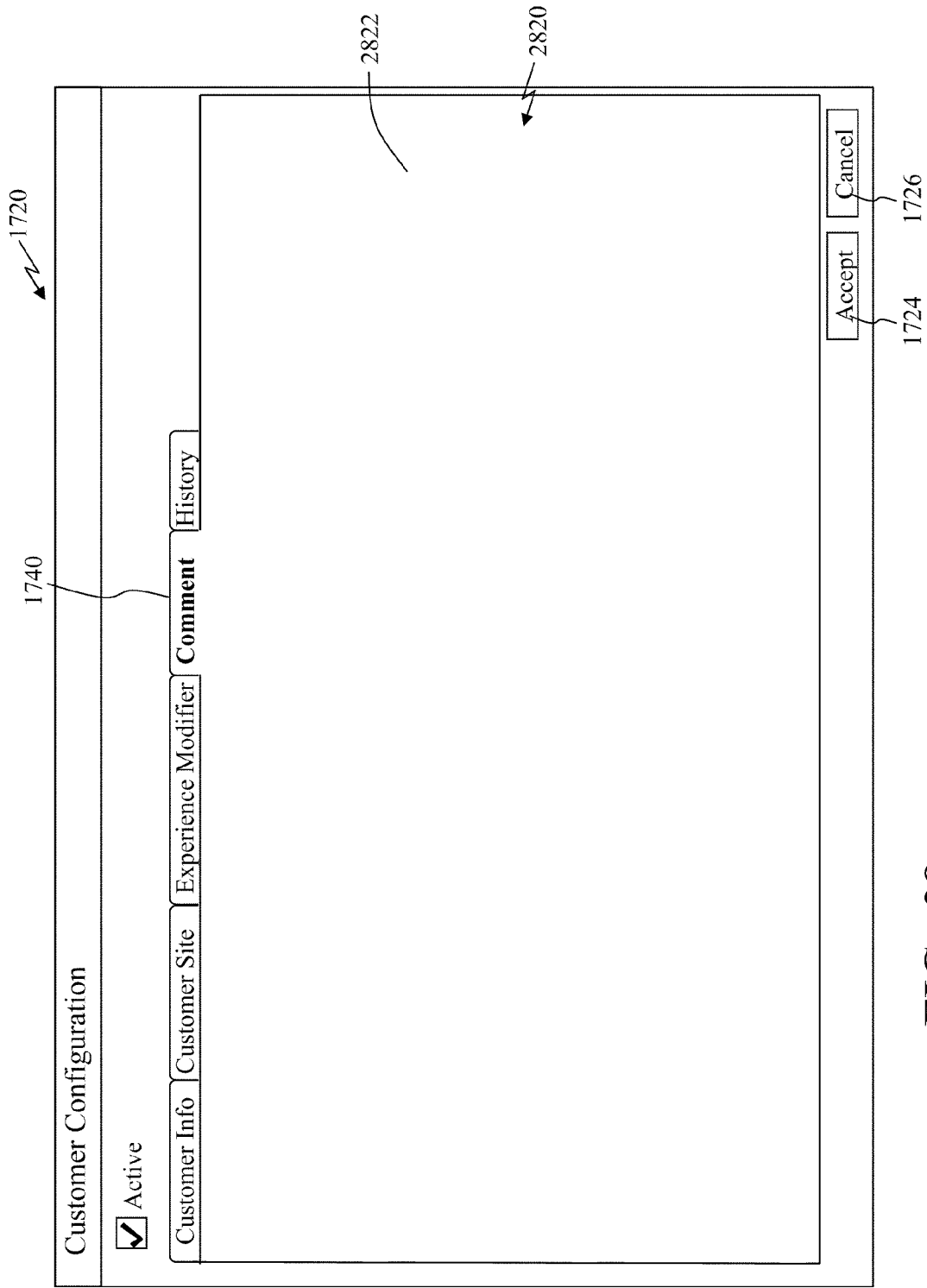
FIG. 28 shows the customer configuration window of FIG. 17 with a comments view 2820 following a detection of the selection of the comments tab.

FIG. 28 shows the customer configuration window 1720 with a comments view 2820 following a detection of the selection of the comments tab 1740. The comments tab causes the comments view 2820 to be displayed with a text entry area 2822, the accept button 1724 and the cancel button 1726. The text entry field allows the user to enter text regarding the customer. The text can be substantially any data the user may want to include about the customer.

FIG. 29 shows the customer configuration window 1720 with a history view 2920 that is displayed following a detection of the selection of the history tab 1742. The history view includes a setup date field 2924, a setup by field 2926, a last modified date field 2928, a last modified by field 2930 and accompanying entry lines. The setup date 2924 can default to the date when the customer is added to the system, and similarly, the setup by field 2926 can default to the user logged into the system when the customer is added to the system. Additionally, the last modified date field 2928 and last modified by field 2930 are filled by the system based on a date when the last modification is made to the customer parameters and the person logged on to the system when those modifications are incorporated. In some instance these fields can be altered by a user with appropriate system authorization by selecting the accompanying entry line and entering appropriate data.

Referring back to FIG. 4, the system allows a database of the employees of the staffing agency that are to be sent to customers to be incorporated into the system and to track the work the employees in the system perform for one or more customers 1622 at one or more customer work sites 1822. Upon selection of the employee button 426 an employee information UI 3020 is displayed by an employee UI process according to some embodiments.

Figure 30:
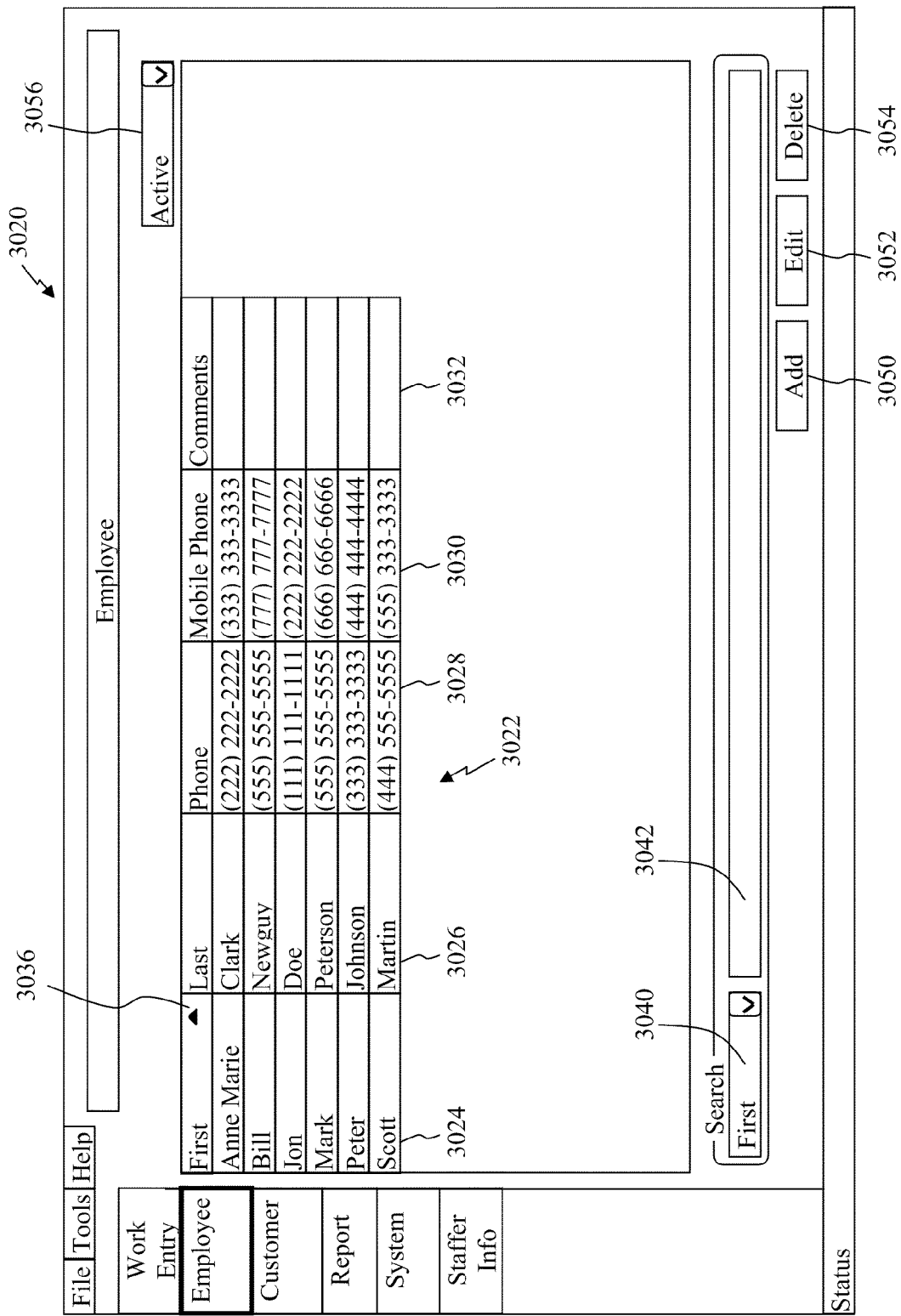
FIG. 30 shows an example employee UI according to some implementations.

FIG. 30 shows an example employee UI 3020 according to some implementations. The employee information UI 3020 includes an employee listing table 3022 having a listing of a plurality of employees with a plurality of fields such as a first name field 3024, last name field 3026, first phone number field 3028 (e.g., home phone), second phone number field 3030 (e.g., mobile phone), comments field 3032 and/or other fields identifying the employees within the employee listing table 3022. The employee information UI 3020 can allow searching for one or more employees through a search parameter 3040 that includes a pull down menu with potential fields that can be searched (e.g., first name, last name, etc.) and an accompanying entry line 3042 into which a user can enter a search string to be search within the employee database and to be displayed within the employee listing table 3022. In some instances, the employee listing table can additionally be sorted based on one of the fields, and in some instances can be ascending or descending (e.g., alphabetically and/or numerically), with a sorting indicator 3036 identifying the sorting.

An add button 3050, edit button 3052, a delete button 3054, and in some implementations an active indicator 3056 can additionally be included in the employee UI 3020. The delete button causes the system to remove a highlighted or otherwise selected employee from the employee listing table 3022 and/or changes the status to inactive. In some instances, however, the data associated with the employee is not fully removed from the employee database, but just marked, labeled or otherwise identified as being removed from the employee listing table. Upon the detection of the selection of the add button 3050 and/or edit button 3052, an employee configuration window 3120 is displayed and/or incorporated into the employee information UI.

Figure 31:
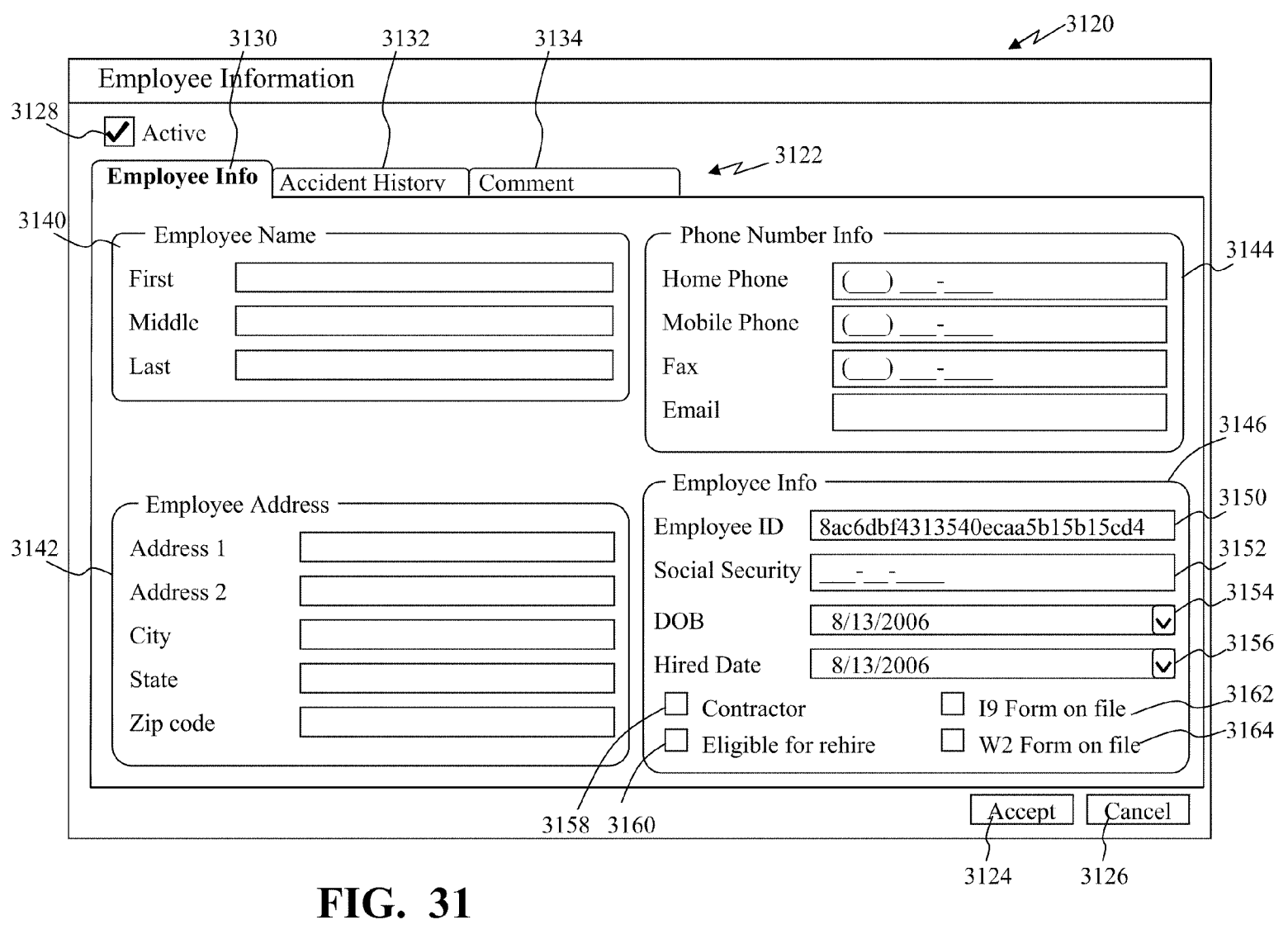

FIG. 31 shows an example of an employee information window 3120 according to some implementations. A number of tabs 3122 are included within the employee information window 3120 along with an accept button 3124 and a delete button 3126, and in some instances an active indicator 3128 that designates whether the employee is an active employee or an inactive employee. The tabs 3122 can include, for example, an employee information tab 3130, an accident history tab 3132 and a comments tab 3134. When the employee information tab 3130 is selected, as shown in FIG. 31, several parameters and accompanying entry lines are displayed within the employee information window 3120. Some of these parameters can include name information parameters 3140 (e.g., first name, middle name, last name, etc.), address information parameters 3142 (e.g., first address line, second address line, city, state, zip code, etc.), contact information parameters 3144 (e.g., home phone, mobile phone, fax number, email, etc.), information parameters 3146 and/or other such parameters.

The information parameters 3146 can include parameters such as an employee identification 3150 (such as an ID number or the like, which in some instances is generated by the system 120, for example, upon entering a new employee), a social security number parameter 3152, a date of birth (DOB) parameter 3154, a hire date parameter 3154, a contractor indicator 3158 indicating whether the employee is a licensed contractor, a rehire indicator 3160 (which could indicate whether the staffing company would send this particular employee to another job), an I-9 form indicator 3162 indicating whether the staffing agency has an I-9 form on record for this particular employee), a W-2 form indicator 3164 indicating whether the staffing agency retains a W-2 tax form on file, and/or other similar indicators and/or parameters. In some embodiments, the DOB parameter 3152 and/or the hire date parameter 3154 can include pull down menus that display a calendar or other similar options to allow selection of a date. The employee configuration window 3120 can further identify one or more parameters that have not been filled in when a user selects the accept button 3124 when data is not incorporated with one or more predefined parameters. Upon selection of the accept button, the employee listing table 3022 of the employee UI 3020 is updated to show the new employee or reflect changes to an edited entry.

Figure 32:
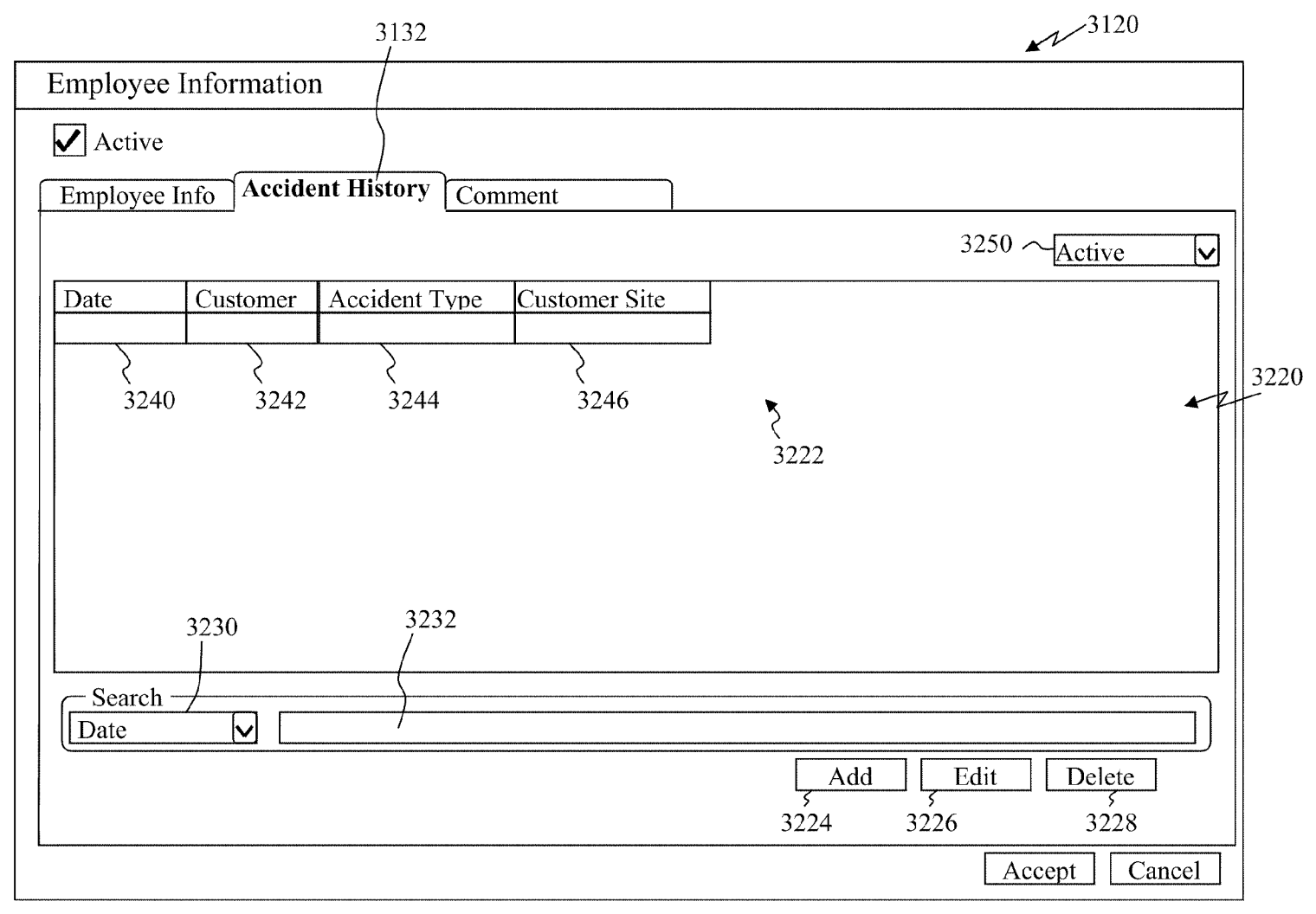

FIG. 32 shows the employee configuration window 3120 with an accident history view 3220 displayed upon detection of a selection of the accident history tab 3132. The accident history view includes an accident history listing 3222, an add button 3224, an edit button 3226, a delete button 3228, and in some instances a search parameter 3230 with an entry line 3232. The accident history listing 3222 can include a number of parameters, such as date 3240, customer 3242, accident type 3244, customer site 3246 and/or other such parameters providing a user with a history of accidents associated with the particular employee. The active indictor 3250 defines whether the accident history listing 3222 displays active or inactive accident history entries. Upon the selection of the add button or the edit button an accident report window 3320 is displayed.

Similarly in some embodiments, the system 120 can provide accident history views associated with one or more customers and/or a job sites. For example, the customer configuration window 1720 can include an additional or alternative accident history tab, and/or the customer site information window 1920 can include an additional or alternative accident history tab.

Figure 33:
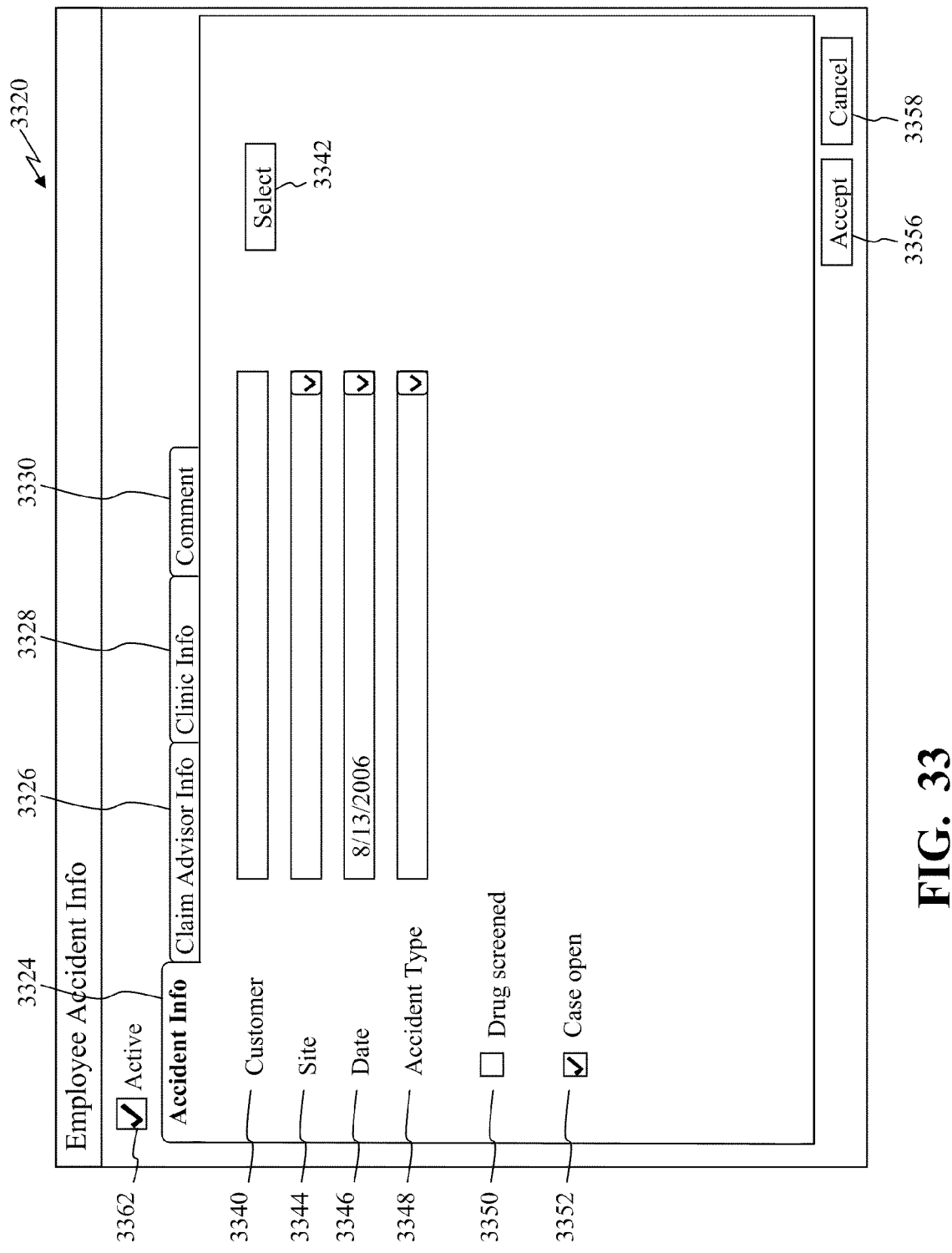
FIG. 33 shows an accident report window according to some embodiments.

FIG. 33 shows an accident report window 3320 according to some embodiments. The accident report window includes a number of tabs 3322, such as but not limited to, accident information tab 3324, claim advisor information tab 3326, clinic information tab 3328, comments tab 3330 and/or other such relevant tabs. When the accident tab is selected as shown in FIG. 33, a number of accident fields with accompanying entry lines are displayed, such as a customer field 3340 (which in some instances can be an optional button and/or can include a separate select button 3342 that when selected causes a listing of customers entered in the system and/or for whom the employee has worked is displayed allowing a user to select from the listing); customer site field 3344 that can include a pull down option that causes a listing of sites associated with the selected customer to be displayed; a data field 3346 that also can include a pull down for selecting a date; an accident type field 3348 that similarly can include a pull down that causes to be displayed a listing of accident types that have been entered into the system (e.g., displaying the listing of types of accidents 1120 in the accident type view of FIG. 11 or allowing a new accident type to be entered); a drug screen indicator or toggle 3350 that allows a user to designate, for example, whether the employee was screened for drugs and/or alcohol following the accident; a case open indicator or toggle 3352 that allows a user to identify whether a case has been opened for the specific accident incident; and other such parameters and/or indicators. An accept button 3356 and a cancel button 3358 can similarly be included to accept the entry or cancel the entry. An active indicator or toggle 3362 can also be provided that defines whether the accident entry is an active or inactive accident entry. In some embodiments, the accident report window 3320 or similar window(s) can be accessed from the customer configuration window 1720 (e.g., through an accident tab), from the customer site information window 1920 and/or other locations within the user interface. Further, accident reports and/or displays of accident information can be produced based on an employee, a site, a customer and/or other relevant parameters or combinations of parameters.

FIG. 34 shows the employee configuration window 3120 with the claim advisory information view 3420 displayed upon detection of a selection of the claim advisory information tab 3326. The claim advisory information view 3420 includes a number of fields and entry lines associated with an insurance claim advisory that is processing a workers compensation claim for the subject accident and/or employee. These fields can include a name field 3422, a phone number field 3424, an email field 3428 and/or other such relevant fields (e.g., fax number, supervisor name and contact information, etc.). The accept button 3356 and the cancel button 3358 are also displayed to accept the entry or cancel the entry.

FIG. 35 shows the employee configuration window 3120 with the claim clinic information view 3520 displayed upon detection of a selection of the clinic information tab 3328. The clinic information view 3520 includes a number of fields and entry lines associated with a medical clinic and/or hospital that treated the employee for the associated accident. These fields can include a clinic name field 3522, address fields 3524, 3526, city field 3528, state field 3530, zip code field 3532 and/or other such relevant fields (e.g., phone number, fax number, patient ID number, etc.). The accept button 3356 and a cancel button 3358 are typically also accessible to accept the entry or cancel the entry.

The comments tabs 3134 and 3330 of the employee configuration window 3120 and the accident report window 3320, respectively, causes comments views to be displayed with a text entry area, and accept and cancel buttons. The text entry field allows the user to enter alphanumeric text regarding the employee, an accident, a customer, a customer site and/or substantially any other relevant information. In some embodiments, these comments views are similar to the comments view 2820 of FIG. 28.

Referring back to FIG. 4, the work entry button 424 as introduced above allows users to enter jobs or work performed by employees of the staffing company. Upon detection of a selection of the work entry button 424, a work entry process is activated that in part generates and/or causes to be displayed a work entry graphical UI 3620 according to some embodiments.

FIG. 36 shows a simplified graphical representation of the work entry UI 3620 with a work entry table 3622 shown. The work entry UI further includes a time scale selection and/or time selection options 3624, such as but not limited to a year option 3626, a month option 3628, a day or date option 3630 (in some instances these options can include pull down menu options or buttons causing a time window to be displayed allowing a user to select a desired, year, month and/or date, respectively). Further, the work entry UI can include a search parameter 3640 and search entry line 3642, an add button 3644, an edit button 3646, a delete button 3648 and in some implementations an active indicator 3650 that designates whether the work entry table 3622 displays work entries that are active or inactive.

The work entry UI 3620 includes a work entry table 3622 with a listing of jobs performed by employees of the staffing company for customers of the staffing company performed within the selected time period. The work entry table further includes a plurality of fields identifying the jobs performed. Some of these fields can include, but are not limited to, an employee field 3660, a customer field 3662, a customer site field 3664, a classification code field 3666, a date field 3668, an hours worked field 3670 and/or other relevant fields identifying the work or job performed for the customer.

The search parameter 3640 allows a user to select a field (e.g., through a pull down menu) to search for jobs in the work entry table based on search string entered in the search entry line 3642. In some embodiments, the work entry table 3622 can additionally be sorted based on one of the fields, and in some instances can be ascending or descending (e.g., alphabetically and/or numerically), with a sorting indicator 3672 identifying the sorting. For example, the work entry table 3622 of FIG. 36 is sorted according to employee (last name) in a descending order.

When the system detects the selection of the delete button 3648 the one or more selected work entries in the work entry table are removed from the table and/or the status of the entries are changed to inactive. In some instances, the work entry(ies) is not fully removed from a work entry database stored locally and/or remotely, but instead marked, labeled or otherwise identified as being removed from the work entry table. Upon the detection of the selection of the add button 3644 and/or edit button 3646, the work entry process displays a work entry window 3720.

Figure 37:
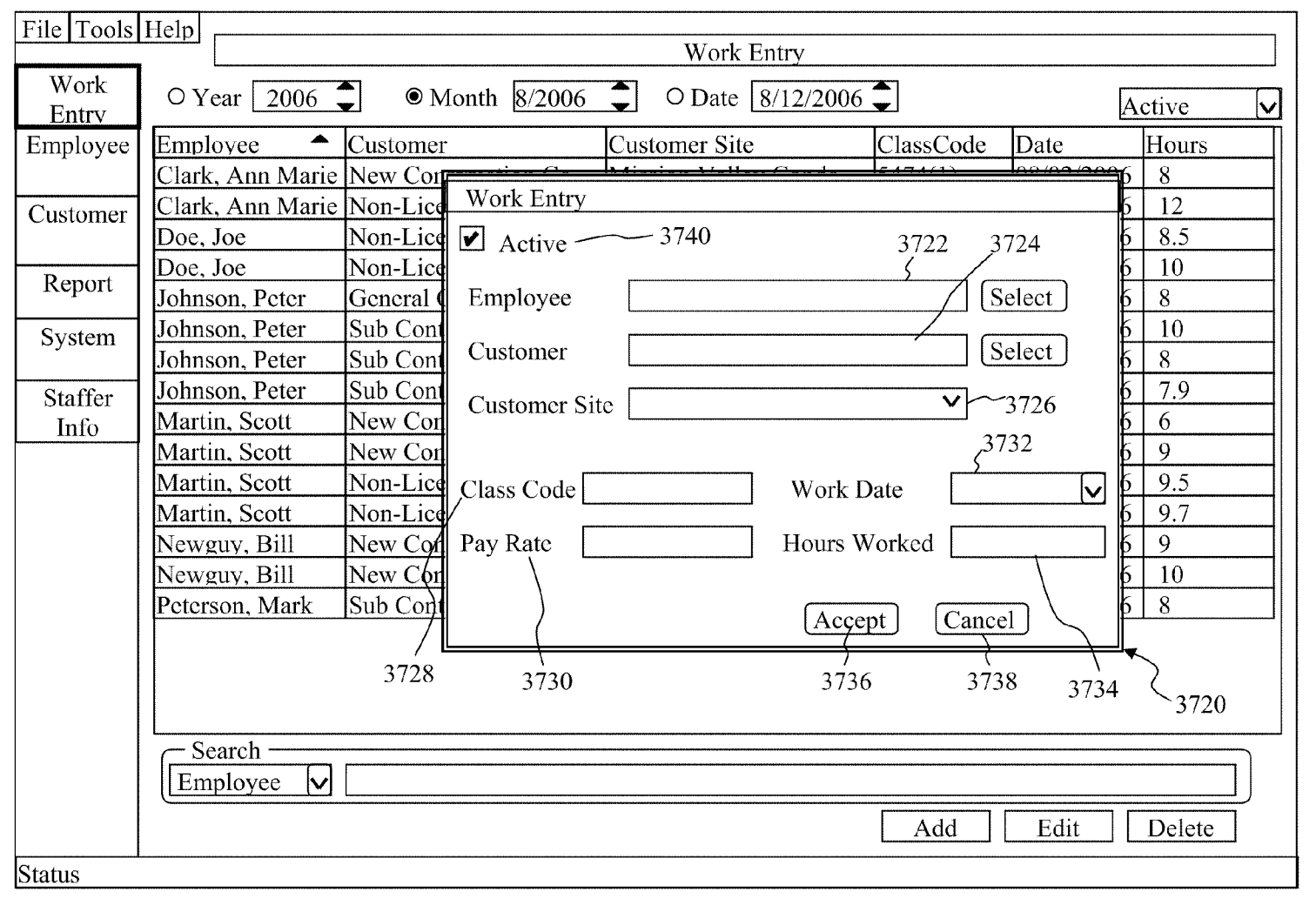

FIG. 37 shows a graphical representation of an example work entry window 3720 according to some implementations. The work entry window includes a number of fields, typically corresponding with at least those represented in the work entry table 3622. For example, the work entry window 3720 can include an employee field 3722, a customer field 3724, a customer site field 3726, a classification code field 3728, a pay rate field 3730, a work date field 3732, an hours worked field 3734 and/or other such relevant fields. Further, the work entry window can include an accept button 3736 and a cancel button 3738, and in some instances an active indicator 3740 that allows a user to designate a state and/or change a state of a work entry as being an active or inactive work entry.

The fields can allow a user to enter text and/or in some instances the field can include a selection button and/or pull down menu. For example, upon selecting the employee field button a listing of employees entered in the system (e.g., in an employee database) is displayed.

Figure 38:
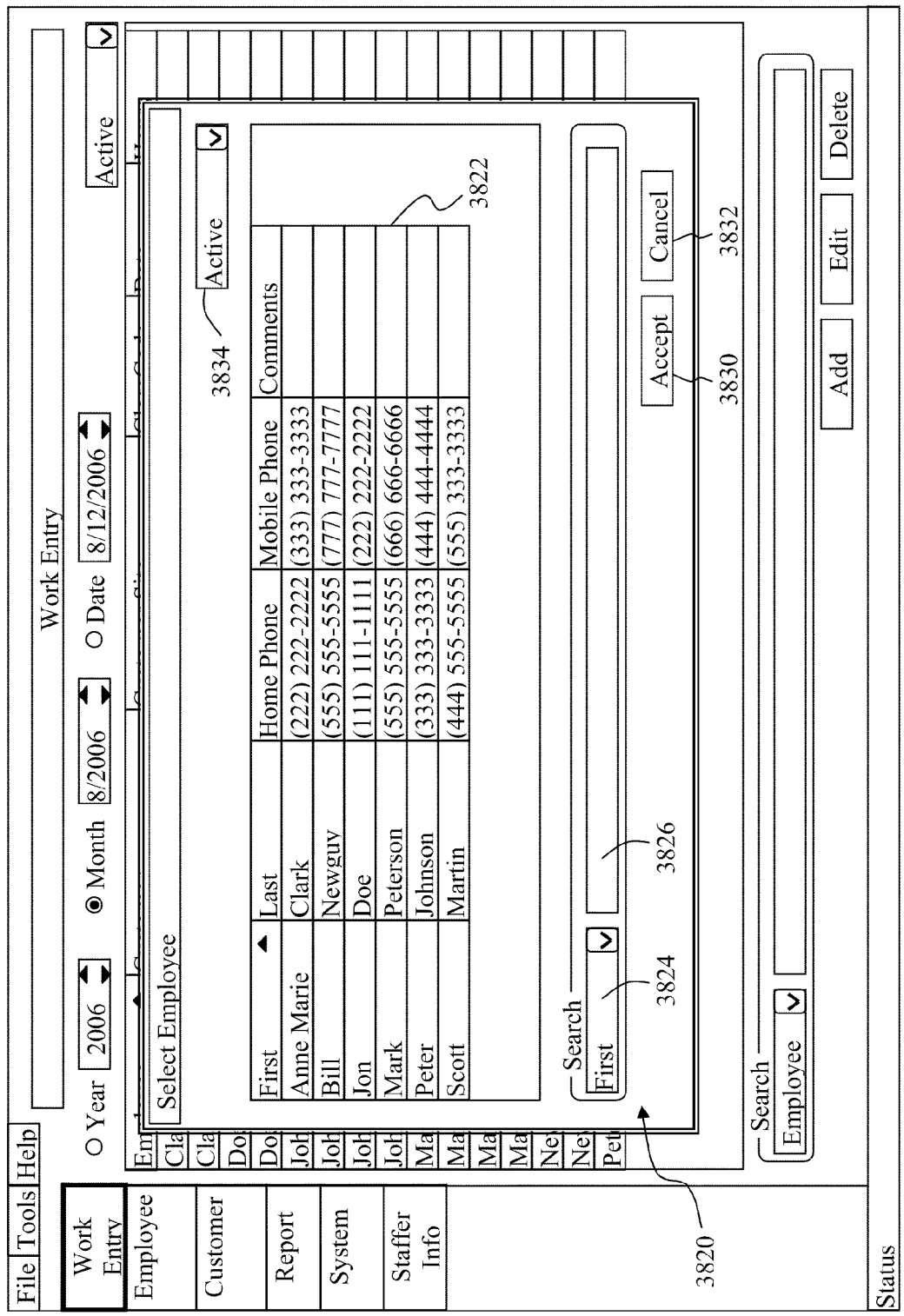
FIG. 38 shows an example graphical representation of an employee selection window that is displayed in response to a selection of the employee field select button of FIG. 37.

FIG. 38 shows an example graphical representation of an employee selection window 3820 that is displayed in response to a selection of the employee field 3722 select button. This employee selection window includes an employee listing 3822 with a number of parameters such as first name, last name, home phone and/or other parameters. Further, the employee selection window can include a search field 3824 and associated search entry line 3826, an accept button 3830, a cancel button 3832 and in some implementations an active indicator 3834. A user can highlight or select an employee from the listing, for example, using a keyboard, a mouse or other pointing device. Upon selection of the accept button 3830, the selected or highlighted employee fills the employee field 3722 of the work entry window 3720 and is associated with the work entry being created. In some embodiments, the employee select window 3820 is similar to the employee information UI 3020 of FIG. 30. The active indicator 3834 designates whether the employee listing 3822 lists active employees or inactive employees.

Referring back to FIG. 37, the selection of the customer field 3724 selection button causes a customer selection window 3920 to be displayed.

Figure 39:
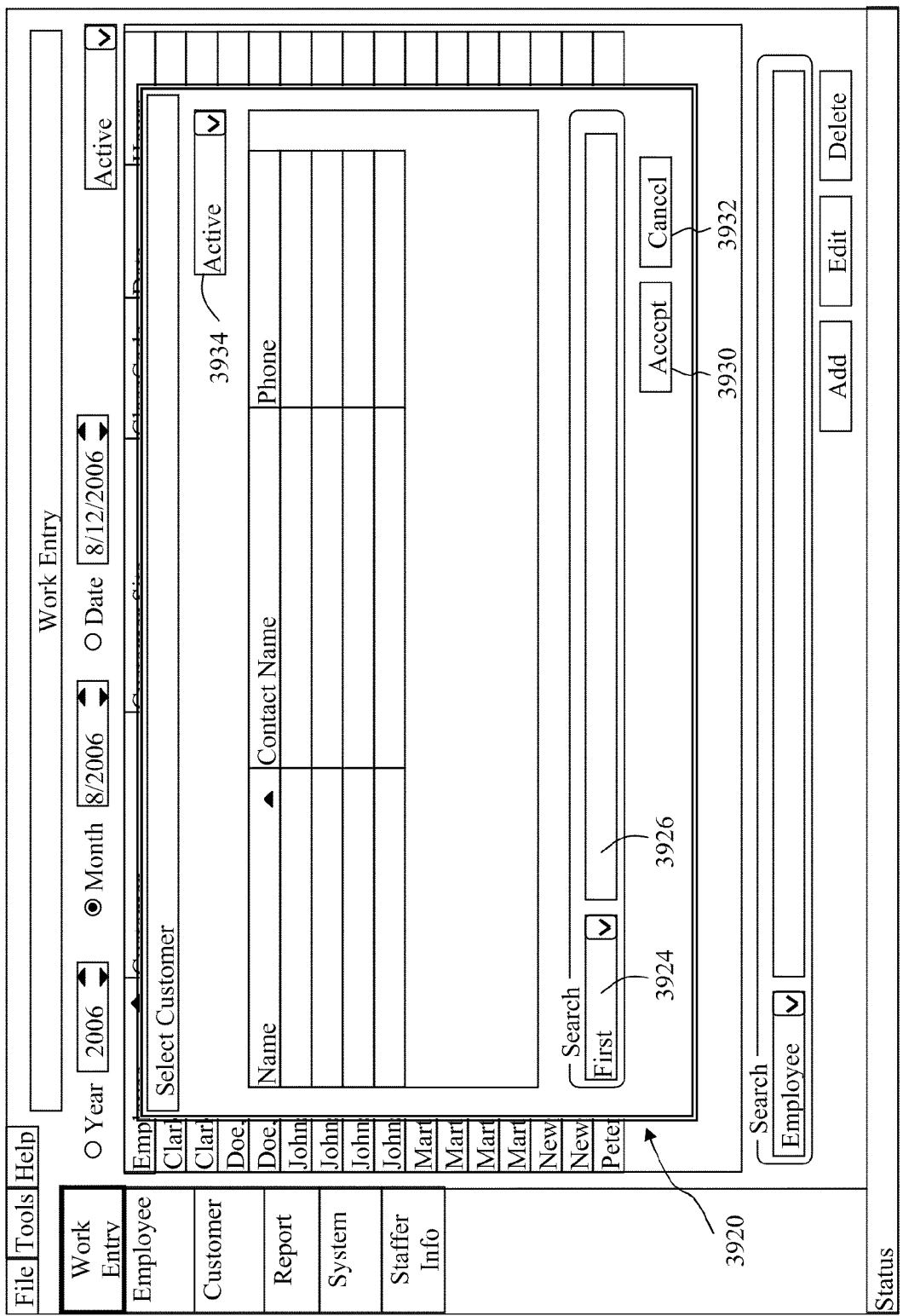
FIG. 39 shows a graphical representation of a customer selection window according to some implementations.

FIG. 39 shows a graphical representation of a customer selection window 3920 according to some implementations. The customer selection window includes a customer listing 3922 with a number of parameters such as company name, contact name, contact phone number and/or other parameters. A search field 3924 and associated search entry line 3926 can also be included that allows a user to search the customer listing based on a selected parameter and the text entered. Further, an accept button 3930 and a cancel button 3932 are included. An active indicator 3934 can also be included that designates whether the customer listing 3922 is displaying active customers or inactive customers. A user can highlight or select a customer from the listing and upon a selection of the accept button 3930, the highlighted customer is filled into the customer field 3724 of the work entry window 3720 and is associated with the work entry being created. In some embodiments, the employee select window 3820 is similar to the customer information UI 1620 of FIG. 16.

The customer site field 3726 of the work entry window 3720 can include a pull down menu that is populated with customer sites associated with the customer incorporated into the customer field 3724. Similarly, the classification code field 3728 can include a pull down menu that is populated with classification codes defined within the system. For example, a number of classification codes are represented by a classification code number and/or description. Further, the classification codes of the pull down menu may be limited to classification codes associated with the selected customer and/or site. A user can select a code to populate the classification code field. Upon selection of the classification code, some embodiments prompt the user asking whether the default pay rate associated with the selected classification code should be applied as defined within the system (e.g., see FIG. 15).

Figure 40:
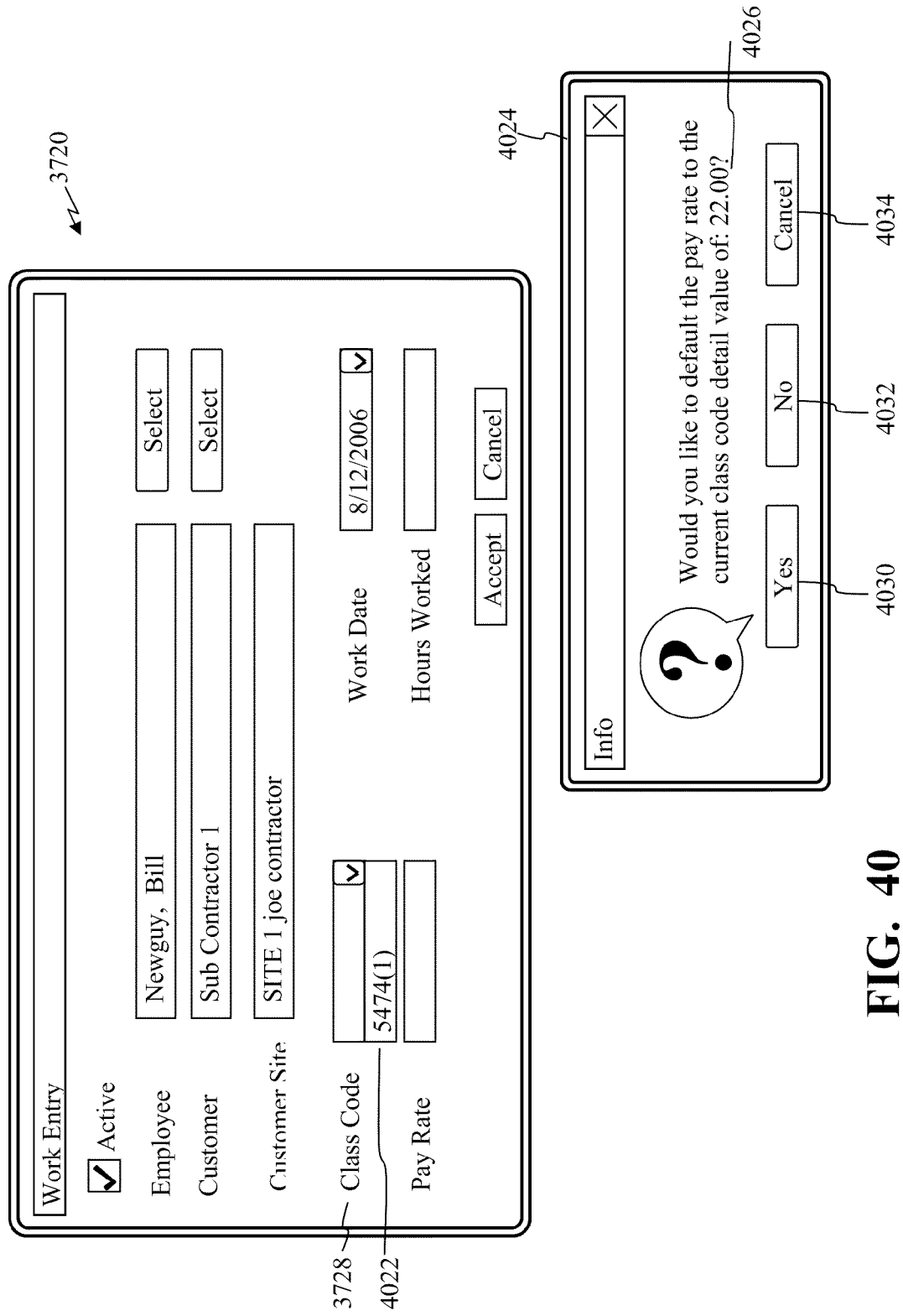
FIG. 40 shows an example graphical representation of work entry window of FIG. 37 with the classification code selected such that the classification code pull down menu is displayed, and a rate confirmation pop-up window displayed requesting the user to verify the default rate.

FIG. 40 shows an example graphical representation of work entry window 3720 with the classification code 3728 selected such that the classification code pull down menu 4022 is displayed, and a rate confirmation pop-up window 4024 displayed requesting the user to verify the default rate. The rate confirmation window 4024 identifies the default rate 4026 and includes an accept or yes button 4030, a decline or no button 4032 and a cancel button 4034. When the user selects the yes button 4030 the default rate is incorporated into the pay rate field 3730 of the work entry window 3720. Alternatively, when the no button 4032 is selected, the user can enter a pay rate directly into the pay rate field of the work entry window.

Referring back to FIG. 37, the work date field 3732 can include a pull down menu that displays a calendar or other window allowing a user to select a date. The hours worked field 3734 corresponds with the number of hours the employee worked at the customer site performing the work defined by the classification code for the designated date. In some instances, multiple days can be designated and hours for each can be inputted. As an example, described above the pull down menu can display a calendar and a user can select multiple days of the calendar and upon completion of selecting the days an additional hours window can be displayed requesting the user to enter the hours for each selected day. Additionally or alternatively, the work date field can receive a string of dates and/or hours (e.g., a string comprising a plurality of individual days, a grouping of days and/or other such strings, such as "6/5/06-6/9/05, 6/12/05-6/15/05, 6/17/05, 6/29/05-7/2/05", "6/5/05, 7.2; 6/7/06, 8.0; 6/8/06, 7.9"). The hours field 3734 could also receive a string of hours that could be mapped with the string of dates entered. Additionally or alternatively, upon selecting or designating multiple days, a plurality of number of hours worked fields 3734 can be displayed allowing the user to enter the hours, and/or the user can be prompted with pop up windows to enter the appropriate hours.

Upon completing the entries into the desired fields and the selection of the accept button 3736, the system records the work entry and incorporates that work entry into the work entry table 3622 of the work entry graphical UI 3620. In some instances, when the accept button is activated prior to one or more fields being filled in, completed or incorrectly filled in, the system identifies one or more of the fields to be filled in or corrected. When the fields are correctly filled, the new and/or edited entry is displayed in the work entry table 3622.

In some embodiments, the work entry graphical UI 3620 can include a copy button and/or the work entry window 3720 can include a copy button. This allows a user to select an entry in the work entry table 3622 and copy the entry to limit the data and/or information that has to be entered. When the copy button is included in the work entry graphical UI 3620 the selection of the copy button can activate the work entry window 3720 with parameters and/or fields filled in with the previously entered data. In some implementations, the system prevents the accept button 3736 from being selected until one or more changes are made to the copied entry (e.g., change of dates 3732, change of employee 3722, customer site 3726 and/or other fields. Additional checks and/or verifications may also be implemented, such as requesting verification and/or preventing entries of the same employee for the same day from being entered. In some instances, however, the user can override the system (e.g., in instances where the employee worked at a first site for four hours and a second site for four hours). Other UIs and/or windows can similarly allow for copying and/or include a copy button, such as the accident type view 1120, classification code field 1322, customer information UI 1620, customer site view 1820, employee information UI 3020, accident history view 3220, work entry graphical UI 3620 and/or other relevant UIs or windows.

Figure 41:
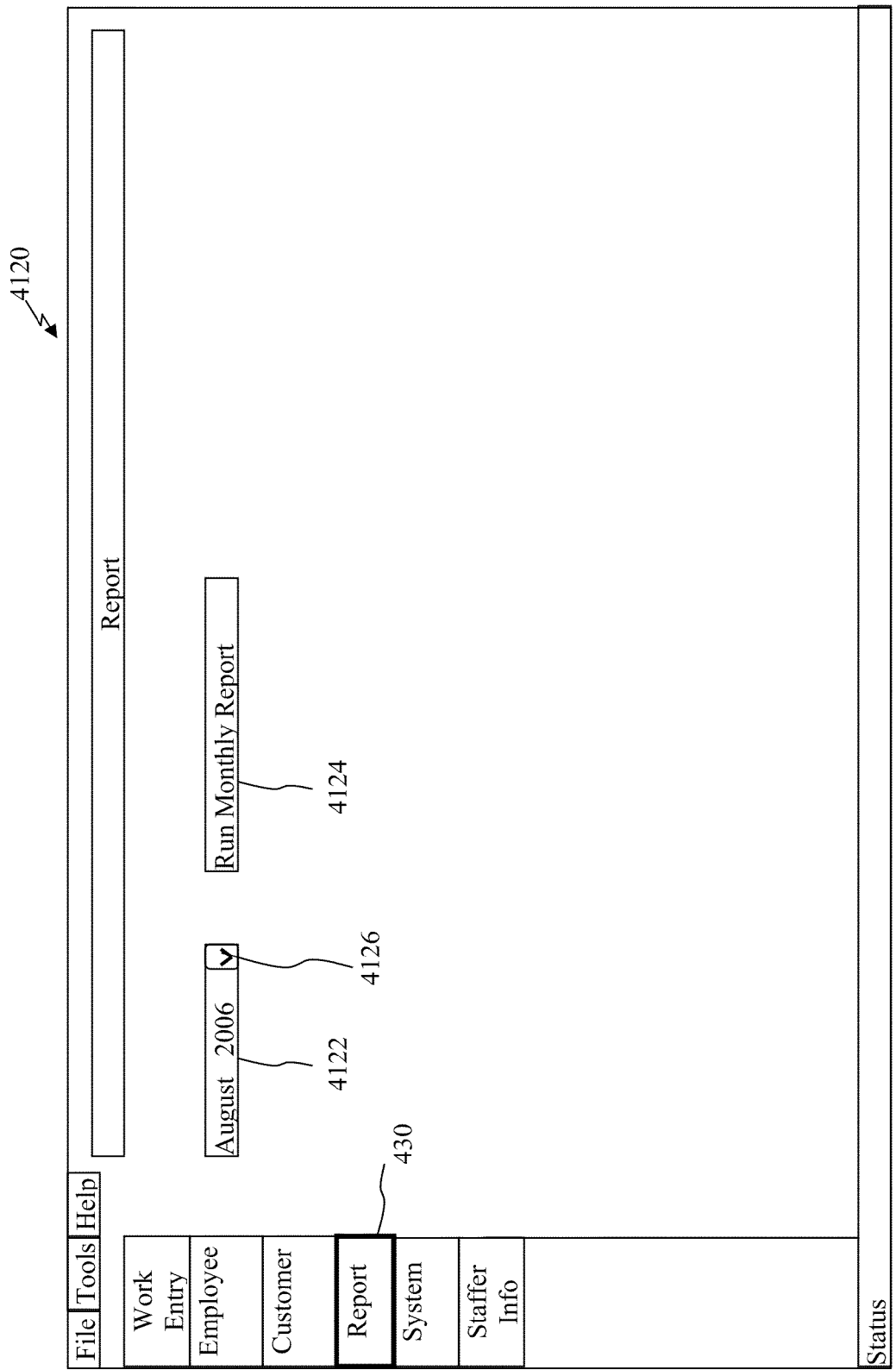
FIG. 41 depicts an example graphical representation of a report UI that is generated and displayed by a report UI process according to some embodiments in response to a selection of the report button of the main UI of FIG. 4.

FIG. 41 depicts an example graphical representation of a report UI 4120 that is generated and displayed by a report UI process according to some embodiments in response to a selection of the report button 430 of the main UI 420. The report UI 4120 allows a user to generate one or more reports regarding information accessible through the system. A listing or menu of reports can be identified in some instances allow the user to select which type of report to generate. Further, the report UI provides user with the option to initiate the generation of one or more reports.

In the example report UI 4120 depicted in FIG. 41 the report UI 4120 includes at least a time period field 4122 and an activation or report generation button 4124. The time period field allows a user to define or select a period of time for which a report is to be generated. The time period field 4122, in some implementations, can include a pull down menu 4126 that displays a calendar or the like allowing a user to select a desired period. In some embodiments, the time periods are defined a month at a time such that reports can be generated on a monthly bases. Other time period, for example, quarterly, bi-weekly, weekly, annually and/or other time periods can be applied. The activation of the report button 4124 (e.g., through the selection on a keyboard, a mouse or the like) causes one or more reports to be generated regarding data associated with the system 120, such as insurance premiums to be paid, auditing reports and/or other such reports. Further, reports can be generated for past jobs performed by accessing history information and/or modification dates associated with when experience modifier values were changed to allow reports to be generated while applying appropriate modifier values for the dates of interest for the reports. The report button can optionally further cause a listing of types of reports to be displayed allowing a user to select one or more desired reports.

As introduced above, in some embodiments the report UI 4120 can include other fields such as a report designation field to select a type of report or reports to be generated (e.g., reports for a certain third party such as a selected insurance provider, reports regarding customer information, employee information, comp rate information, classification code information, statistical information, insurance premium savings information, other such information and/or combinations of such information). The generated reports can be saved as an image (e.g., as a PDF file), printed and/or electronically transmitted. Additionally or alternatively, the reports can be stored as part of the generation process and/or logged.

The selection of the report button 4124, for example, can generate sets of contractor based insurance premium reports (and/or customers with experience modifier reports), and a non-contractor base (or non-experience modifier) insurance premium report. For each customer that is designated as a contractor (e.g., through the contractor indicator 1760 of the customer or customer configuration window 1720) a report can be generated identifying each classification code associated with work performed for that contractor during the selected time period 4122. The report can further identify the employee payroll totals for each classification code, an insurance premium factor or interim rate for the classification code, and a base insurance premium that the insurance provider would calculated prior to applying discounts and/or experience modifiers. This base insurance premium can be calculated, for example, by multiplying the payroll by the premium factor, and in some instances divided by, for example, 100 when the insurance provider bases premiums on a 100 hours worked scale. A summation of all the base premiums can be displayed. Further, the report identifies which of the staffing company and the contractor have a lower experience modifier, lists the experience modifier. Based on the listed experience modifier, the report further defined a workers compensation premium to be paid for the defined period associated with the identified customer that is calculated as described above based on the selected experience modifier.

A non-contractor report can identify classification codes under which work entries have been incorporated into the system during the selected report time period. In some instances, the report lists each class code defined within the system and/or application 120 and indicates payroll, interim rate and premium for those classes for which work entries have been associated within the designated time period. A total payroll amount for employees in each of the classification codes can be displayed along with an insurance premium factor or interim rate for each listed classification code. A base insurance premium is further listed for each classification code that is calculated by multiplying the payroll by the premium factor and dividing by 100. A summation of all the base premiums can further be displayed along with the staffing company's experience modifier, and a total premium owed value is included that is calculated by multiplying the summation of the base premiums by the experience modifier.

In some embodiments, the reports are generated to match insurance provider, governmental and/or other forms. For example, the reports can be formatted generated to match an insurance providers invoice and/or insurance payroll reports such that the reports can be printed directly onto a providers supplied reports, effectively printing on appropriate portions of the provider supplied forms. In other instances, the reports can be generated and printed to match an insurance providers invoice and/or insurance payroll report such that the generated reports can be directly submitted with the premium payment to the insurance provider (e.g., including insuring providers name and address, staffing company's name, address and/or policy number, report period, table or listing of class codes and associated payroll, interim rates and base premiums, and/or other such information). As described above, user options can be provided allowing a user to select the type of report to be generated. In some instances, the system 120 further allows users to define how the reports are to appear, define what information is to be included and/or can be editable by the user. FIGS. 42 and 43 depict examples of at least portions of a contractor report 4220 and a non-contractor report 4320, respectively, according to some embodiments. These reports are formatted for an intended insurance provider and include data and formatting expected by the insurance provider. Alternatively, the report information can simply be defined to print in designated areas and the information can be printed onto the forms supplied by the insurance provider. Additionally in some instances, one or more of the reports can include a bar code 4322 or other identification and/or tracking system. The bar code may be desired by a third party in receiving payments and/or coordinating submitted reports with the party submitting the report and/or the like. The bar code in some instances is an option that a user can select to activate. Further, upon activation a user may be provided with a listing allowing the user to select a desired source (e.g., selects an insurance provider) so as to incorporate an appropriate bar code relative to the selected provider. The bar code can identify the company submitting the report, provide numerical values (e.g., codes or the like) or other relevant information.

Some embodiments provide for other reports to be generated. For example, some embodiments allow users to generate a savings report that indicates an amount of money saved by using the customers' experience modifiers when appropriate. Further, this report can be limited and/or organized to desired periods of time (e.g., per month, per year and the like). Other savings reports associated with using the customer experience modifiers can include savings per customer, savings per employee, savings per period of time, savings per classification code, savings per office (e.g., when a staffing company has more than one office), savings per customer site and/or other such savings reports. Additionally, each of these savings reports may be limited and/or organized by designated time periods. Still further reports can be generated, such as customer information report (e.g., name, address, contact information, bureau number, experience modifier, contractor license number, basis for pay role, classification codes, amount of premium paid based on customer and/or other such information); listings reports (e.g., customers, employees, customer experience modifiers, customer sites, premiums paid, classification codes under which premiums were paid, accidents (which may be further focused to per employee, per customer, per customer site and the like) and/or other such lists); reports of premiums paid according to classification codes; reports of premiums paid by time period; audit reports that can track changes, for example, to experience modifiers (e.g., changes within a policy period); and/or other relevant reports.

In some embodiments, the report UI 4120 can include a listing of reports and parameters associated with the reports that can be defined, selected, deselected and/or otherwise indicated to be included and/or excluded from the report. Additionally or alternatively, some embodiments allow users to define reports to be generated. For example, the report UI 4120 can include a user defined report option that when selected cause a user defined report interface to be displayed that allows a user to select one or more parameters or fields for which the report is to be based (e.g., employee, customer, customer site, accident). According to the one or more selected parameters or fields, primary sub-parameters and/or sub-fields can be displayed for selection by the user to be included in the report. Additional secondary sub-parameters or fields can be displayed based on the selected primary sub-parameters or fields. Substantially any relevant number of levels of sub-parameters and/or sub-fields can be displayed.

Referring back to FIG. 4, as described above the main UI 420 in some implementations includes the main tool bar 440 with one or more buttons or options. A file button 442 allows a user to shut down or exit the main UI. In some instances, the file button further includes an import option that allows a user to import classification codes and their descriptions and/or other information. The help button 446 activates an interactive help guide that allows a user to search for information about the operation of the user interfaces and/or definitions for parameters, calculations, terms and the like. The help button 446 in some instances can provide a user with options about accessing help information locally stored, accessing remote help information (e.g., over the network 134), and/or submit help requests, typically over the network 134. The help information can be displayed in many different formats, such as alphabetically by subject that links to the desired information, a search field can be provided to accept one or more search terms that can be used to search the help information for potentially relevant information and other such configurations. Typically an additional help interface or window is activated providing the user with the ability to interact with and find the desired help information. Further, the help information may provide a user with the ability to obtain an upgrade of some or all of the software, programs, executables and/or code used in implementing the compensation premiums and/or user interfaces described herein. These upgrades can be retrieved over the communication network 134 or from a local storage, such as a memory storage drive or disc drive. These upgrades can correct operational errors or bugs, provide new features, enhance operation or other such upgrades. The tool button 444 provides a bill rate calculator. Upon activation of the bill rate calculator option and bill rate calculator window is displayed.

Figure 44:
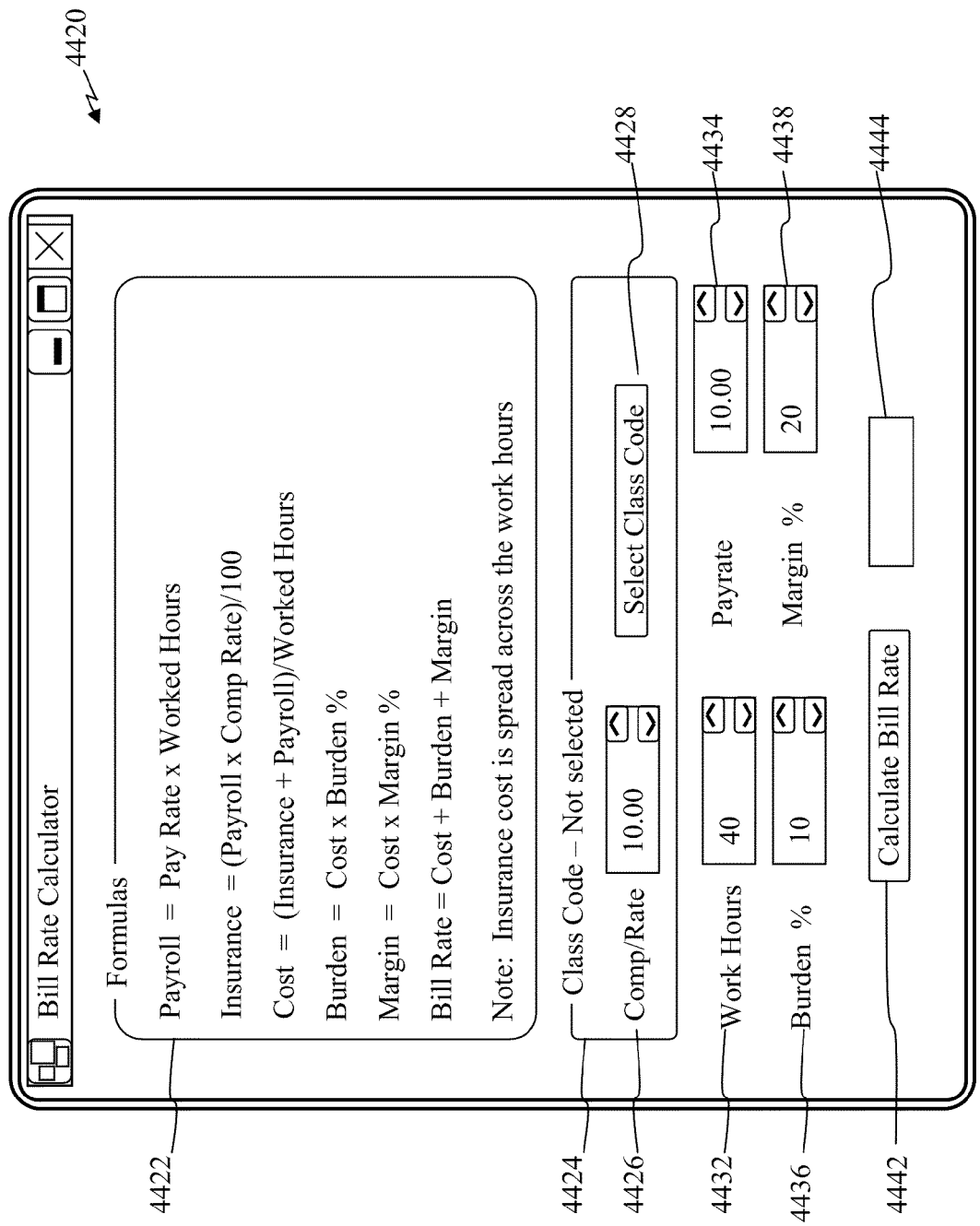
FIG. 44 shows a graphical representation of a bill rate calculator window according to some implementations.

FIG. 44 shows a graphical representation of a bill rate calculator window 4420 according to some implementations. The bill rate calculator allows a user to quickly determine an amount per hour to charge a customer and/or to provide a quote to a customer taking into consideration payroll expense, insurance premium expenses, cost expenses, overhead expenses, a margin of profit and/or other factors. For example, the bill rate window 4420 includes a formulas section 4422 that defines a number of formulas utilized in calculating a bill rate, such as but not limited to, payroll (=pay rate×worked hours); insurance (=(payroll×comp rate)/100); cost (=(insurance+payroll)/worked hours); burden (=cost× burden %); margin (=cost×margin %); bill rate (=cost+burden+margin).

A class code section 4424 can also be included. This section has a comp rate field 4426 that in some instances can include an increment and/or decrement counter button to adjust a value entered in the comp rate field. Further, a select classification code button 4428 can be included that activates a display of a classification code listing that allows a user to select a classification code. In some embodiments, this displayed classification code listing is similar to the classification code field 1322 of the classification code setup view 1320 of FIG. 13. This classification code listing includes a listing or table of available classification codes and corresponding classification code job descriptions, along with an accept button and cancel button. Upon selection of one of the classification codes, the system can prompt the user regarding whether to use the comp rate as defined in the system for the selected classification code.

Additionally fields can be included in the bill rate calculator window, such as an hours worked field 4432, a pay rate field 4434 defining a rate paid to an employee performing the work, a burden percentage field 4436 that can define an estimated overhead cost to the staffing company and a profit margin percentage field 4438. A calculate bill rate button 4442 is also provided that calculates the bill rate and displays it in a bill rate field 4444.

The present embodiments simplify the process of tracking customers, customers' job requests, employees, work performed by employees, as well as calculating insurance premiums while attempting to minimize those premiums and meeting legal and/or statutory requirements. Further, the present embodiments can provide reports defining amounts saved, and in some instances, provides audit reports that can used in verifying premium payments.

Some embodiment provide a computer program product that is recorded on a recordable storage medium that generates one or more user interfaces allow users to enter data, parameters and the like, that manages databases of the entered data and parameters, and that can return reports, such as reports based on amounts of insurance premiums to be paid based on work performed by employees. Further, some embodiments can be implemented as a stand alone application, for example, that is limited at least in some respects from being networked and/or utilized over a network. Other embodiments provide for networked systems allowing multiple sites or computers to utilize the application or system to enter data, access data and/or generate reports. For example, a single company can maintain a single application that can be accessed by multiple, geographically distributed offices. Additionally or alternatively, one or more central databases and/or servers can maintain databases for multiple users, reducing the storage needs at the user and/or providing backups for the user. Furthermore in some embodiments, the system is accessible over the Internet allowing users can access a staffing company's information and/or databases, for example, through the Internet using a web browser. Protections, such as password assess, encryption and the like, are provided to protect access to staffing company's data and records. Accessing the system over the Internet allows a staffing company to manage data from substantially any location with Internet accesses. Some embodiments limit the use of the application and/or system to a single computer. For example, a single Internet protocol (IP) address is restricted within licensing that prevents the system and/or application from being operated from a computer other than the computer associated with the IP address, and/or an IP address can be supplied to the system and/or application provider to allow verification that the system and/or application are being operated from an authorized computer.

In addition to the reporting, some embodiments provide a direct payment option that determines a premium to be paid based on one or more reports generated and funds can be electronically transferred, electronic authorization to a banking institution and/or electronic payment can be initiated by and/or through the application and/or system 120. These payments can be associated with calculated premiums and/or numerous premium amounts can be totaled and a single payment transmitted and/or authorized.

The system and/or application can be supplied to company and/or user by a service provider. The user can receive authorization to use the system and/or application from the service provider. For example, the user can purchase one or more stand alone licenses, one or more single user network licenses, one or more multi-user network license, a number of uses license, a time period license, a number of reports license and/or other such licensing or combinations of licensing. Additionally or alternatively, the service provider can supply access to the system and/or application and receive compensation based on an amount of savings the user realizes through the user of the system and/or application. Auditing can be preformed by the user, service provider and/or third party to determine and/or verify savings. Additionally or alternatively, as reports are generated those reports and/or the savings achieved can further be forwarded to the service provider to allow the service provider to track or audit savings, and thus, determine a compensation.

While the invention herein disclosed has been described by means of specific embodiments and applications thereof, numerous modifications and variations could be made thereto by those skilled in the art without departing from the scope of the invention set forth in the claims.

What is claimed is:

1. A method for use in determining a premium, the method comprising:
   identifying a work entry of an employee provider, the work entry being stored on a computer readable medium and associated with a customer of the employee provider, and wherein the employee provider provides an employee to perform work for the customer and wherein the employee provider is a distinct and separate entity from the customer;
   determining a payroll based on the work entry;
   retrieving a compensation rate based on the work entry;
   calculating, through a processor, a base premium for the employee provider as a function of the payroll and the compensation rate;
   retrieving a customer experience modifier rate assigned to the customer, wherein the customer experience modifier rate is based on a history of job related injuries of jobs being performed for the customer;
   retrieving a staffer experience modifier rate for the employee provider, wherein the staffer experience modifier rate is based on a history of employee related injuries to employees of the employee provider occurring while performing jobs for one or more customers of the employee provider; and
   calculating, through the processor, a modified premium of the employee provider comprising:
   modifying the base premium by the staffer experience modifier rate when the staffer experience modifier rate is less than the customer experience modifier rate; and
   modifying the base premium by the customer experience modifier rate when the customer experience modifier rate is less than the staffer experience modifier rate.

2. The method of claim 1, further comprising:
   determining whether a customer is a licensed contractor, and implementing the retrieving of the customer experience modifier rate assigned to the customer when the customer is a licensed contractor.

3. The method of claim 1, wherein the determining a payroll comprises identifying a pay rate for the work entry, identifying a number of hours worked for the work entry, and multiplying the pay rate by the number of hours worked.

4. The method of claim 1, wherein the retrieving the compensation rate comprises identifying a classification code of the work entry and determining the compensation rate based on the classification code.

5. The method of claim 1, wherein the calculating the base premium comprises calculating the base premium as a function of the payroll, the compensation rate and a risk factor associated with a type of job being performed by the employee for the customer.

6. The method of claim 1, further comprising:
   providing the processor; and
   providing computer readable memory in communication with said processor;
   wherein the identifying the work entry comprises identifying the work entry stored on the computer readable medium and associated with the customer; the retrieving of the compensation rate comprises retrieving, from the computer readable medium, the compensation rate based on the work entry; the retrieving the customer experience modifier rate comprises retrieving, from the computer readable medium, the customer experience modifier rate assigned to the customer; and the retrieving the staffer experience modifier rate comprises retrieving, from the computer readable medium, the staffer experience modifier rate for an employee provider; the calculating the base premium further comprises storing the calculated base premium to the computer readable medium; and the calculating the modified premium further comprises:
   retrieving the base premium from the computer readable medium; and
   storing, to the computer readable medium, the modified premium when the base premium is modified.

7. The method of claim 6, further comprising:
   providing a display in communication with said processor; and
   displaying the modified premium on the display.

8. The method of claim 7, further comprising:
   transferring, over a distributed network, the modified premium.

9. The method of claim 6, further comprising:
   transferring, over a distributed network, the modified premium.

10. The method of claim 3, wherein the retrieving the compensation rate comprises identifying a classification code of the work entry and determining the compensation rate based on the classification code.

11. The method of claim 10, wherein the calculating the base premium comprises multiplying the payroll by the compensation rate and dividing the result by 100.

12. The method of claim 11, wherein the retrieving of the customer experience modifier rate assigned to the customer where the customer is a licensed contractor.

13. The method of claim 12, further comprising:
    transferring, over a distributed network, the modified premium.

14. The method of claim 12, further comprising:
    providing the processor; and
    providing computer readable memory in communication with said processor;
    wherein the identifying the work entry comprises identifying the work entry stored on the computer readable medium and associated with the customer; the retrieving of the compensation rate comprises retrieving, from the computer readable medium, the compensation rate based on the work entry; the retrieving the customer experience modifier rate comprises retrieving, from the computer readable medium, the customer experience modifier rate assigned to the customer; and the retrieving the staffer experience modifier rate comprises retrieving, from the computer readable medium, the staffer experience modifier rate for an employee provider; the calculating the base premium further comprises storing the calculated base premium to the computer readable medium; and the calculating the modified premium further comprises:
    retrieving the base premium from the computer readable medium; and storing, to the computer readable medium, the modified premium when the base premium is modified.

15. The method of claim 12, further comprising:
generating a report designating which of the staffer experience modifier rate and the customer experience modifier rate that is applied and the modified premium as modified.

16. The method of claim 1, further comprising:
generating a report designating which of the staffer experience modifier rate and the customer experience modifier rate that is applied and the modified premium as modified.

17. The method of claim 1, where the work entry comprises data identifying work to be performed by an employee supplied by the employee provider to the customer, and where the work entry is specific to a job or service to be performed by an employee supplied to the customer by the employee provider with which the experience modifier rate is associated.

18. The method of claim 1, where the work entry is specific to a job to be performed by an employee supplied to the customer by the employee provider, and the job is classified according to a classification code associated with a type of job of the specific job.

19. A tangible, non-transitory computer-readable storage medium storing one or more computer programs for use with a computer simulation, the computer program configured to cause a processor to execute steps comprising:
identifying a work entry of an employee provider, the work entry being stored on a computer readable medium and associated with a customer of the employee provider, and wherein the employee provider provides an employee to perform work for the customer;
determining a payroll based on the work entry;
retrieving a compensation rate based on the work entry;
calculating, through a processor, a base premium for the employee provider as a function of the payroll and the compensation rate;
retrieving a customer experience modifier rate assigned to the customer, wherein the customer experience modifier rate is based on a history of job related injuries of jobs being performed for the customer;
retrieving a staffer experience modifier rate for the employee provider, wherein the staffer experience modifier rate is based on a history of employee related injuries to employees of the employee provider occurring while performing jobs for one or more customers of the employee provider; and
calculating, through the processor, a modified premium of the employee provider comprising:
modifying the base premium by the staffer experience modifier rate when the staffer experience modifier rate is less than the customer experience modifier rate; and
modifying the base premium by the customer experience modifier rate when the customer experience modifier rate is less than the staffer experience modifier rate.

* * * * *